US012669794B2

(12) United States Patent
Shapiro et al.

(10) Patent No.: US 12,669,794 B2
(45) Date of Patent: Jun. 30, 2026

(54) IMPLEMENTING RENDERED FABRICATION RESULTS WITH COMPUTER NUMERICALLY CONTROLLED MACHINES BASED ON NATURAL LANGUAGE DESCRIPTIONS OF DESIRED FABRICATION RESULTS

(71) Applicant: MAKEBLOCK HONGKONG HOLDING LIMITED, Wan Chai (HK)

(72) Inventors: Daniel Shapiro, Mercer Island, WA (US); Michael Natkin, Seattle, WA (US); Jonathan Park, Seattle, WA (US); Jack Shen, Seattle, WA (US); Adrian Quan, Seattle, WA (US)

(73) Assignee: MAKEBLOCK HONGKONG HOLDING LIMITED, Hong Kong (CN)

( * ) Notice: Subject to any disclaimer, the term of this patent is extended or adjusted under 35 U.S.C. 154(b) by 372 days.

(21) Appl. No.: 18/525,827

(22) Filed: Nov. 30, 2023

(65) Prior Publication Data

US 2024/0176321 A1     May 30, 2024

Related U.S. Application Data

(60) Provisional application No. 63/385,620, filed on Nov. 30, 2022.

(51) Int. Cl.
*G05B 19/18* (2006.01)
*G06F 40/30* (2020.01)
*G06T 19/00* (2011.01)

(52) U.S. Cl.
CPC ............ *G05B 19/182* (2013.01); *G06T 19/00* (2013.01); *G05B 2219/45041* (2013.01); *G06F 40/30* (2020.01); *G06T 2200/24* (2013.01)

(58) Field of Classification Search
CPC ........ G05B 19/182; G05B 2219/45041; G06T 19/00; G06T 2200/24; G06F 40/30; B33Y 50/00
USPC ........................................................... 700/166
See application file for complete search history.

(56) References Cited

U.S. PATENT DOCUMENTS

| | | | | |
|---|---|---|---|---|
| 11,378,931 B2 * | 7/2022 | Wilcox | ............... | G05B 19/404 |
| 2019/0325628 A1 * | 10/2019 | Dubey | ............... | G06F 16/3329 |
| 2021/0073833 A1 * | 3/2021 | Manco | .................. | G06F 3/1204 |
| 2023/0259800 A1 * | 8/2023 | Alkan | ...................... | G06N 7/01 706/11 |
| 2023/0343008 A1 * | 10/2023 | Do | .......................... | G06V 40/16 |

(Continued)

OTHER PUBLICATIONS

Gal et al., An Image is Worth One Word: Personalizing Text-to-Image Generation using Textual Inversion, arXiv:2208.01618v1, Aug. 2, 2022, pp. 1-26.

(Continued)

*Primary Examiner* — Kira Nguyen
(74) *Attorney, Agent, or Firm* — PV IP PC; Wei Te Chung

(57) ABSTRACT

Embodiments include one or more computing systems configured to perform functions comprising: (i) receiving a natural language description of a desired fabrication result; (ii) causing a software engine to generate machine-created rendering instructions based on the natural language description of the desired fabrication result; and (iii) executing, by a laser CNC machine, the machine-created rendering instructions to generate a rendered fabrication result.

20 Claims, 18 Drawing Sheets

(56) References Cited

U.S. PATENT DOCUMENTS

| 2024/0065815 A1* | 2/2024 | Lobsiger | ................ G16H 50/70 |
| 2025/0086893 A1* | 3/2025 | Singla | .................... G06T 15/04 |

OTHER PUBLICATIONS

Gatys et al., Image Style Transfer Using Convolutional Neural Networks, CVPR, 2016, pp. 2414-2423.
Ha et al., HyperNetworks, arXiv:1609.09106v4, Dec. 1, 2016, pp. 1-29.
Ramesh et al., Zero-Shot Text-to-Image Generation, arXiv:2102. 12092v2, Feb. 26, 2021, 20 pgs.
Ruiz et al., DreamBooth: Fine Tuning Text-to-Image Diffusion Models for Subject-Driven Generation, arXiv:2208.12242v1, Aug. 22, 2025, pp. 1-21.

* cited by examiner

Text Prompt: A mountain lake in the style of a sketch book page. The scene should include a small rocky island in the lake, and towering, majestic mountains in the distance. The drawing should be like a pencil sketch, yet detailed enough to deliver an enchanting and adventurous landscape. The design should be constrained to the provided mask image.

Mask image

800

805

Receiving a natural language description of a desired fabrication result

810

Generating (or causing to be generated) rendering instructions based on the natural language description of the desired fabrication result

IMPLEMENTING RENDERED FABRICATION RESULTS WITH COMPUTER NUMERICALLY CONTROLLED MACHINES BASED ON NATURAL LANGUAGE DESCRIPTIONS OF DESIRED FABRICATION RESULTS

CROSS REFERENCE TO RELATED APPLICATIONS

This application claims priority to U.S. Provisional Application 63/385,620 titled "Implementing Rendered Fabrication Results with Computer Numerically Controlled Machines Based on Natural Language Descriptions of Desired Fabrication Results," filed on Nov. 30, 2022. The entire contents of App. 63/385,620 are incorporated herein by reference.

FIELD OF THE DISCLOSURE

The subject matter described herein relates to using natural language to generate rendering instructions for fabrication by a laser in computer numerically controlled (CNC) machines, including CNC machines configured for laser cutting, laser drilling, laser ablation, laser engraving, and laser machining applications. Aspects of the disclosed subject matter may additionally relate to other types of CNC machines as well.

BACKGROUND

A computer numerically controlled (CNC) machine operates by changing the position of a tool relative to a substrate (or other item or material) to be machined. In some CNC machines, the tool comprises a laser beam, or perhaps a similar energy source, and moving the tool relative to the substrate (or other item or material) to be machined comprises moving the laser beam or similar energy source configured to deliver electromagnetic energy to one or more locations along the substrate (or other item or material) to be machined.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1:
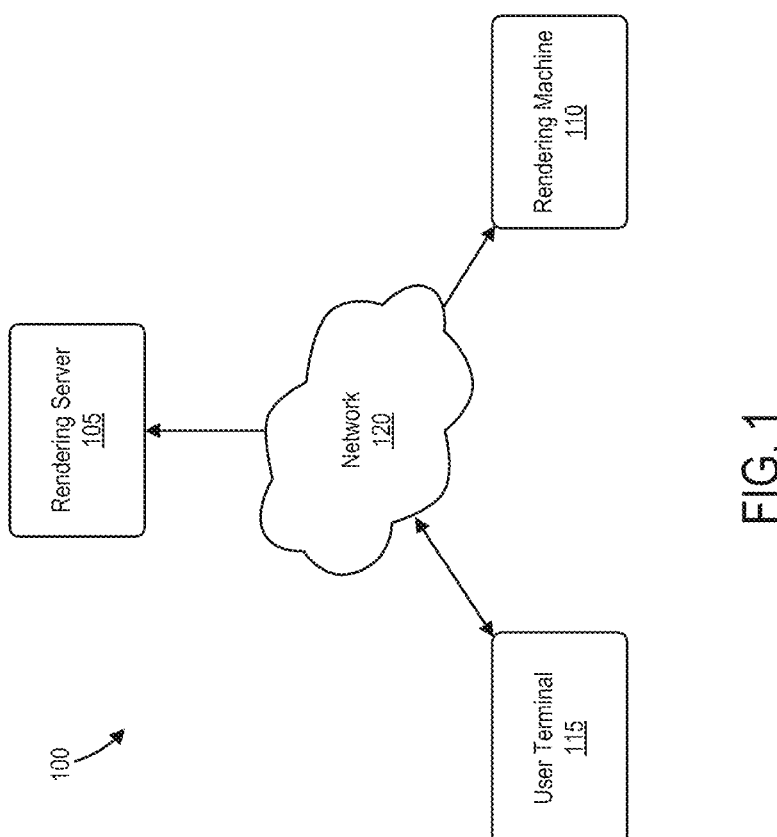
FIG. 1 shows an operating environment that facilitates rendering a design using a rendering machine, in accordance with some example embodiments.

The drawings are for the purpose of illustrating example embodiments, but those of ordinary skill in the art will understand that the technology disclosed herein is not limited to the arrangements and/or instrumentality shown in the drawings.

DETAILED DESCRIPTION

Various examples of devices and operations performed by these devices are described herein. Words such as "example" that may be used herein are understood to mean "serving as an example, instance, or illustration." Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein. Accordingly, the examples described herein are not meant to be limiting. It will be readily understood that the aspects of the present disclosure, as generally described herein, and illustrated in the figures, can be arranged, substituted, combined, separated, and designed in a wide variety of different configurations and different orderings.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Moreover, terms such as "substantially" or "about" that may be used herein, are meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Terms such as "machine-readable medium" refer to any computer program product, apparatus and/or device, such as, for example, magnetic discs, optical disks, computer memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as, for example as would a non-transient solid-state memory or a magnetic hard drive or any equivalent storage medium. The machine-readable medium can alternatively or additionally store such machine instructions in a transient manner, such as, for example, as would a processor cache or other random-access memory associated with one or more physical processor cores.

While some examples described herein may refer to functions performed by given actors such as "users" and/or other entities, it should be understood that this is for purposes of explanation only. The claims should not be interpreted to require action by any such example actor unless explicitly required by the language of the claims themselves. Further, in the figures, identical reference numbers typically identify generally similar and/or identical elements. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

I. OVERVIEW

Artificial Intelligence (AI) has been increasingly used to generate creative works. Existing AI designs create works that are intended for direct visual consumption. For example, Ramesh et al., "Zero-Shot Text-to-Image Generation," available at https://arxiv.org/pdf/2102.12092.pdf describes an AI system trained to create images for visual consumption.

Some embodiments disclosed herein include a system that uses a software engine (which may be an AI engine in some embodiments) to generate rendering instructions based on natural language descriptions of desired fabrication results that, in some instances, are provided as a prompt (i.e., an input) to the AI engine. The system may receive the prompt via any of several ways, e.g., any one or more of a text input from a graphical user interface (GUI), options selected via the GUI, a spoken input received via one or more microphones, a file that is submitted, a video input received via one or more cameras, sensor data from one or more sensors or any other suitable method for receiving an input from a user or system that can direct its execution.

In some embodiments, the prompt may additionally include one or more images along with the natural language description of the desired fabrication result. For example, in some embodiments, in addition to or instead of the natural language description of the desired fabrication result, the prompt may include any type of file or files.

For instance, the prompt can include any one or more of the following inputs: (i) text, (ii) image, (iii) audio, (iii) video, (iv) streaming data, (v) sensor data, (vi) Computer-Aided Design (CAD) or similar files, or (vii) any other type of input now known or later developed that is suitable for showing and/or describing any one or more aspects of the desired fabrication result.

For example, the prompt can include a video file (where the entire video is captured in the file) or a video stream. Similarly, the prompt may capture sensor data from one or more sensors (e.g., in a data file comprising sensor data) or a stream of sensor data received from one or more sensors.

In another example, the prompt may include one or more pictures or images of the desired fabrication result, or perhaps pictures or images of what the desired fabrication result should look similar to. The one or more pictures or images in some instances may show different views of the desired fabrication result, e.g., top view, side view(s), bottom view, perspective view, and so on. For example, if the desired fabrication result is a box (i.e., a 3D assembly object box), the prompt may include one or more pictures or images of how the box should look from several different angles and perspectives.

In another example, the prompt may include one or more pictures or images of some particular component of the desired fabrication result, or perhaps pictures or images of what the particular component of the desired fabrication result should look similar to. The one or more pictures or images in some instances may show different views of the desired fabrication result, e.g., top view, side view(s), bottom view, perspective view, and so on. For example, if the desired fabrication result is a box (i.e., a 3D assembly object box) with a decorative handle on the top, the prompt may include one or more pictures or images of how the decorative handle should look from several different angles and perspectives.

In yet another example, the prompt may include information that is necessary or at least useful for creating the desired fabrication result. For example, if the desired fabrication result is a shoe, the prompt may include an image of the foot for which the shoe is intended to fit alongside a ruler showing the size of the foot, thereby enabling extraction of critical or at least important dimensional information for the desired fabrication result.

In a further example, the prompt may include one or more pictures or images of an object that depicts a design style that is required or at least preferred for the desired fabrication result. For example, if the desired fabrication result is a walking cane, the prompt may include one or more pictures of artwork from the Rococo or Late Baroque period, thereby enabling extraction of stylistic aspects or themes from the pictures for incorporation into the design of the walking cane.

In yet a further example, the prompt may include video that shows and/or describes the desired fabrication result and/or aspects of the desired fabrication result. For example, the video may depict a human explaining the desired fabrication result (or aspects thereof), including, but not limited to, describing the size or shape with hand motions, pointing to features of an object, or describing how the desired fabrication result should move or operate when constructed.

For instance, the prompt could include video of a person with hand motions showing the approximate size of the desired fabrication result (or component thereof), e.g., "the top of the box should be about this wide and about this long," from which rough dimensions can be extracted. The prompt could include video of a person illustrating with hand motions how different components of the desired fabrication result should move relative to each other, e.g., "the top of the box should pivot to open like this," from which a range of motion of the box top and box body and/or type of attachment mechanism (e.g., hinges, swivels, or other attachment mechanism) can be extracted.

In yet a further example, the prompt may include video where a human shows and/or describes two or more objects and how to combine them in connection with the desired fabrication result. For example, if the desired fabrication result is a candy dish with a top shaped like a football, the video may depict a human showing a bowl and a football and describing how the bottom of the candy dish should be able to accommodate candy like the bowl, but the bottom should be shaped to have a top that is like the top half of the football with the laces. The video may depict the human describing a Christmas tree ornament and showing a toothbrush to illustrate rough dimensions of a decorative component extending from the body of the ornament. In this manner, the video may depict a human showing how the components are to fit together or how they should work together in connection with desired fabrication result.

In another example, the prompt may include a video of a lecture where a human draws the desired fabrication result (or aspects thereof) onto a whiteboard (or paper or other surface) while describing various features of the desired fabrication result. In such instances, the prompt may include (i) a natural language description of the desired fabrication result prepared by the human, (ii) the video of the human drawing and explaining the desired fabrication result (or aspects thereof), and/or (iii) the drawing (or an image of the drawing). In operation, the information in such a prompt helps to define how the desired fabrication result looks, how the desired fabrication result (or components thereof) are assembled, and/or how the desired fabrication result is intended to be used.

In some instances, the prompt may also describe features or aspects of the material that the desired fabrication result will be made from, or even expressly specify the material. The prompt may also describe joinery techniques for joining different components of the desired fabrication result together (e.g., dovetail, tongue and groove, mortise and tenon, rabbet joint, pocket joint, biscuit joint, or any other type of joinery technique now known or later developed that is sufficient for joining to components together).

In some embodiments, the prompt may include sensor data. For instance, the sensor data may include x-ray data and/or computer aided tomography (CT) data that shows the interior structure of an object that can be used as a basis for generating a design for the desired fabrication result. In one example, the sensor data may include a stream of x-ray and/or CT data obtained by rotating an object through an x-ray field to obtain information about the interior and exterior structure(s) of the object. In another example, the prompt may include biometric sensor data, such as from an x-ray of a human leg from which dimensional data can be extracted for generating a design for a cast, biomedical prosthesis, or other item.

The prompt in some embodiments may include a Computer Aided Design (CAD) file that has detailed information about the size and dimensions of an item that is used for generating a design for the desired fabrication result.

In some instances, the prompt may include a 3D scan of an object that is used for generating a design for the desired fabrication result. For example, the prompt may include a 3D scan of a human's hand along with a request (via text, audio, video, etc.) for "a video game joystick that has indentations that match the human hand's specific grip shown in the 3D scan." In another example, the prompt may include a 3D scan of an office desk, one or more images of a desk organizer(s), and a request (via text, audio, video, etc.) for "desk organizer similar to that shown in the image that will fit the office desk shown in the 3D scan."

In some embodiments, the prompt may include data from a virtual reality (VR) device. For example, the data from the VR device may include a stream of motion capture data. For instance, a human can put on VR gloves, and then draw or use hands to describe the desired fabrication result (or aspects thereof) in free space, and the data from the VR gloves is captured and used for creating the design for the desired fabrication result. In another example, the prompt may include sensor data from a VR device while a human rotates or otherwise manipulates a virtual object in virtual space to illustrate or describe the desired fabrication result (or aspects thereof).

The prompt in some instances may include one or more mathematical expressions or equations relating to the desired fabrication result (or aspects thereof). For example, if is required (or at least desired) for the fabrication result to have some curvature, radius, or other structural feature, the prompt may include a set of equations defining aspects of the curvature, radius, or other structural feature of the desired fabrication result, perhaps with one or more constants that limit aspects of the mathematical equations.

In still further embodiments, the prompt may include traditional blueprints or schematics that can be used for creating a design for the desired fabrication result. For example, the prompt may include a G-code (sometimes referred to as RS-274) programming language file, which is used by many CNC and 3D printer machines. In another example, the prompt may include Scalable Vector Graphics (SVG) code, motion planning file, or other CNC machine implementation file as an input upon which to base a design for the desired fabrication result. For instance, the prompt may include a design file (e.g., G-code, SVG, CAD, or other design file) for a reference bowl along with a request (via text, audio, video, etc.) for "a bowl that is like the bowl shown in the design files." Alternatively, the prompt may include the design file (e.g., G-code, SVG, CAD, or other design file) for a reference bowl along with a request (via text, audio, video, etc.) for "a lid for the bowl shown in the design files, where the lid has a picture of a medieval dragon etched on the top."

In some embodiments, the prompt may include thermal imaging data. Thermal imaging data could be included in a prompt where the desired fabrication result is a garment, and the thermal imaging data includes a scan of a human body from which dimensions for the garment can be extracted. Thermal imaging data could also be included in a prompt where the desired fabrication result is a fitting for a radiator or other heat emitting device, e.g., an insulation component where there thermal imaging data shows areas or regions where more (or less) insulating structure may be required (or at least desired). Thermal imaging data could be used in prompts for other desired fabrication results, too.

In other instances, the prompt may include a description (in text, voice, video, or similar) of step by step instructions that describe an order of designing and/or fabricating components in a particular order, which enables extraction information from the different steps and their ordered combination to either generate the ultimate fabrication result, or to determine how to generate the ultimate fabrication result.

In further embodiments, the prompt may include any one or more of and image, video, or 3D.obj file for two or more objects (e.g., a sphere and a block) and a request (via text, audio, video, etc.) for "a shape that would enclose the sphere and the block with the smallest amount of surface area."

The prompt in some embodiments may include map data, such as an ordinary map, a terrain map, Geographic Information System (GIS) data, or any other type of map data. In some instances, the map data can be used to estimate a height terrain, or a terrain map can be used to produce an ordinary map. For example, the prompt may include an image of a map of Seattle that shows the location of the famous Space Needle (and perhaps GIS data describing the location of the Space Needle) and a request (via text, audio, video, etc.) for "make a 3D engraving of the area surrounding the Space Needle in Seattle, and make 3D assembly object of the Space Needle that can be placed on the 3D engraving."

In some instances the prompt may include 3D scan data or a 3D.obj file for an actual solid object, e.g., a sphere, a box, a vase, or even a complex object like a chair, a decorative candlestick, or any other solid object. The 3D scan data and/or 3D.obj file for the solid object can be used to extract height data or other dimensions of the solid object that can be used to help define attributes of the desired fabrication result. For example, the prompt may include 3D scan data of a vase with a request (via text, audio, video, etc.) for "make a handle for a cleaning brush that will fit through the opening at the top of the vase and is long enough to be used with a brush at one end to scrub the interior surface at the bottom of the vase."

In yet another embodiment, the prompt may include a barcode, QR code, some other form of compressed data that encodes or represents some other object or data.

In yet another embodiment, the prompt may include computer code. For example, the prompt may include source code for a video game with a request (via text, audio, video, etc.) for "make a 3D model of each of the two main characters of the video game based on the source code."

In some instances, these machine-generated rendering instructions include and/or correspond to designs that can be viewed within a graphical user interface (GUI). Thus, for illustration purposes, these machine-generated rendering instructions are sometimes referred to herein as machine-generated (or machine-created) designs, or sometimes simply as designs. The machine-generated rendering instructions are used by computer numerically controlled (CNC) machines, such as CNC machines for laser cutting, laser drilling, laser ablation, laser engraving, laser machining, 1 three-dimensional (3D) printers, CNC machines that use cutting tools, and other types of CNC machines, to generate a rendered fabrication result based on the rendering instructions (where the rendering instructions are based on the desired fabrication result). In some embodiments, the CNC machine executes an implementation file to create a rendered fabrication result, where the implementation file includes the machine-generated rendering instructions.

Examples of CNC machines that could benefit from one or more aspects of the disclosed features include CNC Milling Machines, CNC Routers, CNC Lathes, CNC Drilling Machines, CNC Grinding Machines, CNC Plasma Cutters, CNC Water Jet Cutters, Woodworking CNC Routers, CNC Laser Cutters and Engravers, CNC Glass Cutters, CNC Punch Presses, Foam Cutting CNC machines, Wire Bending CNC machines, Threading CNC machines, 3D Printing CNC machines, Injection Molding CNC machines, Electrical Discharge Machining (EDM) CNC machines, Oxy-fuel CNC Cutters, Knee Mill CNC machines, Turning Center CNC machines, Swiss CNC Machines, Tape Cutting CNC machines, Stone Engraving CNC machines, Panel Sawing CNC machines, Shelf Drilling CNC machines, Horological Milling CNC machines, Profile Cutting CNC machines, Fabric Cutting CNC machines, Roll Forming CNC machines, Surface Grinding CNC machines, Coordinate Measuring CNC machines, Vertical Machining Center CNC machines, and/or Horizontal Machining Center CNC machines.

Laser-based CNC machines (sometimes referred to herein as laser cutters/engravers) operate by moving a laser beam (or similar electromagnetic emission) relative to a substrate/material to be machined, or alternatively, moving the substrate/material to be machined relative to the laser beam, thereby burning, cutting, ablating, vaporizing, melting, or otherwise removing portions of the material to be machined. Examples of laser CNC machines consistent with disclosed embodiments include, but are not limited to, laser CNC machines manufactured by Glowforge, Inc., such as the Glowforge Pro, Glowforge Plus, and/or Glowforge Aura™ Aspects of these commercially available laser CNC machines are shown and described in several U.S. Patent Applications assigned to Glowforge, including but not limited to (i) U.S. application Ser. No. 18/086,655, titled "Multi-Function Computer Numerically Controlled Machine," filed on Dec. 22, 2022, and currently pending; and (ii) U.S. Prov. App. 63/513,967, titled "Systems and Methods of Laser Fabrication," filed on Jul. 17, 2023, and currently pending. The entire contents of the U.S. Ser. Nos. 18/086,655; 63/513,967 applications are incorporated herein by reference.

Applying a laser beam to a substrate/material is sometimes referred to herein simply as applying a "laser" to the substrate/material, or similarly, controlling, applying, and/or using a "laser" to fabricate an object. This process is sometimes referred to herein as subtractive manufacturing. In operation, this process results in a design being rendered, for example by executing rendering instructions to fabricate (or produce) an object or shape cut from a piece of flat material, an object or shape cut from a piece of non-flat material (e.g., a block, cylinder, etc.), an engraving or etching on a piece of flat material, an engraving or etching a piece of non-flat material, or any other type of rendering that can be fabricated by a CNC machine. In connection with moving the laser beam (including steering the laser beam via one or more mirrors and lenses) relative to the material to be machined (or moving the material to be machined relative to the laser beam), it is desirable to have precise control over the movement, alignment, and positioning of the laser over the material to be machined because a more precisely controlled laser enables the CNC machine to produce a more precisely machined material and thus, a higher quality end product as compared to CNC machines with less precisely controlled lasers.

The precise control of the laser over the material facilitates producing a physical rendering of a desired design (sometimes referred to herein as rendering a design), as described above. However, not all designs are suitable for rendering. And some designs may be better suited to being rendered via some machines and/or on some materials, but perhaps not suited for rendering via other machines and/or on other materials.

As mentioned above, embodiments disclosed herein include using a software engine (e.g., an artificial intelligence engine) to generate rendering instructions for execution by CNC machines, including laser CNC machines. The rendering instructions are based on and/or correspond to machine-generated designs that are generated by the software engine. In operation, the software engine generates the machine-created rendering instructions/designs based on natural language descriptions of desired fabrication results. Further, a CNC machine (e.g., a laser CNC machine) executes the rendering instructions to generate a rendered fabrication result according to the rendering instructions, which are based on the desired fabrication results.

In some instances, a desired fabrication result includes (i) a desired subject and (ii) one or more fabrication parameters.

Examples of a desired subject include "a forest scene," "a smiley face," "a guinea pig riding a horse," "a cone," "a sheep," "a box," or any other subject.

Examples of a fabrication parameters include, but are not limited to, etching on a flat surface, engraving on a flat surface, cutting on a flat surface, generating a flat object, etching on a non-flat surface, engraving on a non-flat surface, cutting on a non-flat surface, generating a non-flat object, or generating an object for assembly (sometimes referred to herein as a 3D assembly object), or any other form or format of a rendered fabrication result capable of being produced by a CNC laser machine, any other type of CNC machine (including the CNC machines disclosed herein), or any other type of machine that may not traditionally be strictly considered a CNC machine such as inkjet printers or stereolithography machines. In some examples where the laser CNC machine is a hybrid product, such as a laser CNC machine with an inkjet printer head, a laser CNC machine with a 3D printer, the fabrication parameter might specify the hybrid capabilities of the machine. Similarly, the laser CNC machine is one of a set of other machines, such as separate 3D printers or inkjet printers, where the set of machines can be used to generate fabrication results, then the fabrication parameters may include the capabilities of the set of machines. For example, the design might in fact be multiple designs that can be rendered with different operations performed by the different machines in the set. Examples of such designs include laser-cut wooden beams with 3D-printed plastic connectors, or a wooden diorama with an inkjet printed paper background that slides into the wooden diorama.

Accordingly, examples of natural language descriptions of desired fabrication results that include a subject and a desired format include "etching of a forest scene on a flat surface," "engraving of a guinea pig riding a horse on a flat surface," "engraving of Mount Everest for a 3D object with a curved surface," "3D cone object," "3D assembled sheep," "3D assembled block." Each of these examples include some desired design along with one or more fabrication parameters associated with a desired form or format of the final rendering.

Figure 10A:
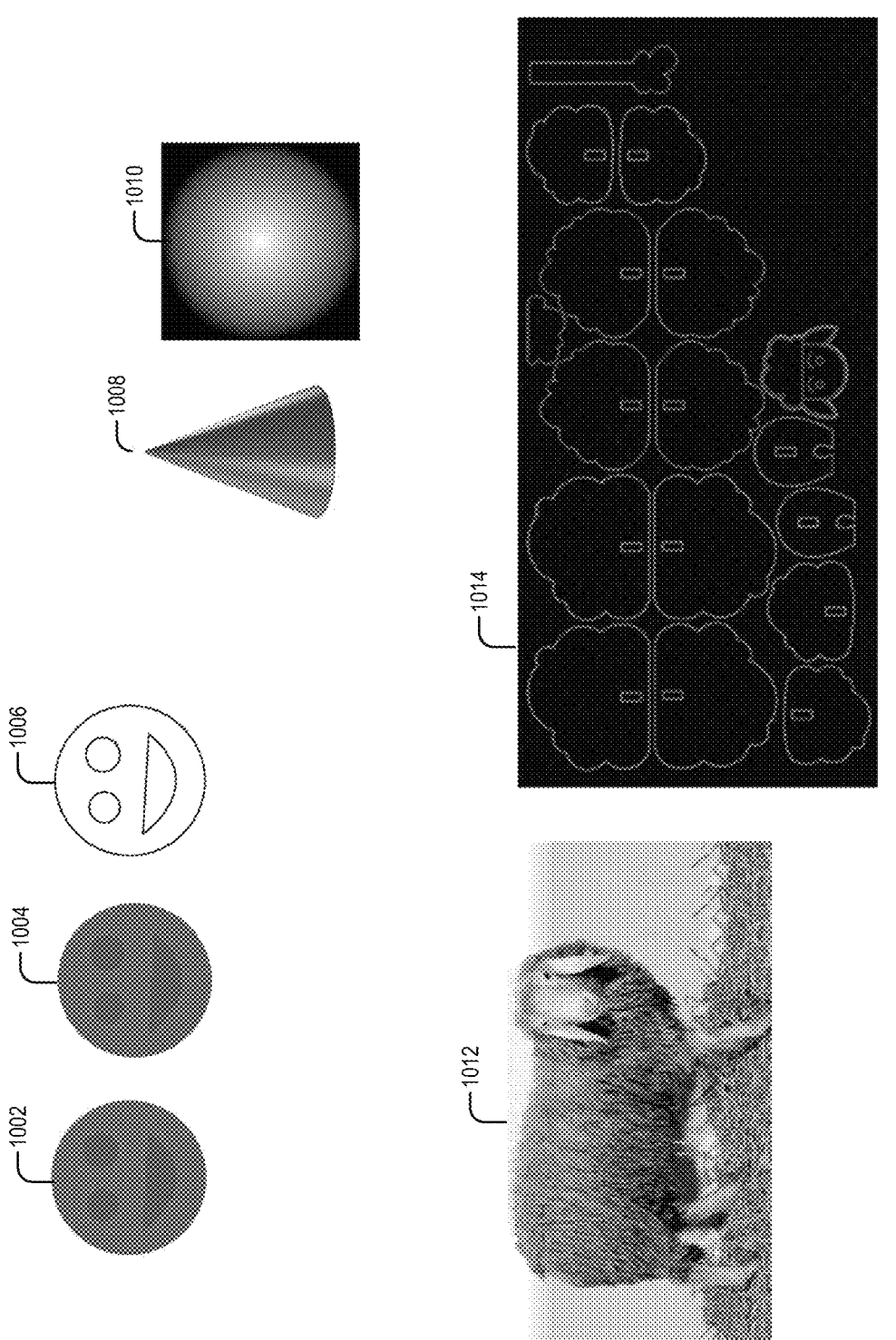
FIG. 10A shows several example graphical representations of machine-created images and machine-created designs and rendering instructions for illustration purposes.
Figure 10B:
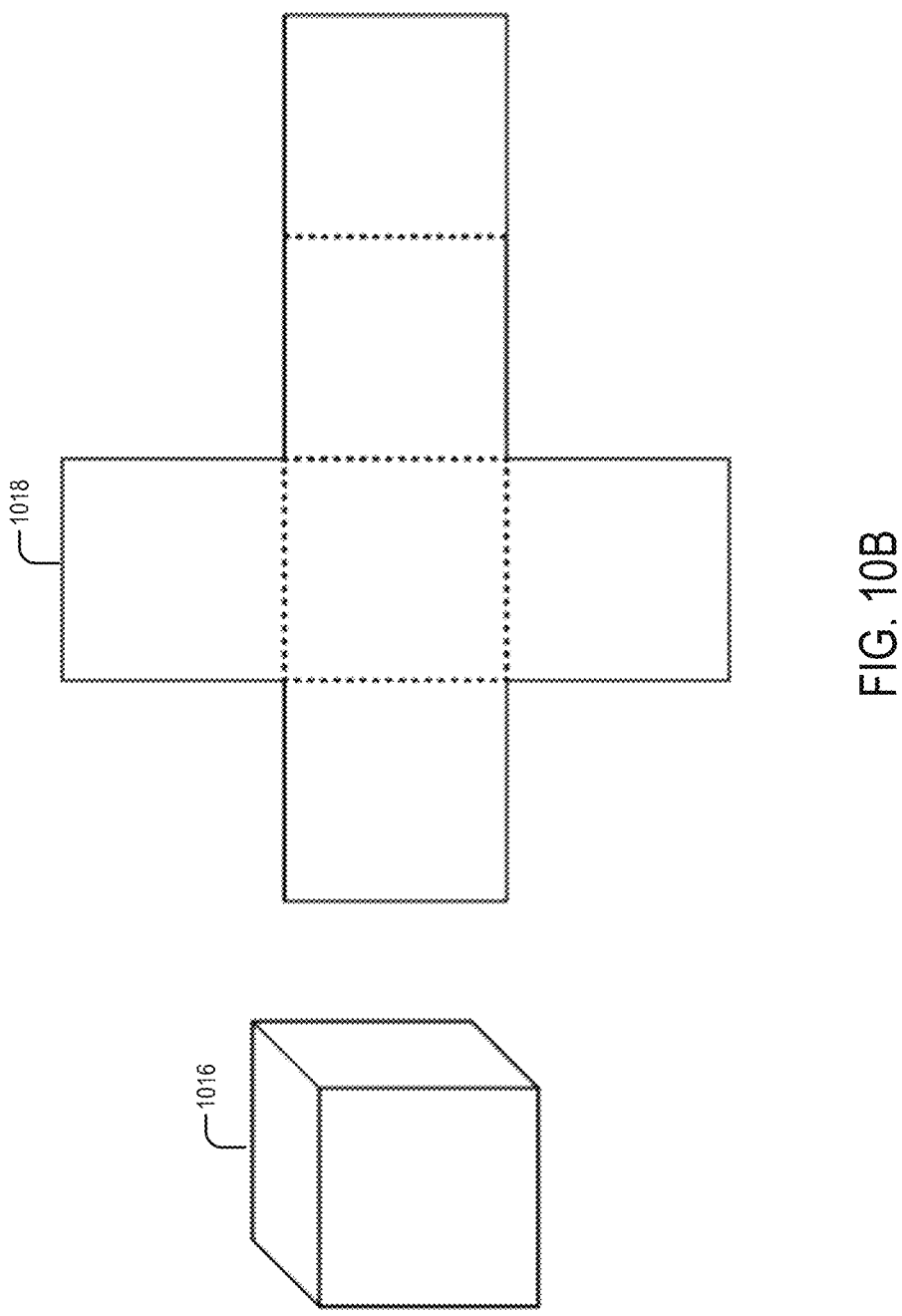
FIG. 10B shows example graphical representations of machine-created rendering instructions and a prospective fabrication result for illustration purposes.

FIGS. 10A and 10B show examples of differences between images generated by a typical AI image-creation engine and designs created by AI design-creation engines according to some embodiments.

In one simple example for illustration purposes, a typical AI image-creation engine may return a green-and-red smiley face image 1002 having red eyes and a red mouth for implementation. However, when image 1002 is rendered via a typical laser cutter/engraver onto a material, the laser cutter/engraver might render such an image as a low contrast smiley face 1004 on the material, which would look very different than the green-and-red smiley face image 1002 created by the AI image-creation engine.

One reason for the disconnect between the green-and-red smiley face image 1002 created by the typical AI image-creation engine and the low contrast smiley face 1004 rendered on the material by the laser cutter/engraver is that typical AI image-creation engines generally encode information as color whereas typical laser cutter/engraver machines generally do not translate color information into colors on the final product. For example, typical AI image-creation engines use red and green to indicate colors of a stoplight, while in a typical laser cutter/engraver, red and green might each represent an engraving with certain depth or intensity, often the same depth and intensity, with the result bearing no relation to the actual colors or red and green. In contrast to image 1002, design 1006 is better suited for implementation via a typical laser cutter/engraver onto a material than image 1002.

In a more complicated example, a typical AI image-creation engine may return an image similar to image 1008 in response to a request for a "3D cone." But if the user wanted to fabricate a physical cone from a material (e.g., a sheet, block, cylinder, or other material), image 1008 would be unsatisfactory—design 1010 would be a much better option. A laser CNC machine can execute rendering instructions based on design 1010 (which maps brightness to height, where the central white pixel is the topmost point of the cone). However, design 1010 looks very different than image 1008. Indeed, to a human viewer, design 1010 looks more like a sphere than a cone.

In a further complicated example, a typical AI image-creation engine may return an image similar to image 1012 in response to a request for a "3D sheep." However, if the user wanted to fabricate a 3D assembled sheep with a laser CNC machine, image 1012 would be unworkable. Design 1014 illustrates an example of a good design for rendering such a 3D assembled sheep via a laser CNC machine. Rather than an image of sheep (like image 1012), design 1014 includes a set of pieces that can be fabricated from a flat material and then assembled into a three-dimensional sheep. Design 1014 which is suitable for fabricating a 3D assembled sheep looks very different than image 1012 of a sheep.

FIG. 10B shows a similar example. A typical AI image-creation engine may return an image similar to image 1016 in response to a request for a "3D box." However, if the user wanted to fabricate an actual 3D box with a laser CNC machine, image 1016 would be unworkable. Design 1018 illustrates an example of a good design for rendering an actual 3D box via a laser CNC machine. Rather than an image of box (like image 1016), design 1018 includes a shape to be cut from a flat material (e.g., cardboard, wood veneer, or other material) by a laser CNC machine along with line etchings that create creases along which to fold the shape to form the 3D hollow box. These lines along the outside of the shape and the dotted lines on the shape correspond to the rendering instructions that a CNC machine executes to render design 1018, where the solid lines correspond to where the laser will cut through a flat material and dotted lines correspond to where the laser might etch the surface of the flat material to provide crease lines for folding the cut piece into the 3D box.

After the laser CNC machine executes the rendering instructions based on design 1018 to cut the shape with the etched crease lines from the material, the resulting shape can be folded along the creases to create the 3D box. Design 1018 suitable for fabricating a 3D box looks very different than image 1016 of a 3D box. Image 1016 shows a prospective fabrication result of design 1018 after the shape has been folded along the creases.

Designs and images 1010, 1014, 1016, and 1018 show examples based on a fairly concise "desired fabrication result" for illustration purposes. However, more elaborate "desired fabrication results" could be specified. For example, based on a natural language description of a desired fabrication result of "3D hollow box with etching of flowers on the outside faces of the box," an AI design-creation engine according to some embodiments might generate a design similar to design 1018, but with floral patterns on the outside faces. In another example, based on a natural language description of a desired fabrication result of "Box big enough to hold 2 decks of cards with a dragon on the lid," an AI design-creating engine according to some embodiments might generate a design similar to design 1018, but with a lid, a dragon pattern on the outside face of the lid, and a cut-out size large enough to store 2 decks of cards inside the box once the box has been assembled. That design might include bitmap images (such as the dragon) which can be engraved; sizing instructions (such as a notation indicating the length of each line in units of distance); additional fabrication instructions (such as a direction to complete the cutting operation before beginning the engraving to minimize scorching on the material), power settings (such as required to properly render the dragon image), 3D angular instructions (instructing the laser to vary its power and/or path to bevel the box edges), and any additional information beneficial to produce the final product.

In addition to using AI engines configured for image generation to create rendering instructions for designs like the ones described with reference to FIGS. 10A and 10B, some embodiments may additionally or alternatively include using AI engines configured for text generation to create rendering instructions.

One example of an AI text generator is described in Alec Radford et al., "Improving Language Understanding by Generative Pre-Training, available at https://s3-us-west-2.amazonaws.com/openai-assets/research-covers/language-unsupervised/language understanding_paper.pdf). In some cases, AI text generators are trained to create text that is semantically meaningful to a computer, instead of to a human. The OpenAI Codex system available at https://openai.com/blog/openai-codex/is an example of such a system.

These AI code generators are a specialized form of text generators that have additional training to optimize them for producing code for interpretation by a computer. For example, a user might start writing a loop, and the AI generator can complete the creation of the loop. Many modern AI text generators such as GPT-4 from OpenAI and Claude from Anthropic are capable of code generation without additional training, as well.

Some forms of render files are in fact software code, or hybrids of software code and images. For example, SVG and PDF files can contain exclusively code for vector images, or can contain a hybrid of code and bitmaps for vector and raster images in the same file.

Figure 10C:
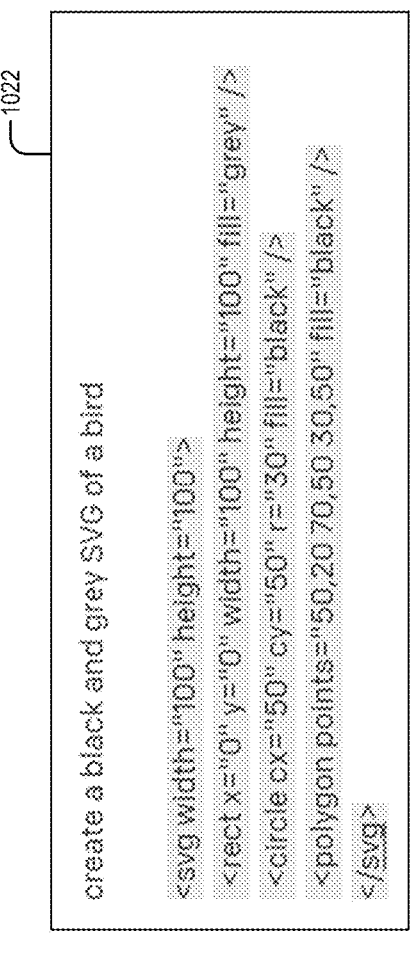
FIG. 10C shows an example representation of machine-created rendering instructions and a prospective fabrication result for illustration purposes.
Figure 10C:
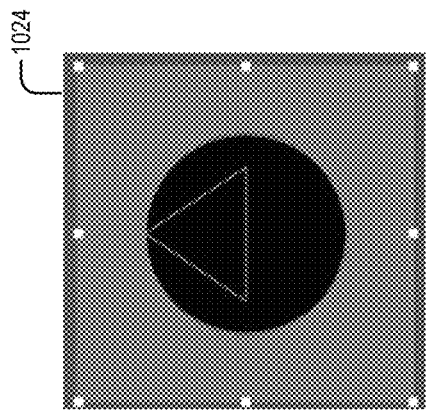

In general, AI text generators are capable of producing semantically valid render files that execute properly, and appear to the human reader to be reasonable with the requested shapes and colors. For example, if requested to create a black and grey SVG of a bird, an AI text generator may create a valid SVG using the colors black and grey and with shapes such as circles and lines that could be used to compose a bird. However, typical AI text generators are trained on code structure, semantics, and human readability—meaning they do not understand the output that the CNC machine will generate from their work. The image corresponding to the SVG code may not look anything like a bird. For example, FIG. 10C shows a block 1022 containing SVG code generated by an AI text generator in response to a request to "create a black and grey SVG of a bird," and block 1024 shows the image corresponding to the SVG code in block 1022.

But while some AI text generators may be able to create properly structured code, current AI text generators are neither trained nor able to create code for use in rendering a physical product (sometimes referred to herein a fabrication result). More particularly, current AI text generators are not able to reliably produce instructions that can be used by a CNC machine to generate a fabrication result that looks like any specific object or item (e.g., a bird in the example shown in FIG. 10C).

Thus, neither current AI image-generation engines nor AI text-generation engines are able to consistently generate satisfactory (or even workable) designs from natural language inputs that can be used to generate rendering instructions for a laser CNC machine (or other rendering machine) to generate a rendered fabrication result.

To overcome the above-described and other shortcomings of existing systems, some embodiments disclosed and described herein include (i) receiving a natural language description of a desired fabrication result and (ii) causing one or more software engines to generate rendering instructions based on the natural language description of the desired fabrication result.

In some embodiments, the natural language description of the desired fabrication result includes a desired subject and one or more fabrication parameters.

In some instances, the natural language description of the desired fabrication result is provided to a large language model (LLM) or other AI model, which in turn, uses the natural language description of the desired fabrication result to generate rendering instructions.

When executed by a laser CNC machine, the rendering instructions generated by the software engine (e.g., which may comprise an AI model) cause the laser CNC machine to generate a rendered fabrication result based on the desired fabrication result. In some instances, the output of the software engine comprises the rendering instructions. In some instances, the output of the software engine comprises one or more images that can be used to generate the rendering instructions. In some instances, the output of the software engine comprises rendering instructions and a corresponding design that is displayable via a GUI, thereby enabling selection and/or approval of the design by a CNC machine user prior to the laser CNC machine's using the rendering instructions to generate the rendered fabrication result.

In addition to generating the rendering instructions, some embodiments also include causing the laser CNC machine to execute the rendering instructions to generate the rendered fabrication result. Some embodiments implement one or more of the following techniques in connection with generating rendering instructions based on a natural language description of a desired fabrication result.

Aspect 1: Some embodiments include training an AI engine (sometimes referred to herein as an AI design-creation engine, a generative AI model, or an AI text-creation engine) with training data comprising (i) fabrication result descriptions and (ii) rendering instructions (sometimes referred to herein as designs) corresponding to the fabrication result descriptions. In operation, training of an AI engine (e.g., AI design-creation engine, generative AI model, AI text-creation engine, AI image-creating engine, or similar) is performed by an AI engine developer or operator. In some instances, the laser CNC machine manufacturer (e.g., Glowforge, Inc.) may train (and then operate) an AI engine that can be used by end-users of the laser CNC machine for generating rendering instructions (or portions of rendering instructions). In other instances, a software company (e.g., Open AI, Microsoft, or other software company) may train (and then operate) an AI engine that can be used for generating rendering instructions (or portions of rendering instructions). In some scenarios, the generative AI model may be initially trained with more general text and images, and then "fine tuned" with the (i) fabrication result descriptions and (ii) rendering instructions (sometimes referred to herein as designs) corresponding to the fabrication result descriptions. Low-Rank Adaption (LoRA) is one example fine-tuning method that could be used. For instance, a trained model may be fine tuned to modify its outputs. In an example, a base model like GPT-4 can be fine-tuned with Scalable Vector Graphics (SVG) and descriptions of the SVG files, which would make the fine-tuned model better able to generate SVGs.

In some instances, the type of training data used to train the AI model depends on the type of output desired from the AI model. For instance, an AI model for generating Scalable Vector Graphics (SVG) design files may be trained with training data comprising SVG designs and descriptions thereof. Similarly, an AI model for generating 3D assembly design files may be trained with data comprising 3D assembly designs and descriptions thereof.

For example, and with reference to designs 1006, 1010, 1014 and 1018, fabrication result descriptions used during training such an AI engine may be labeled "Smiley Face Engraving," "3D Cone Object," "3D Assembly Sheep fabricated from 3 mm acrylic," and "3D hollow box." The training data may also include other metadata relating to implementing the designs, including a type of fabrication output. Examples of types of fabrication outputs include etching on a flat surface, creating a cutout object, etching on a 3D object (or non-flat object), creating a 3D object (or non-flat object), creating an object for assembly (e.g., an object to be assembled from several flat and/or non-flat components) or a combination of fabrication outputs (e.g., creating a non-flat object with etching on the surface, creating a flat object with etching on the surface). Other types of fabrication outputs are possible as well. A data set such as the Glowforge design catalog, which contains thousands of SVG files that are used to fabricate 3D objects plus descriptions of those 3D objects, would be an excellent example of a training data set.

In operation, an AI engine (e.g., a generative AI model) can be trained with fabrication result descriptions that include labels with descriptions that a typical human might give upon viewing a final physical rendered fabrication result. In some embodiments, the training data used for training the AI engine may or may not be human-interpretable, but will result in a particular fabrication result. The labels/descriptions for a particular fabrication result description may not necessarily correspond to how a human would visually interpret images or other information in the file, but instead, how a human would describe the fabrication output, i.e., how a human would describe the final physical rendered fabrication result that a rendering machine has rendered according to the rendering instructions corresponding to fabrication result description. For example, compare image 1012 (of a sheep) with design 1014 (of a design for a 3D assembled sheep).

The fabrication result descriptions in some instances may additionally include labels or other metadata describing aspects of technical requirements of a CNC machine to create the fabrication result. For example, in the context of a laser CNC machine, the labels may include technical requirements for a design based on CNC machine capabilities such as, for example, (i) minimum laser power level(s) required to fabricate the design (which may vary depending on the material from the design is to be fabricated from), (ii) dimension constraints, such as, for example, the maximum size of the material bed, or perhaps minimum area via which the laser CNC machine must be able to apply laser power to material placed within the material bed, (iii) CNC machine capabilities, such as, for example, passthrough capability to accommodate materials larger than the material bed for larger fabrication jobs, (iv) different types of materials supported by the laser CNC machine. Designs can be tagged or labeled with these and other technical requirements, since the technical capabilities of a particular laser CNC machine may be appended to the natural language description of the desired fabrication result to be fabricated by that laser CNC machine.

In some instances, and as mentioned briefly above, the files used for training the AI model may include bitmap file formats such as JPG or PNG, vector formats such as SVG or PDF, CAD formats like DXF or DWG, 3D formats such as .OBJ or .STL, software such as g-code, or any other type of file that can be used to represent a fabrication result description and/or rendering instructions that is sufficient communicate fabrication instructions to a CNC machine, e.g., a laser CNC machine (e.g., a laser cutter/engraver or other type of laser-based CNC machine), or any other type of CNC machine.

For example, as mentioned above, in some instances the generative AI model is trained with training data that includes SVG files. An SVG file is an XML-based vector image format for defining two-dimensional graphics. In particular, an SVG image is defined in a vector graphics format and stored as an XML text file. Accordingly, SVG images can be scaled in size without loss of quality, and SVG files can be searched, indexed, scripted, and compressed, which makes them well suited for use as training data for generative AI models. Any other suitable vector file format now known or later developed could be used in addition to or instead of SVG, including but not limited to Encapsulated PostScript (EPS), Portable Document Format (PDF), Adobe Illustrator (AI), Windows Metafile Format (WMF), Drawing Exchange Format (DXF), and/or Corel-DRAW Image (CDR). Many of these are interchangeable, and a design might be able to be translated between them in a lossless or lossy way. They may be translated before training, or an AI model trained on one file type might be capable of generating other file types.

In some instances, the text-data in some types of files can be additionally or alternatively used for training the AI model. For example, computer-executable text in an SVG render file that a laser can use to fabricate a stackable 3D cutout of a sheep, labeled with "SVG of a stackable 3D cutout of a sheep" (similar to design 1014 in FIG. 10A), can be used for training an AI text-generation engine.

The training may include other modalities. The training data might include video of finished objects and then the SVG render file that created it, allowing the model to take a video of an object and create a render file that could produce it. The training data might include an audio description of the finished object. The input might include a CAD model, for example "This render file is for a monitor stand that fits the monitor described by this CAD drawing."

In some instances, the training data may include one or more images of individual fabrication results captured by cameras located within CNC machines along with the design and corresponding rendering instructions (including computer-readable code) used to generate those individual fabrication results.

In some instances, an AI engine can be trained with training data based on the interaction of AI text generators and AI image recognizers. For example, the text generator may be used to create an SVG. The SVG created by the AI text generator can then be converted to an image format, either by rasterizing it as a bitmap, or by fabricating it with a rendering tool such as a laser cutter and taking a photograph of the rendered result. The output of the SVG file created by the AI text generator (i.e., the rasterized bitmap or the photograph of the rendered result) is scored as to its resemblance to the description of the desired result. That score can be fed back to the AI text generator to help improve how the AI text generator creates new SVG files based on user inputs.

Some embodiments include modifying a general-purpose neural network trained on pictures and visual descriptions via training data to introduce and modify the behavior of the general-purpose neural network to produce outputs that are more appropriate for fabrication via a laser CNC machine. For example, some embodiments include modifying a text-to-image AI engine to generate designs for implementation by a laser CNC machine based on desired fabrication results. Modifying existing networks via training data in this respect can be implemented via any of several approaches, including but not limited to approaches described in any one or more of (i) Rinon Gal et al., "An Image is Worth One Word: Personalizing Text-to-Image Generation using Textual Inversion," available at https://textual-inversion.github.io/, (ii) the co:here platform available at https://docs.cohere.ai/, (iii) Nataniel Ruiz et al., "DreamBooth: Fine Tuning Text-to-Image Diffusion Models for Subject-Driven Generation," available at https://dreambooth.github.io/, and/or (iv) David Ha et al., "HyperNetworks," available at https://arxiv.org/abs/1609.09106. For example, an existing text-to-image AI engine could be modified to accept design files (e.g., vector files) as training data.

Some embodiments may additionally or alternatively include training an AI design-creation engine using data comprising (i) fabrication result descriptions and (ii) rendering instructions corresponding to the fabrication result descriptions. For example, in some embodiments, the data used for training the AI model may include rendering instructions that have been used by laser CNC machines to successfully generate physical fabrication results. In operation, the rendering instructions used for training may include images as well as text-based computer-executable instructions as described above.

One aspect of the fabrication result descriptions used for training the AI design-creation engine includes the form of the desired fabrication output. As mentioned above, examples of fabrication include cutting, engraving, scoring, and/or etching on flat surfaces, non-flat surfaces, as well as cutting out flat and/or not flat objects from material, including cut-out objects that can then be assembled into a finished result. The disclosed embodiments are equally applicable to any other format of a rendered fabrication result capable of being produced by a CNC laser machine now known or later developed. In some embodiments, the data used for training the AI design-creation engine may additionally include data having labels, tabs, or other descriptors associated with one or more characteristics of materials via which laser CNC machines have successfully implemented physical renderings, such as the type of material (e.g., wood, plastic, metal, etc.), shape of material (e.g., cylindrical, flat, block, etc.), or other material characteristics.

Some embodiments may additionally include using one or more tools with one or more AI engine(s) in connection with generating rendering instructions. In operation, certain tools can be used for certain types of tasks. In particular, certain tools can be used to generate rendering instructions for certain types of rendering tasks, such as etchings, cutouts, 3D assembly, and so on. In operation, the AI engine can be trained to identify scenarios where the natural language description of the desired fabrication result explicitly or implicitly calls for a certain type of rendering task for which a particular tool may be employed. In operation, the tools may be accessed via plug-ins, Application Programming Interfaces (API), function calls, or any other suitable method for invoking a software tool or routine now known or later developed. In some instances, keywords or phrases can be extracted or abstracted from the natural language description of the desired fabrication result and then either or both (i) used for selecting one or more tools to use for generating rendering instructions and/or (ii) provided to a particular tool to generate at least some aspects of the rendering instructions.

For example, if the natural language description of the desired fabrication result includes some type of etching (either expressly or impliedly), the AI engine may generate a design suitable for etching. The system can then provide the generated design to a tool that is configured to generate rendering instructions for an etching based on the generated design. One example of a design tool that can be used for generating rendering instructions for an etching is the Magic Canvas™ design tool provided by Glowforge. In operation, the Magic Canvas tool can be used to both generate images that are suitable for etching with a laser CNC machine and generate rendering instructions for etching the generated image.

An example of another design tool that can be used for generating rendering instructions for etchings and cutouts is the Glowforge Catalog, which includes thousands of designs for laser fabrication. The Glowforge Catalog is one source for high quality training data, but it also provides the ability to customize and/or resize designs and templates in manners that are suitable for etching and cutting with a laser CNC machine. An example of another design tool is the Glowforge web-based software application (app.glowforge.com) that can be used to generate designs, manipulate designs, and generate rendering instructions for processing by a laser CNC machine.

In some scenarios, the design tools may be generative AI models that are used to generate different aspects of a design, e.g., using a first generative AI model to generate a box, and then using a second generative AI model to generate a design to be etched on the lid of the box. For example, if the natural language description of the desired fabrication result includes a type of 3D assembly design (either expressly or impliedly), the system can select a design tool for generating rendering instructions for 3D assembly designs. One type of 3D assembly design is a box, and one example of a design tool that can be used for generating rendering instructions for a box is boxes.py, which is an open source box generator written in the Python programming language. The boxes.py tool can be used to generate 3D box designs of all types of shapes and configurations from square boxes, round boxes, rectangular boxes, boxes with hinged lids, boxes with removable lids, boxes with sliding drawers or other sliding members, boxes with sub-divided compartments, irregular boxes, and so on. Another example of a design tool that can be used for generating rendering instructions for a box and also for other 3D assembly designs and other cutout designs is cuttle.xyz, In operation, the designs from boxes.py and/or cuttle.xyz include sets of parts that can be cut out by a laser CNC machine from a flat piece of wood, acrylic, or other suitable material, and then assembled by the laser CNC machine user. Both tools enable parameterization of designs and templates in ways that are suitable for fabrication by laser CNC machines.

Aspects of invoking different tools in connection with generating rendering instructions are described further herein. For instance, the generative AI model may additionally generate assembly instructions for either humans to follow or instructions for other machines to follow (e.g., instructions for robot gripper machines or similar).

Aspect 2: Some embodiments include the AI engine creating a design in response to a query. The natural language description of the desired fabrication result is sometimes referred to as a "prompt." In some disclosed embodiments, this prompt (i.e., the natural language description of the desired fabrication result) is used to create a query. The prompt may include other information as well, such as images, video, audio, sensor data, or any other data disclosed and described herein with respect to prompts.

Sometimes, the natural language description of the desired fabrication result and the query might be exactly the same. However, in some instances, words and/or phrases are extracted from or abstracted from the prompt and combined with other data to generate the query that is provided to the design creation engine.

For example, in some embodiments, the query comprises at least a portion of the natural language description of the desired fabrication result (which may include one or more desired subjects and one or more desired fabrication parameters). In some embodiments, the query may additionally include one or more rendering parameters. The one or more rendering parameters may include a rendering machine type and/or one or more aspects of a material upon which or from which the desired fabrication result is to be generated. In some instances, these rendering parameters may be added to the natural language description of the desired fabrication result (i.e., the prompt) based on (i) the type of CNC machine for which the rendering instructions are to be generated and/or (ii) the material from which the design is to be fabricated from.

For example, if a CNC machine user has a particular type or model of laser CNC machine, then aspects of the user's particular type or model of laser CNC machine can be added to the natural language description of the desired fabrication result provided by the laser CNC machine user to create the query provided to the design creation engine. Similarly, if the laser CNC machine has detected that a particular type of material has been placed into the material bed (e.g., via scanning a barcode on the material, analyzing an image of the material placed on the material bed of the laser CNC machine, detecting an RFID chip embedded in the material, or other suitable material detection method now known or later developed), then that particular material type can be added to the natural language description of the desired fabrication result provided by the laser CNC machine user to create the query provided to the design creation engine.

In some embodiments, the query may additionally or alternatively include one or more images that can be used individually or in combination with the natural language description of the desired fabrication result. For example, the query may include image 1012 of a sheep (FIG. 10A) along with a natural language description of "make a 3D assembly object of this." In some instances, the image 1012 may be provided to an image classifier (or similar software application) that determines that image 1012 is an image of a sheep. In other instances, the image 1012 may be provided to an AI engine configured to generate a detailed description of the image 1012, e.g., the Azure AI Vision tool provided by Microsoft (available at https://portal.vision.cognitive.azure.com/gallery/imageanalysis), which can analyze images and generate text-based descriptions of images. The text-based description of the image (e.g., image 1012) can be combined with the natural language description of the desired fabrication result to generate the prompt/query provided to the AI engine(s) for generating rendering instructions and/or generating a design that can be used to generate rendering instructions. In other instances, a multimodal AI may be trained to directly comprehend the image of a sheep with a file and be able to generate a render file of a 3D sheep from it.

In other embodiments, an image can be included as a mask that forces the generated image to conform to the mask. For example, an image of a phone cover with cutout for the camera lens and a logo can be provided to the AI engine to constrain the design to fit the shape of the phone cover without generating any portion of the image in the cutout area. For example, an image having any of the shapes shown and described with reference to FIG. 6 or any other shape can be used as a mask within which to constrain a design, including the designs shown and described with reference to FIGS. 7A and 7B.

In some embodiments, the cutout areas of the mask may be solid white (or solid black). In operation, making the cut areas solid white (or perhaps solid black) may force (or encourage) the portion of the image in that cutout area to be white (or black). Further, in some embodiments, the instructions for the CNC machine may include instructions to remove material within cut out areas (e.g., the perimeter of the cutout areas may be designated to be "cut").

Figure 7A:
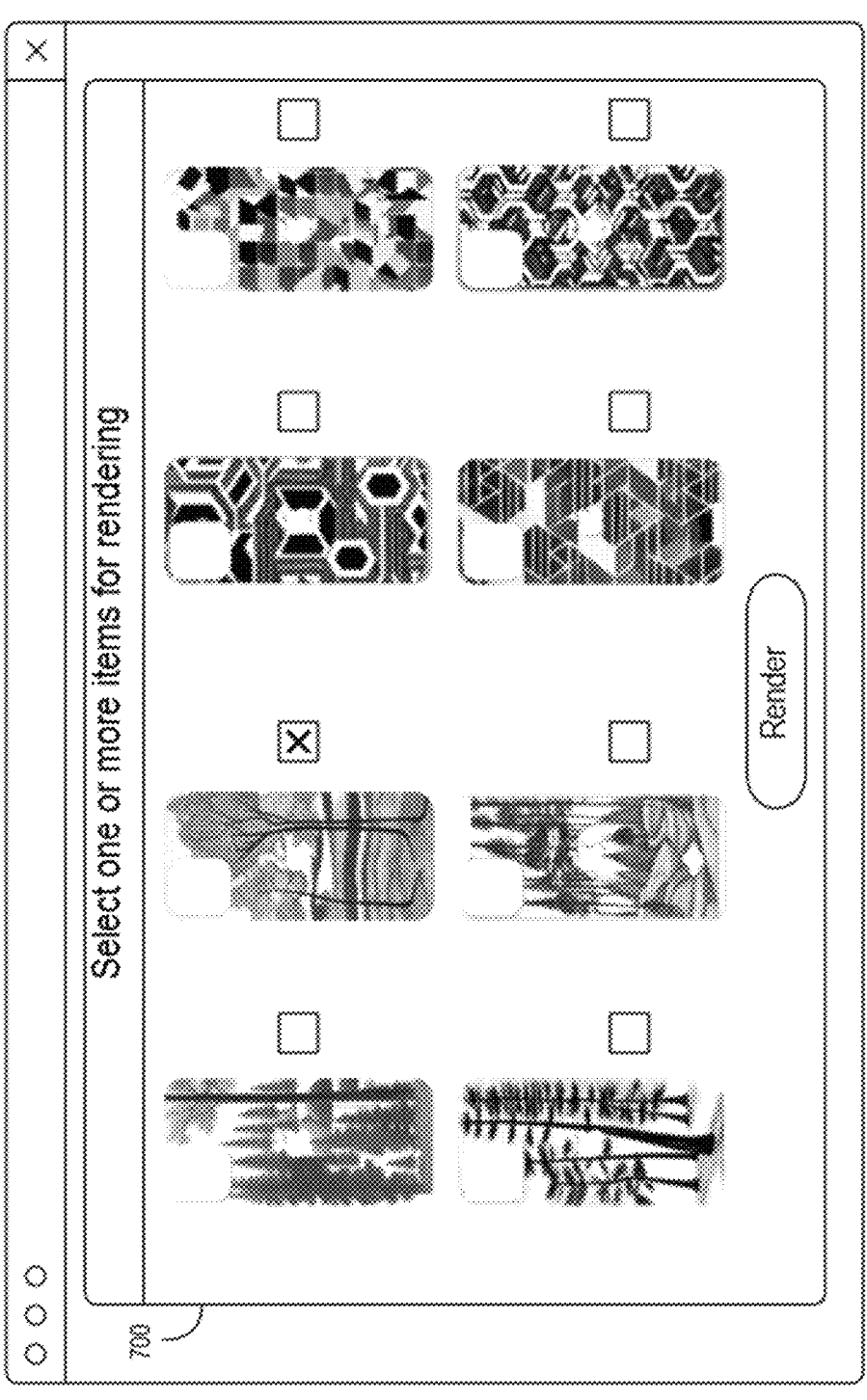
FIG. 7A shows a GUI that shows different designs rendered on an article, in accordance with some example embodiments.
Figure 7B:
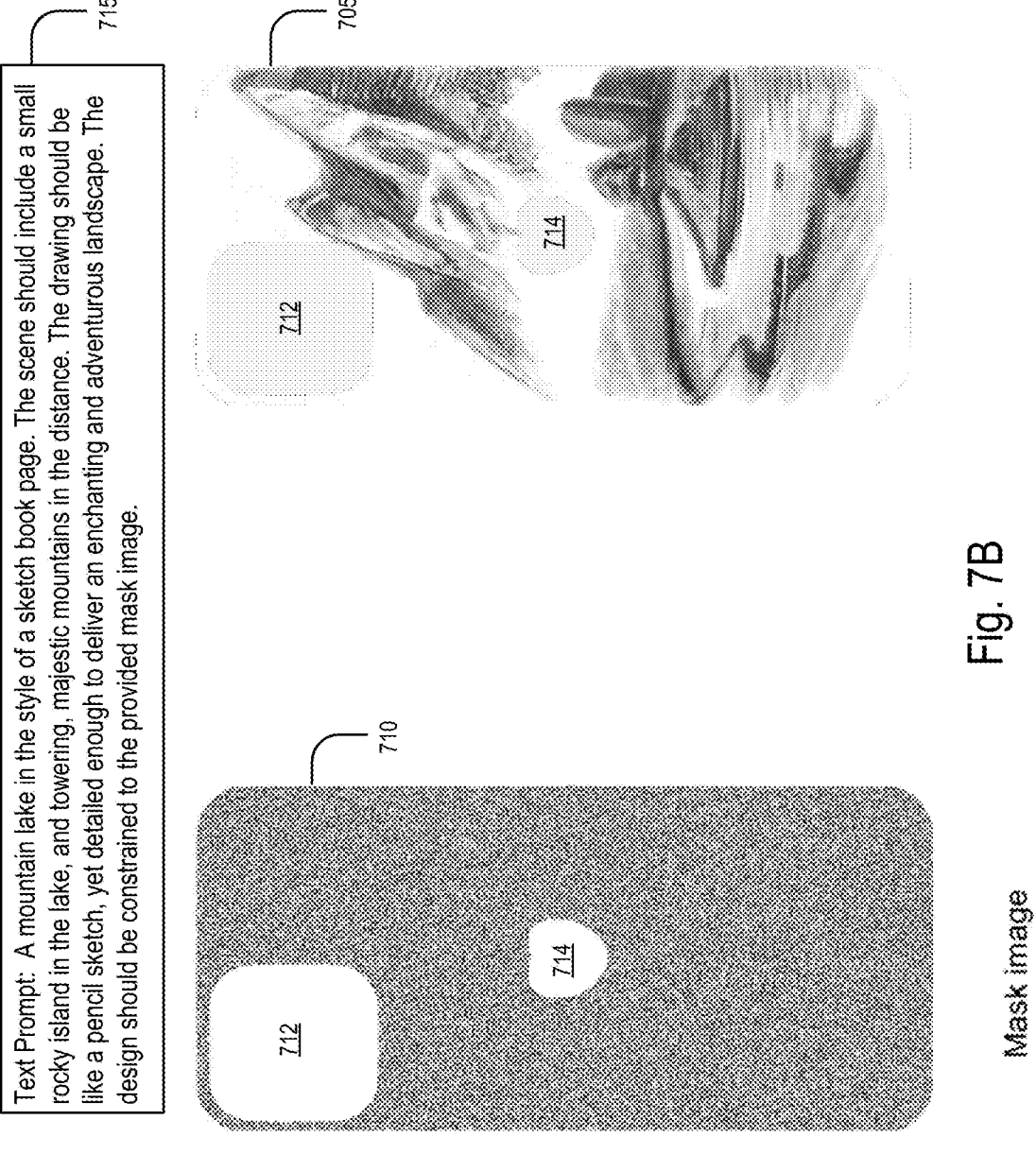
FIG. 7B shows an example design implemented within a mask in accordance with some example embodiments.

FIG. 7B shows an example design 705 implemented within a mask 710 in accordance with some example embodiments. In operation, the mask image 710 is provided with the text prompt 715. As shown in the example, the design 715 is constrained to the outline of the mask image 710 and includes the "cut outs" 712 and 714 appearing in the mask image 710. In the example mask image 710, the mask image has Gaussian noise in the areas where the desired image (i.e., the mountain lake image) is to be implemented. In embodiments that use Gaussian noise for the mask image 710, the generative AI model uses the Gaussian noise as a more even distribution of change from where to seed the design as compared to embodiments that may use solid black or solid white for the mask image 710.

For example, in some instances when solid black is used for the mask image 710, the artwork created by the generative AI model may trend toward darker colors, and when solid white is used for the mask image 710, the artwork created by the generative AI model may trend toward lighter colors. By contrast, in some instances where Gaussian noise is used for the mask image 710, the artwork created by the generative AI model may tend to include a more diverse set of colors because of the random colors within the Gaussian noise. And at least in some scenarios, the mask image 710 is formed from Gaussian noise, the generative AI model may be able to generate artwork faster and more efficiently as compared to instances where the mask image 710 is solid black or solid white.

In further embodiments, the image (or portions thereof) can be included with the query for use in generating the rendering instructions. For example, an image (e.g., 1012) can be included with the prompt/query and used in connection with generating a design (e.g., design 1014), which can in turn be used to generate rendering instructions.

In still further embodiments, the query may additionally include or alternatively include data representing a continuous vector in a latent space of the AI model used by the AI engine. The additional data directs the AI engine to make it more likely to produce results that are effective for rendering rather than for visual viewing. In some instances, generating the query includes appending the data representing the continuous vector for use by the AI engine in generating the rendering machine implementation instructions. In operation, this additional data has the effect of steering the AI engine toward designs that are better able to be rendered by a particular type of rendering machine, e.g., a laser CNC machine.

In some instances, tokens, labels, or other indications or descriptors might be appended to the natural language description of the desired fabrication result that represent a continuous vector in the latent space indicating that the AI engine must generate a design in which the color channel does not encode visual information (because laser cutter/engraver machines generally do not use color information to represent color, but rather ignore it, translate it to grayscale, or use it to represent something else entirely like machining operation order). In some embodiments, this may include taking a user's natural language description of "smiley face" and appending data representing "black and white, high contrast" as positive tokens, and data representing "color" as a negative token. Altering the natural language description of the desired fabrication result in this manner guides the AI engine to create a machine-created design that can be used to generate rendering instructions for a CNC machine to generate a better quality rendered fabrication corresponding to the desired fabrication result.

In other embodiments, other or additional human-created inputs may be provided to the AI engine to generate the designs. In some instances, the inputs have information associated therewith that is appended automatically to the natural language description of the desired fabrication result. In operation, these inputs indicate to the AI engine that the machine-created design should be suitable for implementation via a certain type of fabrication and/or fabrication result, which may include either (i) generating a machine-created design that is suitable for fabrication via a laser CNC machine in the first instance or (ii) modifying a machine-created design in a manner to make it more suitable for fabrication via a CNC machine.

In some embodiments, the software engine for generating the rendering instructions is or includes a large language model (LLM) that has been trained to generate rendering instructions suitable for implementation by a CNC machine (e.g., a laser CNC machine) based on natural language descriptions of desired fabrication results.

Some embodiments implement a "text-to-file" approach where an LLM is trained to generate rendering instructions in the form of an implementation file. In such embodiments, the implementation file is (or contains) rendering instructions that can be executed by the CNC machine to generate a fabrication result. These may be in a binary format, a proprietary format, a text based format, or any other file format. This approach is known as "text-to-file" because the text of the natural language description of the desired fabrication result is converted to an implementation file.

Some embodiments implement a "text-to-text" approach where an LLM is trained to generate an output in the form of a Scalable Vector Graphics (SVG) file corresponding to a desired fabrication result. An SVG file is an XML-based vector image format for defining two-dimensional graphics. In particular, an SVG image is defined in a vector graphics format and stored as an XML text file. Accordingly, SVG images can be scaled in size without loss of quality, and SVG files can be searched, indexed, scripted, and compressed, which makes them well suited for use as training data for generative AI models. Any other suitable vector file format now known or later developed could be used in addition to or instead of SVG, including but not limited to Encapsulated PostScript (EPS), Portable Document Format (PDF), Adobe Illustrator (AI), Windows Metafile Format (WMF), Drawing Exchange Format (DXF), and/or Corel-DRAW Image (CDR).

In operation, an SVG file (or other suitable vector file, OBJ file, JPG, G-Code or other similar file) depicting the desired fabrication result (e.g., an image, design, etc.) can be converted into rendering instructions for execution by the CNC machine. In some embodiments, the rendering instructions corresponding to the SVG file are a component of an implementation file, and in such embodiments, the CNC machine executes the implementation file comprising the rendering instructions corresponding to the SVG file that was generated by the LLM. This approach is known as "text-to-text" because the text of the natural language description of the desired fabrication result is converted to an SVG image, which is an XML text file. Transforming the SVG image into rendering instructions, and in some instances, additionally packaging the rendering instructions into an implementation file can be performed by the same AI model, a different AI model, or perhaps via other computing methods.

Some embodiments implement a "text-to-code" approach where an LLM is trained to generate program code that, when executed by one or more processors, causes the one or more processors to generate rendering instructions (or perhaps an implementation file comprising rendering instructions) that are executable by the CNC machine to generate a desired fabrication result. An example of a "text-to-code" approach includes an LLM that writes functions in python (or some other language) that creates a box. In some embodiments, the functions can be parameterized in a way that defines aspects of the box, such as the dimensions of the box, shape of the box, and so on. Similar to the SVG files described above, computer program code can also be searched, indexed, scripted, and compressed, which makes it well suited for use as training data for generative AI models.

In some embodiments, program code is generated by an LLM based on the natural language description of the desired fabrication result. In some instances, this program code can be used to generate an image file which can be converted into rendering instructions for execution by the CNC machine. In some embodiments, the rendering instructions corresponding to the image file generated by the program code are a component of an implementation file, and in such embodiments, the CNC machine executes the implementation file comprising the rendering instructions corresponding to the image file that was generated by the LLM. Transforming the image file into rendering instructions, and in some instances, additionally packaging the rendering instructions into an implementation file can be performed by the same AI model, a different AI model, or perhaps via other computing methods.

Some embodiments implement an approach where an LLM is trained to invoke certain pre-written code for generating rendering instructions (or perhaps an implementation file comprising rendering instructions) that are executable by the CNC machine to generate a desired fabrication result. The LLM can invoke pre-written code in any of several different ways.

For example, in some embodiments, if the LLM determines that the natural language description of the desired fabrication result includes text about a box, the LLM can invoke pre-written code (e.g., via a plug-in, application programming interface (API), a function call, or similar) for generating a box. In one example, the LLM uses a plug-in architecture to execute a function suitable for creating a box (e.g., a function called "MakeBox.py( )"). The name "MakeBox.py( )" is for illustration purposes—functions having different names but that are suitable for creating a box can be used as well.

In another example, the LLM writes python code that calls a function. In this example, the system performs a "text-to-code" approach (as described above) to generate code that invokes a function (e.g., the MakeBox.py( ) function). In another example, the LLM creates JavaScript Object Notation (JSON) data (similar to the "text-to-code" approach described above), where the JSON data created by the LLM is used when invoking the function (e.g., the boxes.py( ) function).

In the above-described embodiments where the LLM is configured to invoke program code and/or to generate appropriate data with which to invoke program code, the code that the LLM invokes can be any of (i) pre-existing functions from a library of invokable functions, (ii) functions that are searched for and obtained from Internet sources, and/or (iii) functions that are generated by an AI model ("function generator"). For some example embodiments where the function is generated by a function generator, the LLM is configured to invoke the function generator to generate the function, and then use the generated function in connection with generating the rendering instructions. For some example embodiments, the LLM itself is the function generator, so it could write a box creator function appropriate to the user prompt, determine JSON parameters appropriate to the user prompt, and then execute the function with the parameters to create the rendering instructions.

In some embodiments where an LLM is trained to generate rendering instructions, the LLM is configured to determine one or more tools for use in generating the rendering instructions, and then use those tools to generate at least a portion of the rendering instructions. For example, in some embodiments, the one or more tools are available via a plug-in architecture, such as the plug-in architecture provided by OpenAI or other third parties, which can be executed locally or through a cloud computing system.

In some instances, the tool(s) may be specified in the natural language description of the desired fabrication result, e.g., "Create a box using boxes. py that is 4 inches wide, 5 inches long, and 3 inches deep." In this example, the tool (i.e., boxes.py) is expressly recited in the natural language description of the desired fabrication result. In some examples, and as described in further detail with reference to FIG. 8B, some embodiments are configured to use two or more tools to create rendering instructions. For example, two or more generative AI models could be used to generate rendering instructions. In another example, a box-creation tool can be used to generate a box, and then a generative AI model can be used to generate designs to be etched onto the top (or side(s) or bottom) of the box generated by the box-creation tool. Other combinations of tools, including combinations of generative AI models and/or other software tools could be used, too.

In one example, a first tool (i.e., a box generator, e.g., boxes.py, https://cuttle.xyz, etc.) may be used to create a box with a lid. Then, a second tool (i.e., a design tool, e.g., Magic Canvas available from Glowforge, graphic design tool(s) available from Noun Project, etc.) can be used to create a design to be etched onto the lid of the box.

In another example, one tool can be called multiple times. For instance, a design tool, e.g., Magic Canvas available from Glowforge, can be called five times to generate five different flower designs for five different coasters. In particular, if the natural language description of the desired fabrication result includes "Make five coasters where each coaster has a different flower etched on it," then the Magic Canvas design tool can be called five times to generate five different flower designs, where each time the Magic Canvas design tool is called, the Magic Canvas tool generates a single flower design, and all the flower designs are integrated into a single render file that creates a set of five coasters.

In some embodiments, generating the rendering instructions sometimes also includes determining an order of rendering operations. Continuing with the five flower coaster example, in a scenario where all five coasters are to be cut from a single wood plank, the rendering operations can include either (i) cutting each of the coasters from the wood plank first, followed by etching a flower design onto each individual coaster (i.e., cut first then etch second) or (ii) etching five flower designs onto the wood plank first, followed by cutting each coaster from the wood plank (i.e., etch first then cut second).

In some instances, the rendering order (i.e., cut then etch vs. etch then cut) can be based on the natural language description of the desired fabrication result. For example, the natural language description of the desired fabrication result may expressly state "Make five different coasters where each coaster has a different flower etched on it by first etching the five flowers onto a wood plank and then cut each coaster from the plank such that each coaster has one of the flower etchings centered upon it," or the natural language description of the desired fabrication result may instead expressly state "Make five different coasters where each coaster has a different flower etched on it by first cutting each of the five coasters from a wood plank, and then etching a flower design onto each of the five coasters such that each coaster has a different flower etching centered upon it."

In other instances, the rendering order (i.e., cut then etch vs. etch then cut) can be specified by the CNC machine user in response to one or more follow up questions posed by the system. Follow up questions are described in more detail below. But in one example, if the natural language description of the desired fabrication result states, "Make five different coasters where each coaster has a different flower etched on it," the follow up question may ask, "Do you wish to cut the coasters from the plank before etching the flowers onto each coaster, or would you prefer to etch the flowers onto the plank and then cut the coasters from the plank?"

In still further instances, the rendering order (i.e., cut then etch vs. etch then cut) can be determined by the system based on one or more factors such as the total number of steps required for different rendering orders, or implicitly by its training data based on patterns that it determines. For example, etching then cutting may require fewer overall steps than cutting then etching. Although both orderings require the same laser cuts and laser etches, etching then cutting may require fewer alignment steps than cutting then etching, and thus require fewer steps overall. This is because, if all five flower designs are etched onto plank first, then the alignment for etching may only need to be performed once whereas if the coasters are cut from the plank first, then a separate alignment step may need to be performed for each etching on each coaster. And for embodiments where the system is configured to select a rendering order based on the fewest number of steps, the system may choose to etch the five flower designs onto the wood plank first, and then cut each coaster from the plank so that each coaster includes one of five etched flower designs.

In some embodiments, and as mentioned above, the systems disclosed and described herein may generate one or more follow up questions relating to a natural language description of the desired fabrication result, including follow up questions to obtain further information about the desired fabrication result, such as information to help clarify and/or more narrowly define the desired fabrication result. The information obtained in response to the follow up question can then be used as fabrication parameters to guide the generation of the rendering instructions.

In some cases, a conversational interface may be used to refine and/or enhance the natural language description. For example, sometimes a natural language description of the desired fabrication result may be vague. For instance, the natural language description of the desired fabrication result may be fairly simple, e.g., "Make a box." To further clarify and/or more narrowly define the desired fabrication result, some embodiments may include generating and posing a follow up question to a CNC machine user via a user interface. An example follow up question might be "What dimensions should the box have?" or "please upload some images of boxes you like for inspiration," or possibly a set of questions such as "How wide would you like the box?", "How deep would you like the box?", and so on. In some instances, the follow up question may be posed to the CNC machine user in the form of text presented within a graphical user interface. For instance, in the "Make a box" example, the laser CNC machine user may be presented with a GUI page that includes images of box options to pick from. In other instances, the follow up question may be posed to the CNC machine user in the form of an audio question played via a speaker. The answers to these questions provide fabrication parameters that are used to generate the rendering instructions. Additional details and further examples of follow up questions are described with reference to the example method shown in FIG. 8B and alternative embodiments thereof.

In some embodiments, fabrication parameters may be determined based on the natural language description of the desired fabrication result even if the parameters are not expressly recited in the natural language description. For example, in addition to (or instead of) using follow up questions to obtain fabrication parameters (or additional fabrication parameters beyond the parameters that may have been expressly provided in the natural language description of the desired fabrication result), some embodiments may include determining fabrication parameters based on (i) information implied in the natural language description of the desired fabrication result and/or (ii) information obtained from Internet sources in response to searches based on words or phrases in the natural language description of the desired fabrication result.

For example, assume the natural language description of the desired fabrication result includes "Make a box big enough to hold two decks of cards." In this example, inferring one or more additional fabrication parameters to help guide generation of the rendering instructions may include (i) determining the size of two decks of cards by, for example, looking up the size of a deck of cards via an Internet source and multiplying the size by two, and/or (ii) determining constraints on the interior and/or exterior dimensions of the box based on the size of the two decks of cards, including, for example, by considering the thickness of the material from which the box will be fabricated. Alternatively, it might use the Internet to look up existing examples of boxes that hold cards, and incorporate the images or design files for those products as part of the natural language description.

For another example, assume the natural language description of the desired fabrication result includes "Make a pair of Jack-O-Lantern earrings." In this example, inferring one or more additional fabrication parameters to help guide generation of the rendering instructions may include determining a size of a typical earring by, for example, looking up average earring sizes via an Internet source.

Aspect 3: In some embodiments, the output of the AI engine (i.e., the machine-created design) is transformed to make it more appropriate for fabrication via a laser CNC machine. In some examples, transforming the machine-created design to make it more appropriate for fabrication can be implemented via one or more of several techniques, including but not limited to (i) the procedures disclosed in Leon A. Gatys et al., "Image Style Transfer Using Convolutional Neural Networks," available at https://www.cv-foundation.org/openaccess/content_cvpr_2016/papers/ Gatys_Image_Style_Transfer_CVPR_2016_paper.pdf, (ii) bitmap processing techniques such as sharpening, desaturation, and/or other bitmap processing techniques, and/or (iii) other transforms that change a machine-created design to optimize or otherwise improve the machine-created design to make the machine-created design more suitable for fabrication via a laser CNC machine.

For example, some embodiments include causing the AI engine to generate an initial machine-created design. Then, determining whether the initial machine-created design includes one or more features or aspects that will result in unsatisfactory or otherwise subpar rendered fabrication results. And for individual features or aspects of the initial machine-created design that will result in unsatisfactory or otherwise subpar rendered fabrication results, removing or modifying the individual features or aspects to create a final machine-created design that can be used to generate rendering instructions for a CNC machine.

In another example, some embodiments additionally or alternatively include causing a first artificial intelligence engine to generate a first machine-created design, and then determining whether the first machine-created design will result in a satisfactory rendered fabrication result. If the first machine-created design will result in a satisfactory rendered fabrication result, then the first machine-created design is used to generate the rendering instructions for the CNC machine. But if the first machine-created design will result in an unsatisfactory rendered fabrication result, then some embodiments include causing a second artificial intelligence engine to generate a second machine-created design based on the first machine-created design, and then using the second machine-created design to generate the rendering instructions for the CNC machine. In some instances, the above described features of the first and second AI engines may be implemented within a single AI engine configured with different parameters.

For example, the first AI might generate a colorful image for engraving, while the second AI would "restyle" it by converting it to a stippled image of black dots that is more appropriate for engraving via a laser CNC machine.

Some embodiments include, among other features, one or more (or all) of: (i) receiving a natural language description of a desired fabrication result (e.g., "Height map engraving of Mt. Everest" or "3D puzzle of a T-Rex"), (ii) generating (or causing to be generated) a machine-created design/rendering instructions based on the natural language description of the desired fabrication result, and (iii) causing the rendering machine to generate a rendered fabrication result based on the desired fabrication result according to the rendering instructions. In some embodiments, the machine-created design/rendering instructions corresponds to (and/or is based on) one or more bitmap file formats, CAD formats like DXF or DWG, vector formats such as SVG or PDF, raster, 3D formats such as .OBJ or .STL, software such as g-code, or any other type of file now known or later developed that it suitable for use by a CNC machine in connection with generating a fabrication result.

In some embodiments, generating a machine-created design based on the natural language description of the desired fabrication result is performed by an AI design-creation engine that has been trained with designs corresponding to desired fabrication results, where individual designs corresponding to desired fabrication results are associated with labels, tags, or other descriptors corresponding to desired designs and/or fabrication results.

Some embodiments may include using an AI model that has been trained with different data sets corresponding to different types of fabrication results. For example, and as explained above, some embodiments include using an AI model that has been trained with a plurality of data sets comprising one or more of engraving designs, cutting designs, 3D object designs, 3D assembly designs, and any other type of fabrication result capable of being produced by a CNC machine. Some such embodiments may additionally include hypernetwork or textual inversion or Low Rank Adaptation (e.g. https://arxiv.org/abs/2106.09685) to direct the creation appropriately.

In alternative embodiments, the AI design-creation engine may include several different AI models, where individual AI models correspond to different types of fabrication results. For example, the several different AI models may include one or more of (i) a first AI model for engraving designs that has been trained with engraving designs, (ii) a second AI model for cutting designs that has been trained with cutting designs, (iii) a third AI model for 3D object designs that has been trained with 3D object designs, (iv) a fourth AI model for 3D assembly designs that has been trained with 3D assembly designs, and/or (v) other AI models for other fabrication result types that have been trained with corresponding designs.

In operation, generating a machine-created design includes using (perhaps selecting and using) one of several AI models to generate the machine-created design, where the selected AI model corresponds to the desired fabrication result.

By training the AI design-creation engine with such data, the AI design-creation engine is better able to interpret text contained in the natural language description of the desired design to generate a machine-created design (and in some instances, corresponding rendering instructions) that can be used to produce the desired fabrication results.

Some embodiments additionally include modifying (perhaps automatically) a user's natural language description of a desired fabrication result to append one or more tags, tokens, or other descriptors to the natural language description, thereby improving the likelihood that the AI design-creation engine will generate a design (and in some instances, corresponding rendering instructions) that is consistent with the desired fabrication result, or at least more consistent with the desired fabrication results than if the one or more tags, tokens, or other descriptors had not been appended to the user's natural language description of the desired fabrication result.

Some embodiments additionally include transforming the machine-created design (e.g., modifying, adding, and/or removing aspects of the design machine-created design and/or modifying, adding, and/or removing aspects of corresponding rendering instructions) so that a rendered fabrication result is consistent with desired fabrication results, or at least more consistent with desired fabrication results than if the machine-created design had not been transformed.

In some embodiments, the machine-created design is presented to the user (e.g., via a graphical user interface (GUI) window) for selection by the user to either (i) generate a rendered fabrication result based on the machine-created design or (ii) integrate the machine-created design into another design (which may be another machine-created design or a human created design).

After receiving an approval of the machine-created design presented to the user (which may be in the form of instructions to generate the rendered fabrication result), generating (or causing to be generated) the rendered fabrication result via a CNC machine, e.g., a laser CNC machine.

Some embodiments may additionally include soliciting user intent (e.g., via the GUI) to understand what kind of rendered fabrication result the user wishes to create, including but not limited to posing follow up questions as described herein. For example, the natural language description of the desired fabrication result might include "make a sheep." Soliciting user intent in some instances may include providing options to the CNC machine user, from which the CNC user might select "3D engraving," "parts that are stacked to create the final appearance," "paper that is cut and folded," or other variations. The kind of rendered fabrication result that the user wishes to create (i.e., the user intent data) is sometimes referred to herein as a desired format of the rendered fabrication result.

These indications of user intent can, in some instances, impact the way individual aspects of the disclosed methods and procedures are implemented. For example, if the user intent information includes "engraving on a 3D object," some embodiments might include (i) selecting and using an AI model trained on engraving designs on a 3D object, (ii) appending tokens that make a engrave-able output more likely, and/or (iii) using one or more transformations that interprets images of a design as having depths, and mapping those depths into a depthmap for use with generating the engrave-able design. In another example, if the user intent information includes "engraving on a flat surface," then some embodiments may include (i) selecting and using an AI model trained on engraving designs on flat objects, (ii) appending tokens that make a engrave-able output on flat objects more likely, and/or (iii) using a transformation that interprets images of a design as having depths, and mapping those depths into a depthmap for use with generating the engrave-able design for a flat object.

Some embodiments additionally or alternatively include implementing a rendering system that facilitates generating and/or selecting designs for rendering based at least in part on their suitability to be rendered on particular types of rendering machines and/or materials.

For example, some examples of the rendering system are configured to receive a natural language description of a desired fabrication result. In this regard, some examples of the rendering system generate a GUI via which a user can specify a natural language description such as "Guinea pig knight riding a horse," or any of the above-identified natural language descriptions. In some embodiments, the natural language description may also include a desired fabrication result, e.g., "engravable Guinea pig knight riding a horse." The rendering system then generates (or causes to be generated and then receives) a machine-created design that is generated based on the natural language description of the desired fabrication result. In this regard, some examples of the rendering system include AI logic that facilitates rendering the machine-created designs, such as the AI design-generation engine implementations described herein.

Some examples of the rendering system are in networked communication with other systems that are configured to generate machine-created designs based on natural language descriptions of desired fabrication results. For instance, in some examples, a rendering server communicates a natural language description of a desired fabrication result to an AI design-creation server, which is configured to generate, using AI logic, one or more designs that are consistent with the natural language description of the desired fabrication result.

Creating a design (sometimes referred to herein as generating a design or generating rendering instructions) is different than performing a search engine query that merely finds a design that has been previously created. The design that is created (or generated) in such examples is a new design that is created by an AI design-creation engine, which in some embodiments is implemented via software running on the AI design-creation server. Such a design is sometimes referred to herein as a machine-generated design and/or a machine-created design. In some instances, a machine-created design may be rendered on (or from) a single piece of material. In other instances, the machine-created design may be rendered on (or from) several separate pieces of material.

In operation, the machine-created design is or corresponds to rendering instructions that a rendering machine uses (in whole or in part) to create a rendered fabrication result (which is based on the desired fabrication result).

Creating a physical rendered fabrication result based on the machine-created design refers to creating the physical result of the fabrication procedure. For example, if the desired format of the desired fabrication result is an etching on a flat surface of a material, then creating the rendered fabrication result of the machine-created design includes etching the machine-created design onto a flat surface material. Similarly, if the desired format of the desired fabrication result is a 3D object, then creating the rendered fabrication result of the machine-created design includes fabricating the 3D object from a material via subtractive or additive manufacturing.

As mentioned earlier, some examples of the rendering system are configured to generate rendering instructions based on the machine-created designs. The rendering instructions can be executed by a rendering machine (e.g., a CNC machine, including a laser CNC machine) to cause the rendering machine to generate a rendered fabrication result based on the machine-created design, which was based on the desired fabrication result. In this manner, disclosed embodiments include generating a rendered fabrication result based on a desired fabrication result that includes generating a machine-created design based on the desired fabrication result.

For instance, the rendering instructions can be communicated and executed by a CNC machine, which may correspond to a laser-based CNC machine, including but not limited to laser-based CNC machines offered for sale by Glowforge. In this case, the rendering instructions may control a laser cutter of the laser-based CNC machine to generate a rendering onto a surface of a physical article (e.g., any article or item made of acrylic, plastic, wood, metal, leather, paper, or any other material), in the case of certain etching or cutting designs. Similarly, the rendering instructions may control a laser of the laser-based CNC machine to generate a physical rendering from a physical article (e.g., from a block, cylinder, or other shaped material made of acrylic, plastic, wood, metal, leather, paper, or any other material), in the case of certain cutting designs, 3D object designs, and/or 3D assembly designs. In some embodiments involving rendering instructions for 3D assembly designs, the rendering instructions may additionally include assembly instructions for assembling the 3D assembly design from a set of individual assembly pieces fabricated by the laser-based CNC machine. In such embodiments, the assembly instructions may include identification of individual pieces for assembly, instructions for joining and/or connecting the individual pieces, and so on.

In some examples, the rendering system uses rendering parameters that specify one or more operational characteristics of the rendering machine and/or material. Some examples of these aspects include the rendering machine type (e.g., make, model number, etc.), the material upon which a machine-created design will be rendered (e.g., flat substrate of wood, plastic, leather, paper, etc.), and/or the material from which the machine-created design will be rendered (e.g., block, cylinder, or other shape of wood, plastic, paper, etc.). Some examples of the rendering system are configured to generate a revised natural language description based on the original natural language description and the rendering parameters, and then communicate the revised natural language description to an AI design-creation engine of the rendering server (or an AI engine in communication with the rendering server).

In some examples, the rendering system may use rendering parameters that specify one or more art styles associated with desired machine-created designs. Examples of these art styles include vector, brush, pencil engraving, geometric, painting, assembly, and line art styles.

In some examples of the rendering server, generating the rendering instructions involves post-processing a machine-created design into a processed design, and generating the rendering instructions based on the processed design. For instance, in some examples where the machine-created design is or includes an image, the rendering server converts the machine-created design to a grayscale image and/or to a line drawing. Some examples include the rendering server adjusting the scale of the machine-created design to match the scale of an article upon which the machine-created design is to be implemented, or in the case of certain designs, adjusting the scale of the machine-created design to match the scale of the article from which the machine-created design is to be fabricated.

In some examples, a plurality of candidate machine-created designs are generated based on the natural language description of the desired fabrication result. In some of these examples, each candidate machine-created design is assigned a suitability score based on an analysis of the candidate machine-created design. For instance, the score may be based on how well the machine-created design can be rendered via a particular rendering machine, on a particular material, and/or from a particular material. In another example, the score may be based on analysis on whether the material will be damaged given the particular set of operations specified by the design. In some instances, only those machine-created designs that have a suitability score above a threshold (which can be user specified) are to be used as the machine-created design for generating rendering instructions to be executed by a CNC machine to generate a rendered fabrication result. In others, the scores might be relayed to the user; they might be used to trigger additional actions, such as recreating the design; or they might be used to issue a warning or cause other changes or actions.

II. EXAMPLE OPERATING ENVIRONMENT EMBODIMENT

FIG. 1 illustrates an example of an operating environment 100 that facilitates generating a rendered fabrication result based on a machine-created design on or from an article/material/item using a rendering machine 110. The operating environment 100 includes a rendering server 105, a rendering machine 110, and a user terminal 115. In some examples, the rendering server 105, the rendering machine 110, and the user terminal 115 communicate information via a network 120, such as, for example, the Internet. In some instances, one or more functions of the rendering server 105, the rendering machine 110, and/or the user terminal 115 may be performed by a single computing device or computing system. The network 120 may comprise any centralized and/or distributed network now known or later developed that is suitable for implementing data communications between and among computing devices.

Some examples of the user terminal 115 correspond to personal computers, smartphones, tablets, etc. In this regard, the user terminal 115 includes a user interface (e.g., display, keyboard, touch-sensitive display, microphone, speaker, etc.). Some examples of the user terminal 115 are configured to generate a graphical user interface (GUI) that facilitates communicating information to and from other devices of the environment 100. In this regard, the user terminal 115 includes networking hardware that facilitates communicating information to and from the other devices of the environment via a computing network. Examples of the computing network 120 correspond to wired and wireless networks such as, for example, local area network (LAN), metropolitan area network (MAN), and wide area network (WAN).

In the example embodiments disclosed herein, any one or more (or all) of the rendering server 105, rendering machine 110, and/or user terminal 115, individually or in combination, can perform the design generation steps. However, the rendering machine 110 performs the physical fabrication.

For example, in some embodiments, the user terminal 115 may receive the natural language description of the desired fabrication result from a user, generate rendering instructions based on the natural language description of the desired fabrication result, and provide the rendering instructions to the rendering machine 110, which then implements the rendering instructions to generated the physical fabrication result.

In other embodiments, the user terminal 115 may receive the natural language description of the desired fabrication result from the user, provide the natural language description of the desired fabrication result (or perhaps a modified version thereof) to the rendering server 105. The rendering server 105 may then generate the rendering instructions, and provide the rendering instructions to the rendering machine 110, which then implements the rendering instructions to generate the physical fabrication result. In some alternative embodiments, rendering server 105 may additionally provide data to and receive data from other computing systems (not shown) in connection with generating the rendering instructions.

In still further embodiments, the rendering machine 110 may receive the natural language description of the desired fabrication result from the user and provide the natural language description of the desired fabrication result (or perhaps a modified version thereof) to the rendering server 105. The rendering server 105 may then generate the rendering instructions, and provide the rendering instructions to the rendering machine 110, which then implements the rendering instructions to generate the physical fabrication result.

In other embodiments, the rendering machine 110 may receive the natural language description of the desired fabrication result from the user, generate the rendering instructions, and then implement the rendering instructions to generate the physical fabrication result.

Other scenarios where each of the user terminal 115, rendering server 105, and/or rendering machine 110 perform different aspects of the disclosed methods and features are within the scope of the disclosed inventions as well.

A. Example CNC-Based Rendering Machine Embodiments

Figure 2:
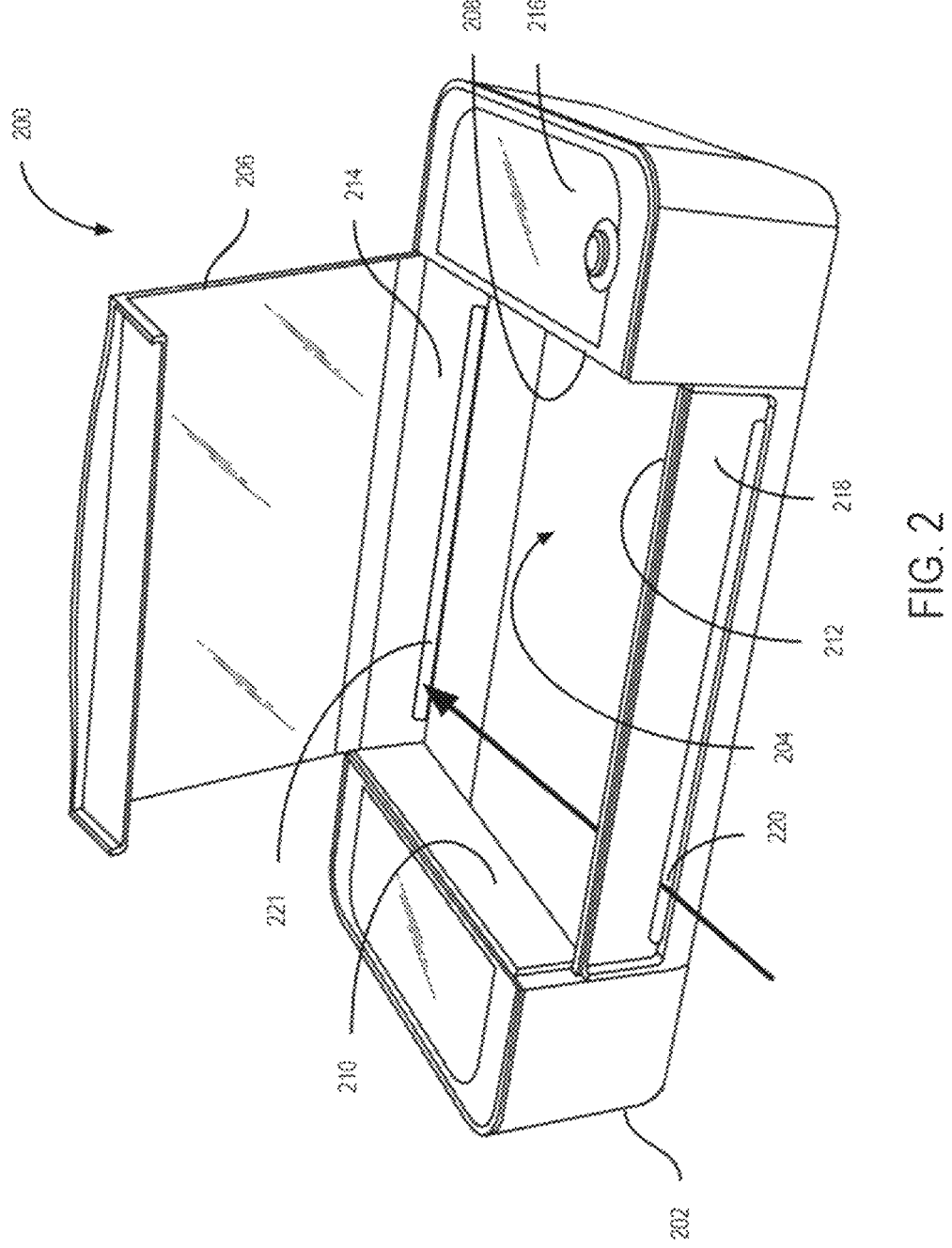
FIG. 2 shows an example of a laser-based CNC rendering machine, in accordance with some example embodiments.

FIG. 2 shows an example of a CNC-based rendering machine 200. The CNC-based rendering machine 200 includes a housing 202, an interior space 204, and a lid 206. The interior space 204 of the housing 202 is defined by four interior walls 208, 210, 212, and 214. Interior wall 210 is along the left side of the interior space 204, interior wall 208 is along the right side of the interior space 204, interior wall 214 is along the back side of the interior space 204 below where the lid 206 joins with the housing 202, and interior wall 212 is along the front side of the interior space 204 on the inside of a front cover plate 218 where the lid 206 closes to enclose the interior space 204. CNC-based rendering machine 200 also includes pass-through slots 220 and 221 that enables materials that are to be machined to be slid through the front cover plate 218 and back wall 214. In some embodiments, the front cover plate 218 may be removable to create a larger area, which facilitates machining of materials that may be too large to fit through the pass-through slot 220. In alternative embodiments, pass-through slots may be positioned on the side walls 210 and 212 instead of or in addition to the pass-through slots 220 and 221 that are positioned on the front and rear walls 210 and 214, respectively. However, the interior space in other embodiments may be defined by more or fewer interior walls configured differently than shown in the example illustrated in FIG. 1.

In some examples of the CNC-based rendering machine 200, the interior space 204 is arranged to accommodate a gantry assembly (not shown) within the interior space 204. The gantry assembly is arranged to control the movement, alignment, and positioning of a laser head arranged to apply laser energy to materials placed within the interior space 204 of the housing 202 of the CNC-based rendering machine 200. In operation, material to be machined (not shown) is placed into the interior space 204 of the housing 202, the lid 206 is closed, and the CNC-based rendering machine 200 controls (via the gantry assembly) the movement, alignment, and positioning of the laser head over the material to be machined within the interior space 204 of the housing 202.

CNC-based rendering machine 200 also includes a control compartment 216 that is configured to house electrical components for powering and controlling the CNC-based rendering machine 200. By housing the electrical components within the control compartment 216, the electrical components are protected from the conditions (e.g., heat, smoke, laser energy reflections) inside the interior space 204 where the laser operates. For example, in some embodiments, control compartment 216 is configured to house one or more processors and tangible, non-transitory computer-readable media (e.g., computer memory). In some configurations, the one or more processors and/or the tangible, non-transitory computer-readable media are mounted on one or more circuit boards within the control compartment 216.

B. Example Rendering Server Embodiments

Figure 3:
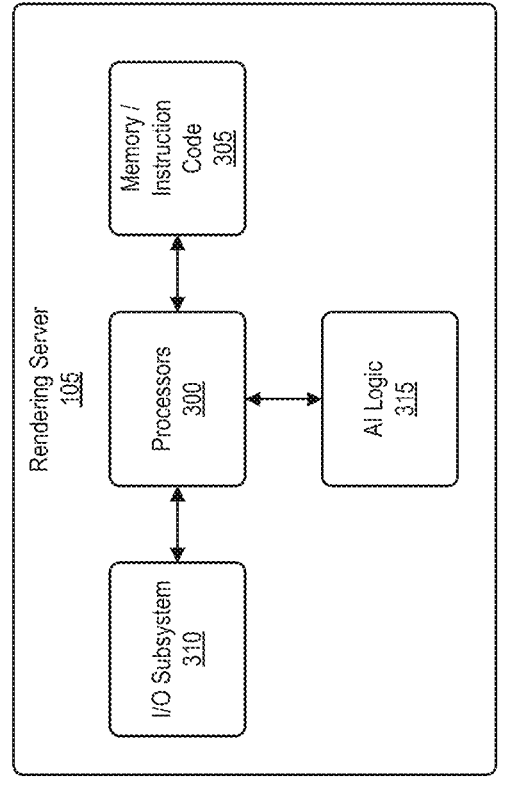
FIG. 3 shows a rendering server, in accordance with some example embodiments.

FIG. 3 shows an example of a rendering server 105. Some examples of the rendering server 105 include one or more processors 300 (sometimes referred to herein simply as a processor), one or more memories 305 (sometimes referred to herein simply as memory), and an input/output (I/O) subsystem 310. Some examples of the rendering server 105 include artificial intelligence (AI) logic 315, which may be configured to implement one or more AI design-creation engines consistent with embodiments disclosed herein.

1. Example Processor Embodiments

The processor 300 is in communication with the memory 305. The processor 300 is configured to execute instruction code stored in the memory 305. The instruction code facilitates performing, by rendering server 105, various operations that are described herein. In this regard, the instruction code may cause the processor 300 to control and coordinate various activities performed by the different subsystems of the rendering server 105. Some examples of the processor 300 correspond to an ARM®, Intel®, AMD®, PowerPC®, neural net, etc., based processor. Some examples of the processor are configured to execute an operating system, such as Android™, Windows®, Linux®, Unix®, or a different operating system.

2. Example I/O Subsystem Embodiments

Some examples of the I/O subsystem 310 include one or more input/output interfaces configured to facilitate communications with other systems of the rendering server 105 and/or with entities outside of the rendering server 105. Some examples of the I/O subsystem 310 are configured to communicate information via a RESTful API or a Web Service API. Some examples of I/O subsystem 310 implement a web browser to facilitate generating one or more web-based interfaces through which users of the rendering server 105 and/or other systems interact with the rendering server 105.

Some examples of the I/O subsystem 310 include wired and wireless communication circuitry configured to facilitate communicating information to and from the rendering server 105. An example of the wired communication circuitry includes IEEE 802.3-based network, fiber, coax, or a different wired communication technology. An example of the wireless communication circuitry includes cellular telephone communication circuitry configured to communicate information over a cellular telephone network such as a 3G, 4G, and/or 5G network. Other examples of the wireless communication circuitry facilitate communication of information via an IEEE 802.11-based network, Bluetooth®, Zigbee®, near-field communication technology or a different wireless network.

3. Example Artificial Intelligence (AI) Logic Embodiments

Some examples of the AI logic 315 are configured to, alone or in combination with other subsystems of the rendering server 105, determine (including creating and/or generating) one or more machine-created designs that are associated with or contain features related to a natural language description of a desired fabrication result and in some instances combine features from different desired fabrication results into a composite machine-created design that is consistent with the natural language description of the desired fabrication result. Some examples of the AI logic 315 are trained to identify terms in a natural language description and, in some instances, determine whether any terms should be replaced or supplemented with other terms.

Some examples of the AI logic 315 include hardware, software, or a combination thereof that is specifically configured to implement or assist in the implementation of various supervised and unsupervised machine learning models. Within examples, these can involve implementation of a Holt-Winters algorithm, an exponential time smoothing (ETS) algorithm, an artificial neural network (ANN), a recurrent neural network (RNN), convolutional neural network (CNN), a seasonal autoregressive moving average (SARIMA) algorithm, a network of long short-term memories (LSTM), and/or a gated recurring unit (GRU) algorithm. Examples of the AI logic 315 can implement other artificial intelligence (AI) logic and/or AI algorithms.

In operation, the AI logic 315 is trained according to any of the training methods disclosed and/or described herein. In some embodiments, aspects of the AI logic 315 are used to implement one or more AI design-creation engines configured to perform AI design-creation engine features and functions described herein and/or any other AI methods now known or later developed that are suitable for creating designs for rendering via CNC machines.

4. Example User Interface Embodiments

Some examples of the rendering server 105 are configured to communicate or otherwise provide one or more user interfaces (e.g., graphical user interface or GUI, microphone, etc.) to the user terminal 115, which allow a user of the user terminal 115 to specify aspects that facilitate generate a rendered fabrication result via the rendering machine 110. For example, during operation, a user may navigate to the rendering server home page. The user may enter credentials or other identifying information that allows the rendering server 105 to authenticate the user. The user may then navigate to or be presented with one or more GUIs that facilitate specifying machine-created designs to be rendered. Examples of these GUIs correspond to the example web pages shown in FIGS. 4A-4D and FIGS. 6 and 7A-7B.

Figure 4A:
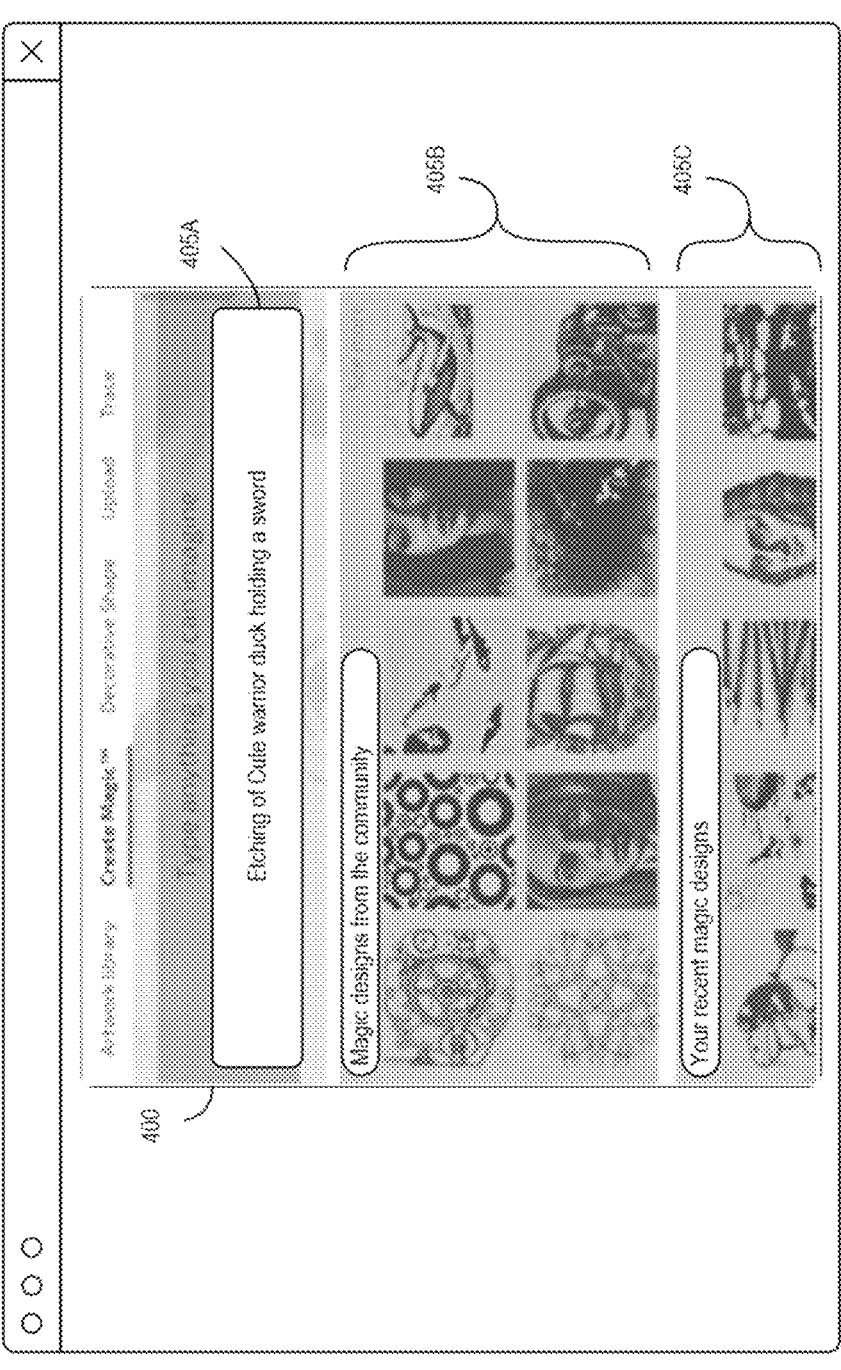
FIG. 4A shows a graphical user interface (GUI) generated by a rendering server, in accordance with some example embodiments.

Referring to FIG. 4A, a first example GUI 400 presented to the user includes a text field 405A, a community designs view 405B, and a recent designs view 405C. The text field 405A facilitates input of a natural language description of a desired fabrication result that directs the rendering server 105 to obtain one or more machine-created designs consistent with the natural language description of the desired fabrication result, e.g., by either creating the design(s) or causing a separate AI design-creation engine to create the design(s). The community designs view 405B shows machine-created designs presented to and/or rendered by other users of the rendering server 105. The recent machine-created designs view 405C shows machine-created designs previously presented to and/or rendered by the user. After specifying a natural language description of the desired fabrication result, the user may be presented with a second GUI. For example, after specifying the natural language description of "etching of a Guinea pig knight riding a horse," the user may be presented with the example GUI 415 of FIG. 4B.

Figure 4B:
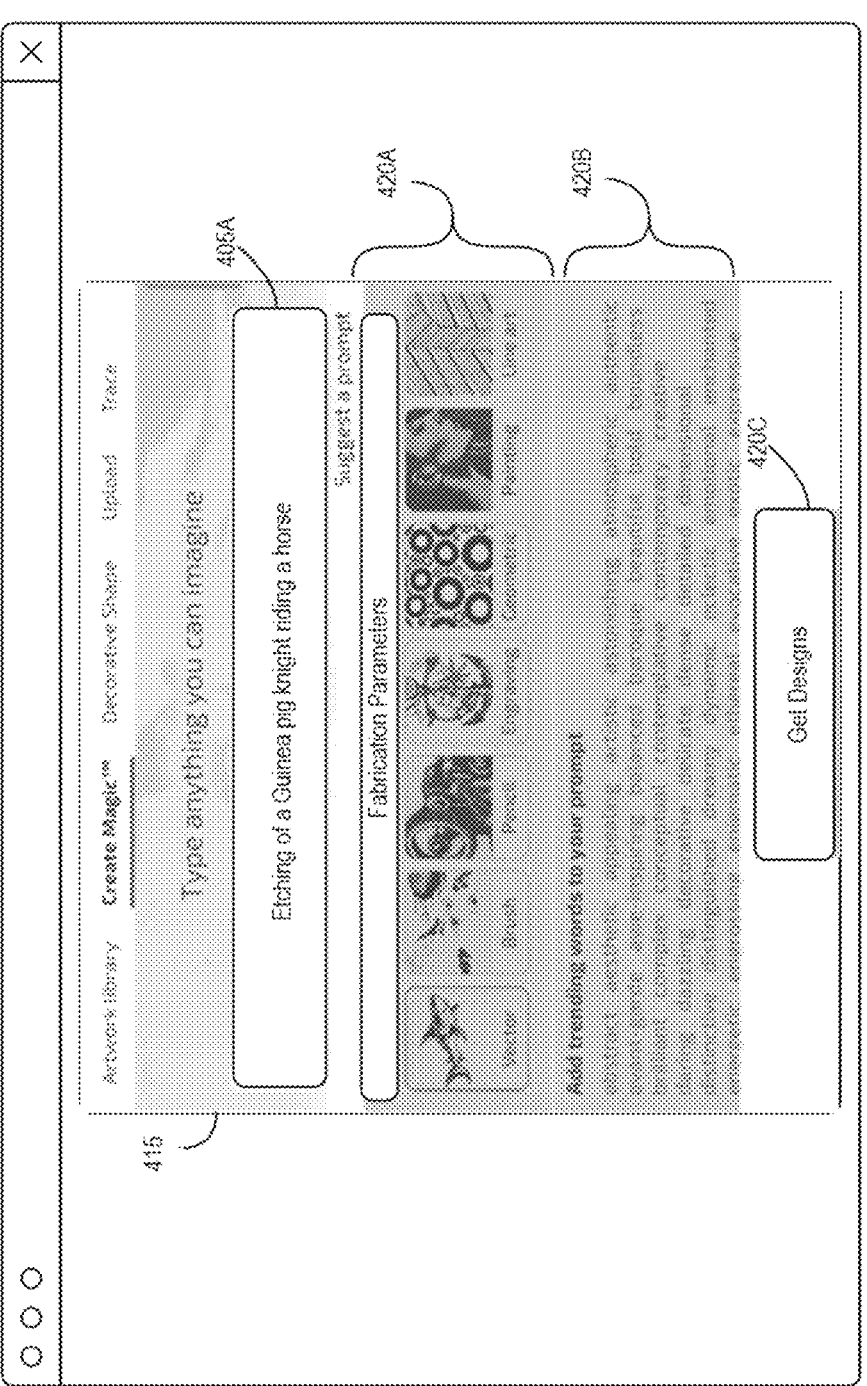
FIG. 4B shows a GUI generated by a rendering server after a user has specified a natural language description of a desired fabrication result, in accordance with some example embodiments.
Figure 4C:
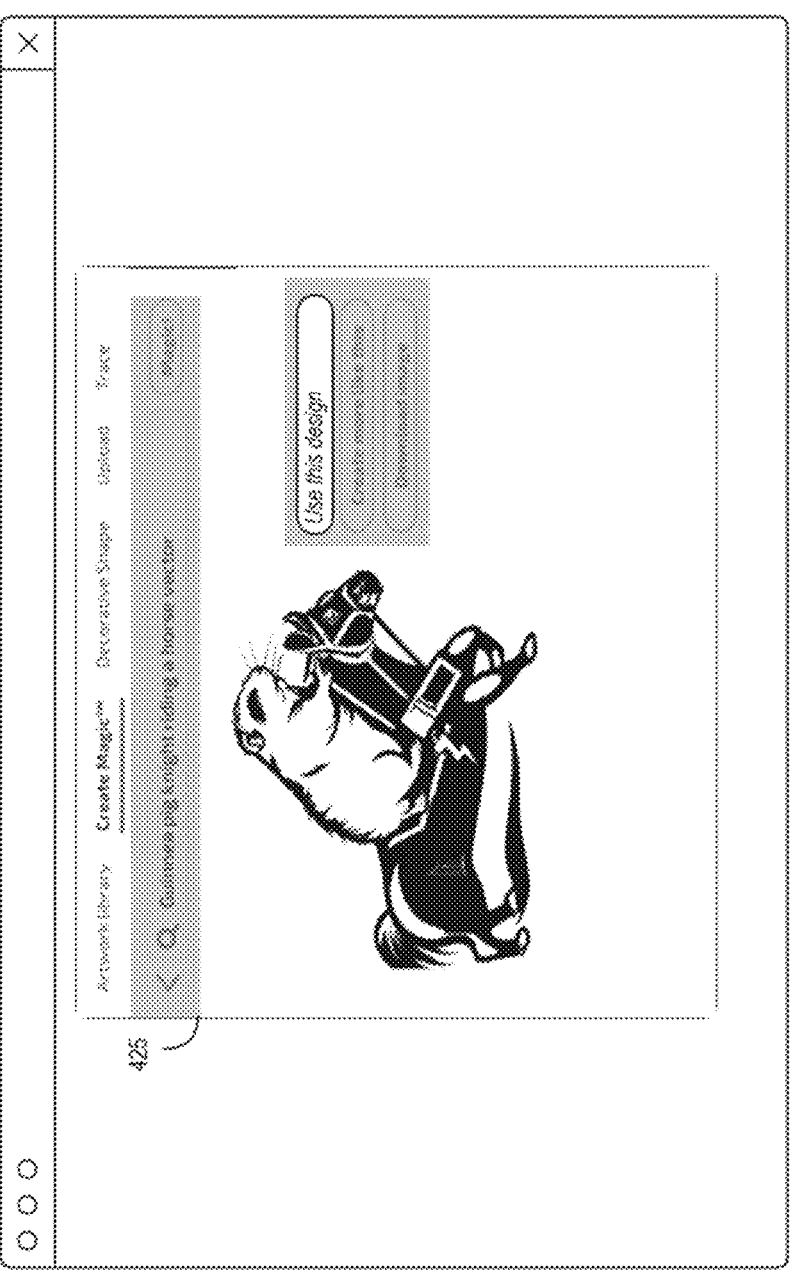
FIG. 4C shows a GUI generated by a rendering server that depicts a design associated with a natural language description of a desired fabrication result, in accordance with some example embodiments.
Figure 4D:
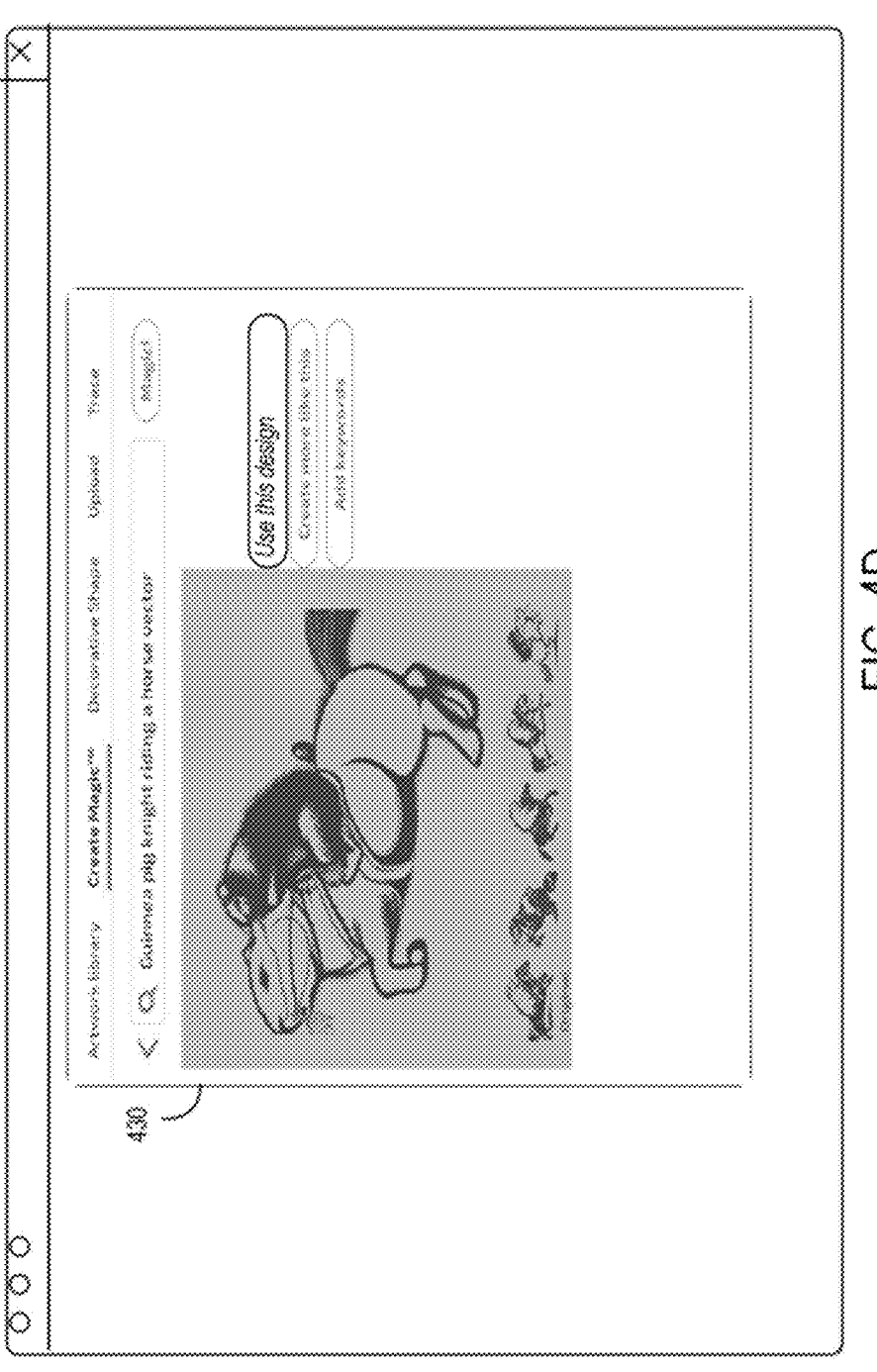
FIG. 4D shows a GUI generated by a rendering server that depicts a design associated with a natural language description of a desired fabrication result, in accordance with some example embodiments.

Referring to FIG. 4B, the second example GUI 415 includes a text field 405A, an art style selector view 420A, a trending words selector view 420B, and a get designs indicator 420C. The text field 405A shows the previously specified natural language description of the desired fabrication result. The art style selector view 420A shows different art styles that can be specified to narrow or refine the natural language description (and thereby affect the resulting machine-created design). For example, the user may specify vector graphic art style, which may yield designs (e.g., including images in some instances) capable of being rendered with a sufficient level of detail via rendering devices that use an x-y table to position a media cutter (e.g., a laser, a blade, etc.) in connection with rendering the design. Selection of the painting style or other style that specifies a gray level for each pixel may yield designs that are more accurately rendered via rendering devices capable of rendering half-tone images (e.g., in the case of certain etching designs) and/or rendering devices that can remove varying amounts of material from the media (e.g., in the case of certain cutting designs, 3D object designs, and 3D assembly designs). In some examples, the art styles indicated in the art style selector view 420A correspond to art styles optimized for rendering via particular rendering machine types and/or for rendering certain designs on or from particular types of materials. The rendering machine types and materials are, in some examples, specified by the user.

The trending words selector view 420B shows different terms that can be added to the natural language description that may have been previously determined (e.g., via the AI logic 315) to narrow or refine the natural language description of the desired fabrication result so that the resultant machine-created designs are more meaningful to the user and/or perhaps so that the resultant machine-created designs more closely match user expectations, which, in turn, should result in a physical rendering that is consistent with user expectations, i.e., cause the rendering machine to generate a rendered fabrication result consistent with the desired fabrication result.

After selecting the "Get Designs" indicator 420C and perhaps specifying one or more art styles and/or trending words, the rendering server 105 performs operations for obtaining relevant machine-created designs, e.g., by generating the machine-created design or causing a separate server to generate the machine-created design. The resultant machine-created designs may be presented to the user in a third GUI, such as the example GUI 425 of FIG. 4C. The user may be presented with options for using the machine-created design for subsequent rendering operations and/or for downloading the design. In some examples, the user can request a different machine-created design (See example GUI 430 of FIG. 4D).

Figure 4E:
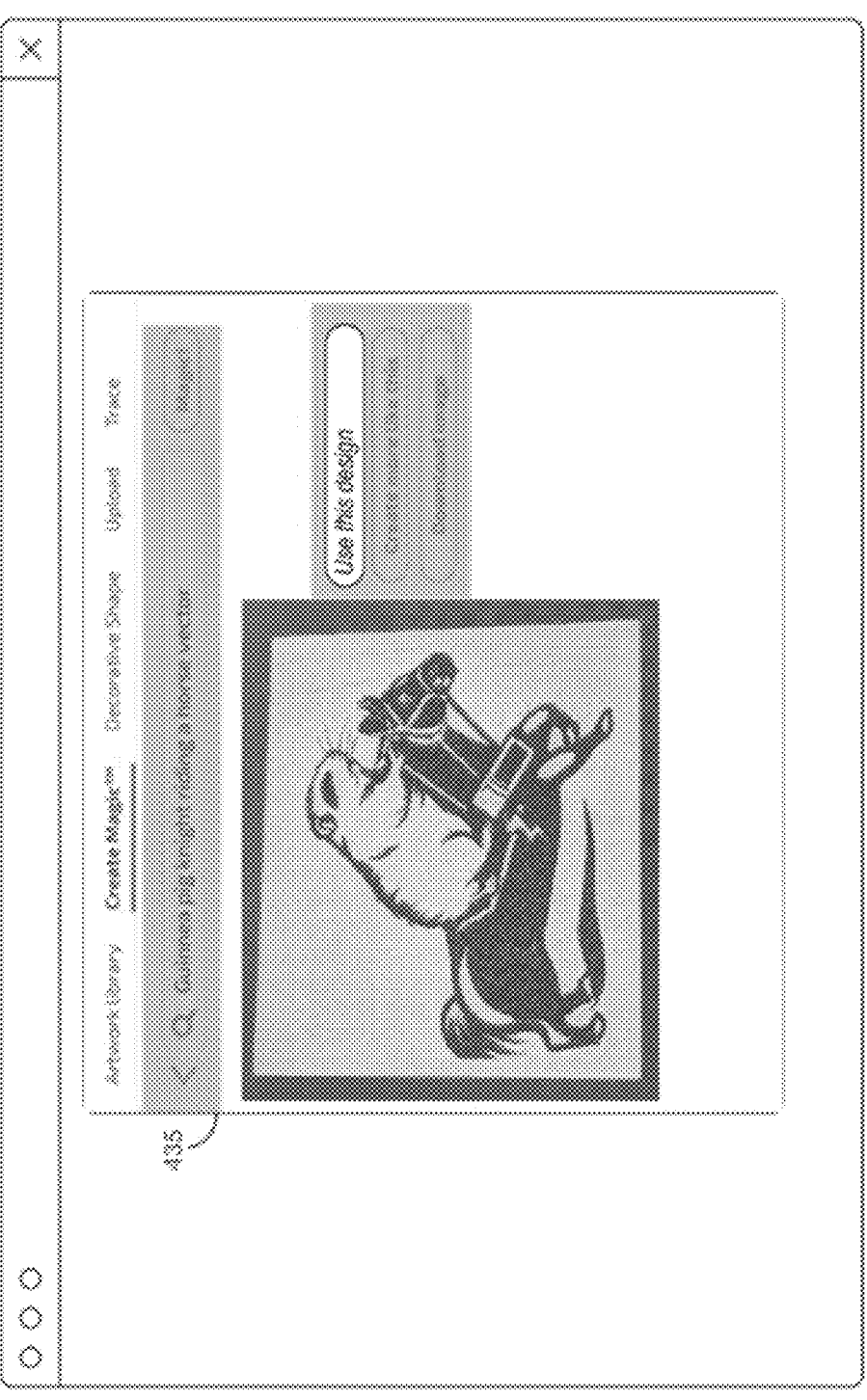
FIG. 4E shows a GUI generated by a rendering server that depicts a prospective fabrication result corresponding to a design associated with a natural language description, in accordance with some example embodiments.

FIG. 4E shows an example GUI 435 generated by a rendering server that depicts a prospective fabrication result 436 corresponding to the design selected for fabrication.

It should be noted that the aspects depicted in the GUIs above are merely examples. Other information and/or additional information can be specified in different GUI embodiments. For instance, some examples of other GUI(s) may, additionally or alternatively, include input fields that facilitate specifying information such as the intended rendering machine type (e.g., laser-based CNC, cutter blade-based CNC, etc.). Some examples of the GUIs may include input fields that facilitate specifying the material (e.g., wood, plastic, leather, etc.) on which and/or from which the rendering machine will render the machine-created design. Other information can be specified as well.

C. Example Rendering Server Logic Embodiments

Figure 5:
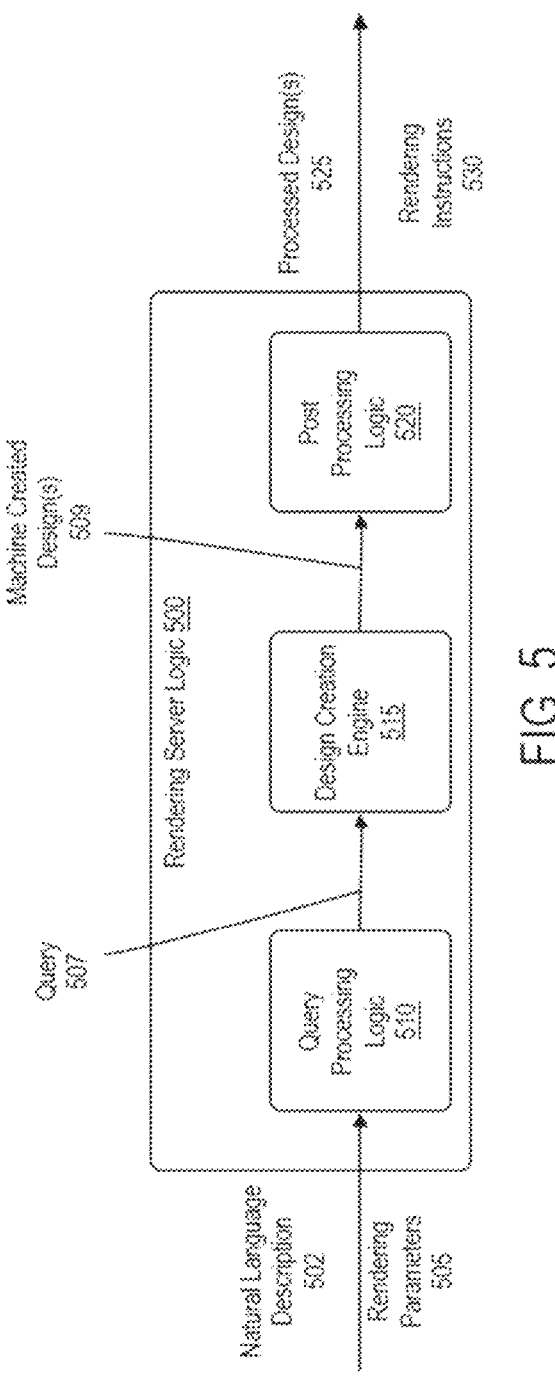
FIG. 5 shows rendering server logic of a rendering server, in accordance with some example embodiments.

FIG. 5 shows an example of rendering server logic 500 implemented by some examples of the rendering server 105. The rendering server logic 500 includes query processing logic 510, AI design-creation engine 515, and post-processing logic 520.

1. Example Query Processing Logic Embodiments

Some examples of the query processing logic 510 are configured to (i) receive the user's natural language description 502 of the desired fabrication result (including, for example, a desired subject and a desired format) and the fabrication parameters 505, (ii) generate a query 507 (or request) based on the natural language description 502 and the rendering parameters 505, and (iii) communicate the query 507 to the AI design-creation engine 515. For instance, in some examples, the query processing logic 510 is configured to receive the natural language description 502 specified by the user and perhaps use one or more rendering parameters 505 that specify one or more aspects of the rendering machine that will be used to generate the rendered fabrication result based on the machine-create design. In some instances, the rendering parameters 505 may additionally include one or more art styles, trending words, rendering machine types, material types, etc., that may have been specified by the user (or provided by software). The query processing logic 510 in some example implementations then converts or represents this information in the form of a query 507 (or request) that is passed to the AI design-creation engine 515.

As noted above, some examples of the natural language description 502 correspond to a description like "etching of a Guinea pig knight riding a horse," "etching of a large red house with children playing in the front," etc. Other examples of the natural language description 502 include "3D Cone Object" (e.g., corresponding to design 1010), "3D Assembled Sheep" (e.g., corresponding to design 1014), or "3D box" (e.g., corresponding to design 1018). In some examples, an audio representation of the natural language description 502 of the desired fabrication result can be specified by the user (e.g., via a microphone of the user terminal 115). In this regard, some examples of the query processing logic 510 include speech-to-text logic configured to convert the spoken query into a textual representation. In some examples, the speech-to-text logic corresponds to a speech-to-text application that is built into the operating system of the user terminal 115. In some examples, speech-to-text instruction code is communicated to the user terminal 115 from the rendering server 105, or the rendering server

105 directs the user terminal 115 to obtain a speech-to-text application from a particular source (e.g., a different server).

In some examples, if no particular art style has been selected by the user, the query processing logic 510 may select a default art style that is tailored to rendering on the CNC machine (e.g., tailored to laser cutting/engraving) that will be used and, optionally, perhaps the material to be used. Examples of art styles may include vector, brush, pencil engraving, geometric, painting, line art, and so on. As noted above, in some examples, the user may specify the rendering machine type and/or rendering material. In some examples, the query processing logic 510 is configured to infer the rendering machine type based on the application (type of cutting or engraving to be performed) or perhaps based on information about the rendering machine type (e.g., provided by the rendering machine or one or more computing devices associated with the rendering machine).

In some examples, the query processing logic 510 filters or otherwise analyzes the natural language description 502 of the desired fabrication result to replace less commonly used terms in a particular natural language description with more commonly used terms (e.g., replace "petite" with "small"). In some examples, the query processing logic 510 may replace a group of terms with a particular term that more succinctly captures the meaning of the term (e.g., replace "grandiose large house" to "mansion"). In some examples, the query processing logic 510 filters the natural language description to remove inappropriate terms and/or to replace the terms with more commonly accepted and/or politically correct terms. Some embodiments may use the WordNet database and/or Word2Vec model in connection with modifying and/or otherwise revising the natural language description 502 to tailor the query 507 for machine-based design-creation. However, in other examples, the query 507 may include the natural language description 502 in its original, un-modified form.

In examples where the natural language description 502 is processed to better tailor a query for machine-based design-creation, the parameters determined above are combined into the query 507 by the query processing logic 510.

For example, if the original natural language description 502 was "etching of large red house with children playing in the front," and the parameters indicated a laser-based rendering machine and an acrylic rendering material, the query processing logic 510 may generate the query 507 "grayscale large house with children playing in the front." In this example, the query processing logic 510 inserted the term "grayscale image" so that only grayscale images are (preferably) generated by the AI design-creation engine 515 in response to the query 507, which is consistent with the desired format (e.g., etching) specified in the natural language description of the desired fabrication result. Further, the query processing logic 510 removed the term "red" since the color may not be able to be reproduced using a laser-based CNC machine.

On the other hand, if the rendering machine was capable of producing colors, the query processing logic 510 may generate the query 507 with the term "red" in the query 507. In another example, if the rendering machine is a cutting machine (e.g., cuts using a blade), the query processing logic 510 may generate the query 507 "vector large house with children playing in the front" based on the natural language description 502 of "large red house with children playing in the front." In some examples, in addition to removing the term "red" from the natural language description, the query processing logic 510 in some instances may additionally include a "-color" tag to the query 507 that may, in some implementations, constrain the output of the AI design-creation engine 515 to only black-and-white machine-created designs.

In some examples, the generation of the query 507 involves searching a database (e.g., the WordNet database or other synonym database) that relates terms in the natural language description 502 to synonyms for those terms, and then replacing one or more of the terms in the natural language description 502 with corresponding synonyms in the query 507. In some examples, the query processing logic 510 utilizes trained artificial intelligence logic (AI) (e.g., the AI logic 315) to identify terms in the natural language description 502 that should be replaced with alternative terms and/or, in some instances, additionally suggest such replacement terms to a user for selection and/or approval.

2. Example AI Design-Creation Engine Embodiments

Some examples of the AI design-creation engine 515 are configured to use the query 507 from the query processing logic 510 to create (or cause to be created) one or more machine-created designs that, either alone or in some combined form, can be used in connection with generating a rendered fabrication result based on the desired fabrication result contained in the natural language description 502. In some examples, the AI design-creation engine 515 comprises one or more servers implementing the Stable Diffusion deep learning, text-to-image model, which is a deep generative neural network developed by the Comp Vis group at the Ludwig Maximilian University of Munich in Germany. In other examples, the AI design-creation engine 515 comprises one or more servers configured to communicate with one or more separate servers configured to implement the Stable Diffusion algorithms. In other examples, the AI design-creation engine 515 comprises an AI engine (sometimes referred to as a generative AI model herein) that has been trained with training data comprising fabrication result descriptions and designs corresponding to the fabrication result descriptions in any manner disclosed herein.

For example, a query 507 that includes "grayscale image of large house with children playing in the front" may cause the AI design-creation engine 515 to create (or cause to be created) one or more machine-created designs that are determined to have a high probability of including and/or corresponding to grayscale images of houses, children playing, etc.

In another example, a query 507 that includes "3D Assembly Sheep" may cause the AI design-creation engine 515 to create (or cause to be created) one or more machine-created designs that are determined to have a high probability of including and/or corresponding to a set of shapes that can be cut from one or more materials and then assembled to form a 3D sheep figurine similar to design 1014.

In yet another example, a query 507 that includes "engraving of Mt. Everest" may cause the AI design-creation engine 515 to create (or cause to be created) one or more machine-created designs that are determined to have a high probability of including and/or corresponding to an image of Mt. Everest that can be etched or engraved onto a flat (or substantially flat) surface of a material, such as a flat piece of acrylic, a flat piece of wood, a flat piece of glass, a piece of textured glass, acrylic, or wood, or any other suitable material. In a related example, a query 507 that includes "3D engraving of Mt. Everest" may cause the AI design-creation engine 515 to create (or cause to be created) one or more machine-created designs that are determined to have a high probability of including and/or corresponding to a 3D engraving of Mt. Everest onto a material, where the 3D engraving is similar to a relief map of Mt. Everest and perhaps surrounding mountains.

In this regard, some examples of the AI design-creation engine 515 are in networked communication with one or more other systems that include AI design-creation software. In some instances, the AI design-creation software may rely on repositories of designs upon which the AI design creation software uses to create new machine-created designs 509.

In some examples, the design-creation software may be configured to combine one or more features from several different base designs into a new machine-created design 509. For instance, some examples of the AI design-creation engine 515 identify and select particular features in particular base designs. The selected features are then merged or otherwise combined to create a new machine-created design 509. In some embodiments, blurring operations may be performed on the edges of the selected features so that the transitions in the machine-created design 509 between the combined features of the several base designs appear less abrupt. In some cases, the resolutions, scale, color, amount of noise, etc., of the selected features from the base designs are adjusted to be the same (or similar) so that the features of the selected features appear more consistent in the machine-created design 509.

To illustrate these aspects, consider a query 507 that includes "etching of a red house on a farm with children playing in front." After receiving the query 507, the AI design-creation engine 515 (individually or in combination with one or more other computing systems) may obtain images depicting red houses, images depicting farms, and images depicting several children playing. The AI design-creation engine 515 (individually or in combination with one or more other computing systems) may then select the red house from the first image, the farm from the second image, and the children from the third image and generate a machine-created design 509 that includes one or more of the selected features from the several images. The characteristics (e.g., resolutions, scale, color, amount of noise, etc.) of the selected features may be adjusted to match or at least be consistent with each other. The adjusted features may be blended together within the machine-created design 509. Some examples of the machine-created design 509 correspond to flattened images and are specified in an industry-standard format such as JPEG, PNG, TIFF, etc. Some examples of the machine-created design 509 are represented in a layered format where different features and blending operations are specified on different layers.

In some examples, multiple candidate machine-created designs 509 are generated according to any of the operations disclosed herein. Each candidate machine-created design 509 is then assigned a suitability score based on the ability of a rendering machine (e.g., a user-selected rendering machine) to reproduce the candidate design. For example, designs that include vector graphic-based machine-created designs may be more suited to being rendered via vector-based rendering machines (e.g., CNC-based rendering machines), whereas designs that include bitmap-based machine-created designs may be more suited to being rendered via rendering machines capable of rendering rasterized designs. When multiple candidate machine-created designs are available, those having a suitability score above a threshold (which may be based on user selection) may be communicated to the post-processing logic 520, and those having a suitability score below the threshold may be discarded.

In some examples, the selection of the base images and/or designs, the features therein, the adjustment of the characteristics, and the blending of the adjusted features are performed by AI logic 315 that has been trained to perform these operations. In some examples, the AI logic 315 of the rendering server 105 is configured to perform these operations. That is, the AI logic 315 receives the query 507 from the query processing logic 510 and outputs the machine-created designs 509.

In some examples, one or more different server systems (e.g., remote from the rendering server 105) are used to generate the machine-created design(s). For instance, in some examples, the rendering server 105 communicates the query 507 to a server (e.g., one or more servers implementing the Stable Diffusion model or any other AI algorithm(s) suitable for use in generating machine-created designs), which is configured to perform one or more of the operations described above. This system is then configured to return one or more machine-created designs 509 to the rendering server 105 in response to the query 507.

3. Example Post-Processing Logic Embodiments

Some examples of the post-processing logic 520 are configured to adjust or tailor a machine-created design 509 to generate a processed design 525 that is more suitable for rendering via the rendering machine and/or for making the machine-created design 509 more suitable for rendering on a particular material.

For instance, in some examples, it may be desirable to upscale the machine-created design 509 to an engrave-suitable resolution (e.g., 1024px), where the upscaling algorithm may be dependent on the style that is defined. For example, a different upscaling algorithm may be used if the design is "line art" or "Pencil art" to remove noise and artifacts that may be different from another style.

In another example, it may be desirable to transform a machine-created design 509 comprising a 2D image into a 3D engrave-able design. In some such examples, aspects of the 2D image may depict depths which can be mapped to a depth map for use with generating the 3D engravable design.

Other examples of the post-processing logic 520 are configured to adjust the contrast and/or sharpness of aspects of the machine-created design 509. In some examples, the post-processing logic 520 constraints, for example, the luminance level (e.g., gray level) of the machine-created design 509 to within predetermined upper and lower values (e.g., predetermined lightness/darkness) to make the processed design 525 more suitable for etching/engraving, for example. In some examples, the predetermined upper and lower values are based on the type of rendering machine to which the machine-created design 509 will be rendered. In some examples, the post-processing logic 520 removes or deletes irregularities (e.g., discontinuities, etc.) from the machine-created design 509 to create the processed design 525 used for generating the physical rendering.

In some examples, the post-processing logic 520 "vectorizes" the machine-created design 509. For instance, some examples of the post-processing logic 520 perform a tracing operation on bitmapped representations of the machine-created design 509. The tracing operation generates outlines or filled outlines (specified in the form of one or more path segments) that represent the features of the machine-created design 509 to make the processed design 525 more suitable for cutting, for example.

In some examples, when the machine-created design 509 is already in vector form, the post-processing logic 520 adjusts the vector representation to ensure, for example, that the width of any fills is greater than a minimum fill width that can be implemented via the rendering machine. When the fill width for a particular feature is below this minimum amount, the feature may be converted to a non-filled path outline.

In some examples, one or more of the post-processing operations discussed above are performed by the AI logic 315 of the rendering server 105. In this regard, some examples of the AI logic 315 are trained to identify irregularities (e.g., discontinuities, etc.) in the machine-created design 509. Some examples of the AI logic 315 are trained to identify features in the machine-created design 509 to facilitate tracing features of the machine-created design 509 (e.g., to facilitate vectorizing the machine-created design 509).

In some examples, the AI logic 315 is trained using a training set of designs that includes a first set of designs that were able to be rendered within a reasonably acceptable quality level and a second set of designs that were unable to be rendered within a reasonably acceptable quality level.

In some cases, the AI logic 315 may implement different AI models that have been trained with different design sets corresponding to different fabrication types. For example, a first AI model for 3D assembly designs may be trained with a first set of 3D assembly designs that were able to be rendered within an acceptable quality level and a second set of 3D assembly designs that were unable to be rendered within the acceptable quality level. Similarly, a second AI model for 3D object designs may be trained with a first set of 3D object designs that were able to be rendered within an acceptable quality level and a second set of 3D object designs that were unable to be rendered within the acceptable quality level. Similar AI models could be trained with similar "good" and "bad" designs for each of the design types, e.g., engraving designs, cutting designs, 3D object designs, 3D assembly designs, and so on.

Some embodiments may additionally include training the above-described AI models for the different design fabrication types (e.g., engraving designs, cutting designs, 3D object designs, 3D assembly designs, and so on) for different types of rendering machines. For example, a particular rendering machine type may have been determined to be able to reproduce a particular design within a reasonably acceptable level, whereas a different rendering machine type may have been unable to do the same. In this manner, individual rendering machine types may implement different AI models for each of the different design fabrication types.

Training the AI logic 315 using the various training sets of designs configures the AI logic 315 to be able to determine whether a particular machine-created design 509 will be reproducible as a particular design fabrication type, and even whether the particular machine-created design 509 is likely to be rendered with an acceptable level of quality on a particular type of rendering machine.

In some instances, the AI logic 315 may be configurable to additionally determine what aspects of the machine-created design 509, if any, may need to be adjusted to enable a particular rendering machine to generate a physical rendering of the machine-created design 509 to within an acceptable quality level. In some examples, the AI logic 315 may be further configured to iteratively adjust various aspects of the machine-created design 509 (e.g., contrast, brightness, line thickness, etc.) until the machine-created design 509 has been transformed into a processed design 525 determined by the AI logic 315 to be reproducible as a physical rendering via a desired rendering machine to within a reasonably acceptable level.

In some examples, after the post-processing logic 520 has generated one or more processed design (s) 525 based on the machine-created design 509, the processed design(s) 525 are presented to the user. For example, the GUI 425 of FIG. 4C or a similar GUI may be presented to the user. In some examples, the processed design 525 is composited onto an image of the material upon which the processed design 525 will be rendered.

An image of the material upon which the processed design 525 will be rendered can be obtained via any of several different ways.

For example, the image of the material can be obtained via a camera within the CNC machine. In this example, once the material has been placed within the CNC machine, a camera within the CNC machine (e.g., mounted on the lid of the CNC machine, mounted on a moveable gantry within the CNC machine, or any other suitable location within the CNC machine) captures an image of the material upon which the processed design 525 will be rendered. Then, the processed design 525 is composited on the captured image and presented to the user via the GUI 425.

In another example, the image of the material is retrieved from memory/storage based on an identification of the material (potentially through imaging recognizing the material or user input, etc.). In this example, a user may select the material type (e.g., wood, glass, acrylic, and so on), or alternatively, the laser CNC machine may identify a material type of material that has been placed within the laser CNC machine (e.g., via detecting an RFID, scanning a barcode, analyzing a captured image of the material, or other suitable material type detection method). Then, an image of the selected material type is obtained from memory/storage (e.g., locally on the CNC machine or controller device, from a network location, from the Internet, or other storage location), and the processed design 525 is composited on the obtained image and presented to the user via the GUI 425.

For instance, if the processed design 525 will be rendered on a wood material, the processed design 525 may be superimposed onto an image of the wood material, and the combined image (i.e., the wood image and the processed design 525) may be presented in the GUI. In some examples, the GUI may provide a material selector that allows the user to cycle through different types of material so that the user can see how the processed design 525 will appear on different types of materials.

Additional features and aspects of visually previewing laser fabrication projects prior to fabrication are disclosed and described in U.S. application Ser. No. 15/334,095, titled "Visual preview for laser fabrication," filed on Oct. 25, 2016, and issued on Dec. 31, 2019, as U.S. Pat. No. 10,520,915, the entire contents of which are incorporated herein by reference.

Some examples of the post-processing logic 520 are also configured to generate rendering instructions 530 based on the processed design 525. Some examples of the rendering instructions 530 specify instructions that, when executed by a particular rendering machine, control the rendering machine to move a cutting head in up to three dimensions as a function of time. Some examples of the rendering instructions 530 additionally specify the intensity of, for example, a laser of the cutting head to control the rate or amount of material removed at any instant. In some examples, the render machine implementation instructions 530 are automatically communicated to a rendering machine 110 in networked communication with the rendering server 105 after receiving an indication from the user to do so. In some examples, the render machine implementation instructions 530 can be downloaded and saved to facilitate rendering the machine-created design or the processed design 525 on (or from) an article at a later time.

D. Example Variations of Rendering Server Logic Embodiments

Figure 6:
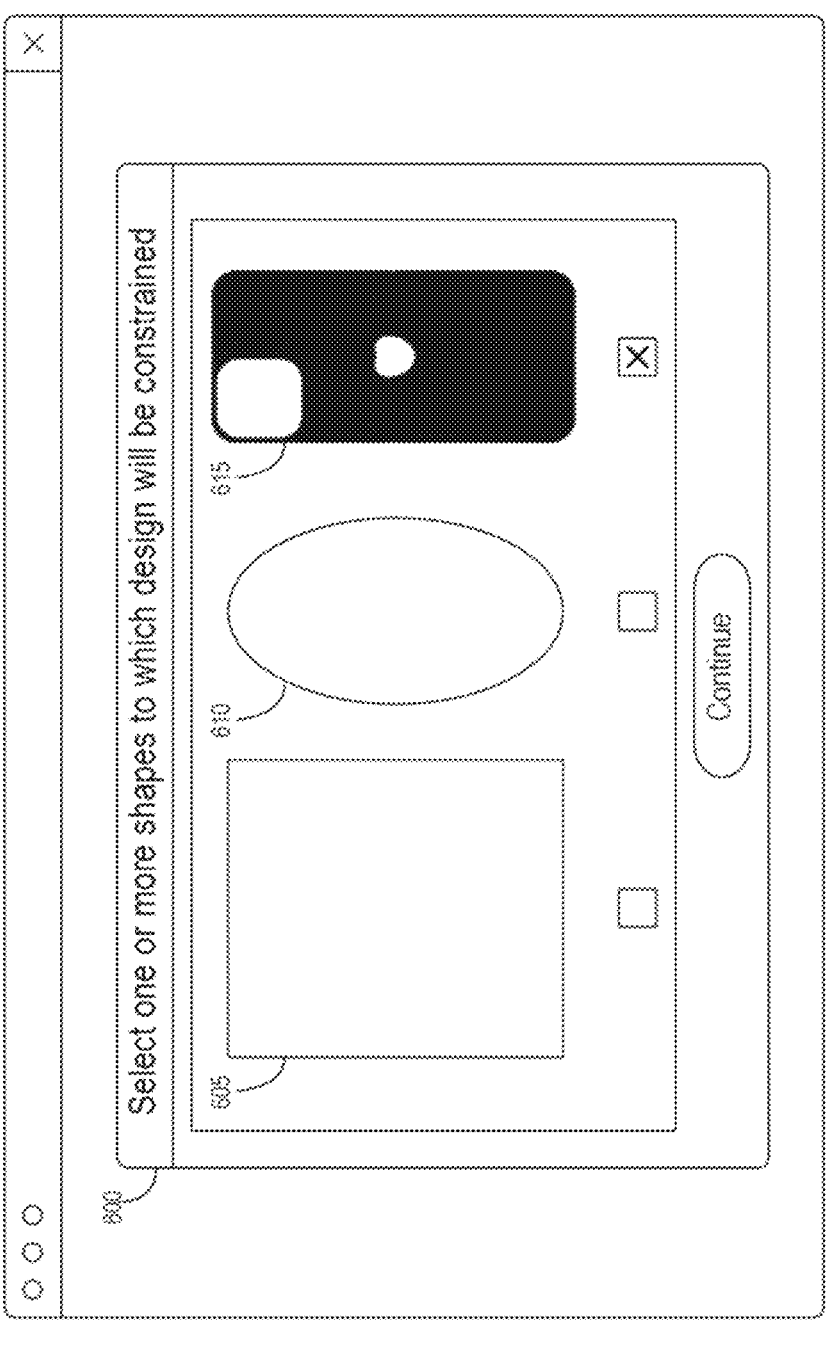
FIG. 6 shows a GUI that facilitates selecting the shape of an article upon which a design will be rendered to generate a rendered fabrication result, in accordance with some example embodiments.

As noted above, some examples of the query processing logic 510 are configured to receive a natural language description 502 and convert the natural language description 502 into a query 507 for subsequent communication to the AI design-creation engine 515. In some examples, the rendering parameters 505 specify the shape of an article upon which (or from which) a design will be rendered to facilitate tailoring the machine-generated design (i.e., design 509 or processed design 525) outputted by the rendering server logic 500 to a particular shape, object, or other dimensional limitation. For example, as shown in FIG. 6, the user may be presented with a GUI 600 that facilitates selecting shapes that specify an article having a square shape 605, an oval shape 610, or an arbitrary shape 615.

In some examples, the GUI may include controls that facilitate drawing a custom shape. For instance, the GUI may include a canvas and tools that facilitate drawing a custom shape on the canvas. Some examples of tools include path tools, outline tools, fill tools, scale adjustment tools, etc. In some examples, the GUI may depict the shapes of popular articles such as phones, tablets, computers, etc. In this regard, some examples of the GUI include a search option that facilitates wildcard searching through a database of popular shapes to locate a desired shape.

In some examples, the rendering server 105 is configured to allow users to upload custom shapes. For example, an image, vector representation, etc., of a desired shape can be uploaded to the rendering server 105 and specified via the rendering parameters 505.

Some examples of rendering machines include one or more cameras or images that facilitate capturing an image of an article placed within or on the rendering machine. In this regard, in some examples, the user may be given an option via a GUI to scan an article that is placed within or on the rendering machine. In some examples, feature detection operations (e.g., edge detection) may be performed on the image of the scanned article to identify different features of the article. The operations may be performed by the rendering machine and/or by the rendering server 105. In some examples, the scanned image is presented to the user via a GUI, and the user can select the features of the article that should be specified in the query 507.

Additional features and aspects of edge and feature detection are disclosed and described in both (i) U.S. application Ser. No. 15/823,502, titled "Fabrication with Image Tracing," filed on Nov. 27, 2017, and issued on Feb. 15, 2022, as U.S. Pat. No. 11,249,456, and (ii) U.S. application Ser. No. 17/668,988, titled "Edge Detection for Computer Numerically Controlled Fabrication," filed on Feb. 10, 2022, published on Feb. 2, 2023 as U.S. Pub. 2023/0029940, and currently pending. The entire contents of U.S. Pat. No. 11,249,456 and are incorporated herein by reference.

In some examples, the AI design-creation engine 515 adjusts one or more aspects of the machine-created design 509 (or perhaps the processed design 525) to match the shape of the article on which the design is to be rendered.

For example, one or more aspects or features of the article (e.g., shape of the article, cutouts in the article, surface grain of the article, and so on) can be provided to the AI design-creation engine 515 for use in generating a design. In some instances, the one or more features of the article can be provided via user input, e.g., the input prompt (text or spoken) to the AI design-creation engine 515. In some instances, the one or more features of the article can be provided in the form of one or more images of the article, e.g., one or more images of the article obtained from a camera, including a camera positioned with the laser CNC machine or a camera separate from the laser CNC machine (e.g., an image obtained from a user's smartphone or similar). In some examples, an image of the article showing the features of the article can be provided along with the user prompt to help guide the AI design-creation engine 515, where the user prompt instructs the AI design-creation engine 515 to consider a particular feature of the article when creating the design.

For example, the design-creation engine 515 can be instructed to use the one or more features of the article as design constraints or perhaps a design feature when creating the machine-created design 509. In one example, the design-creation engine 515 may use a hole or cutout in the article as a constraint in an etching design, and plan an etching around the cutout in the article. In another example, the design-creation engine 515 may use the hole or cutout in the article as part of the design, e.g., where the hole is used as a ball, sun, etc. in the machine-created design 509

In other examples, the AI design-creation engine 515 may scale the machine-created design 509 (or perhaps the processed design 525) to fit the shape of the desired article upon which the machine-created design 509 (or 525) will be rendered. The AI design-creation engine 515 may pan the image horizontally and/or vertically so that the machine-created design 509 (or perhaps the processed design 525) is centered within the article or so that more prominent features of the machine-created design 509 (or perhaps the processed design 525) are centered upon the article. For example, features along the edges of the machine-created design 509 (or 525) that may be less important may be sacrificed.

In some examples, one or more of these operations may additionally or alternatively be performed by the post-processing logic 520.

As shown in FIG. 7A, in some examples, a GUI 700 that depicts the processed design(s) 525 fit to the desired article is presented to the user. In some examples, the user is presented with multiple options, and the user may select one or more of the options for rendering via the rendering machine.

III. EXAMPLE OPERATIONS PERFORMED BY DEVICES OF THE ENVIRONMENT

Figure 8A:
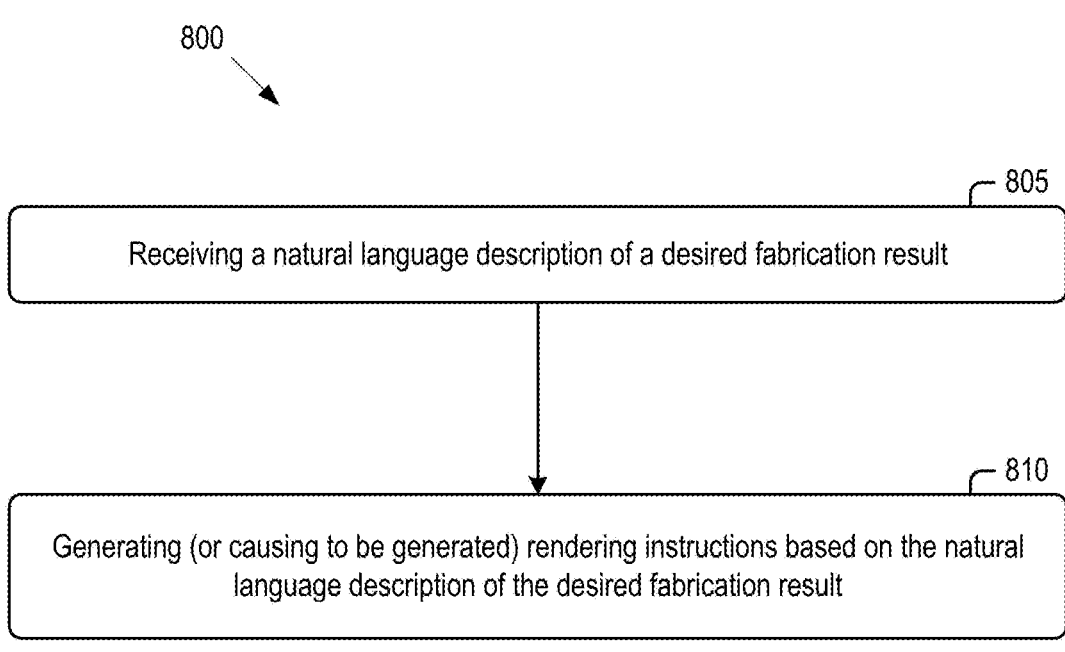
FIG. 8A shows a method comprising operations that may be performed by devices of the environment, in accordance with some example embodiments.

FIG. 8A shows an example method 800 performed by one or more devices of the environment 100 of FIG. 1. Example method 800 may be performed by individual devices or collectively by a group of devices. In this regard, some examples of the devices shown in the environment of FIG. 1 include one or more processors and tangible, non-transitory computer-readable media or memory storage devices that store instruction code that, when executed by the corresponding processors, cause the corresponding device(s) to perform one or more of the operations disclosed and described with reference to method 800.

Method 800 begins at block 805. The operations at block 805 include receiving a natural language description of a desired fabrication result. In some embodiments, the desired fabrication result includes a desired subject and a desired format (e.g., etching, 3D object, 3D assembly, 3D puzzle, and so on). Examples of a natural language description of desired fabrication result comprising a desired subject and a desired format include "3D engraving of Mt. Everest," "3D puzzle of a T-Rex," "3D Assembly Sheep," "etching fields of flowers," and so on.

Next, method 800 advances to block 810. The operations at block 810 include generating (or causing to be generated) rendering instructions based on the natural language description of the desired fabrication result from block 805. In some embodiments, the machine-created rendering instructions generated in block 810 comprises or corresponds to rendering instructions that are executable by a CNC machine to render a fabrication result.

In some embodiments that include generating the machine-created rendering instructions, block 810 includes generating the machine-created rendering instructions according to any of the AI methods disclosed and described herein, or any other AI method now known or later developed that is suitable for generating machine-created rendering instructions for use with CNC machines. In some embodiments that include causing the machine-created rendering instructions to be generated, block 810 includes instructing a computing system to generate (or requesting that the computing system generate) the machine-created rendering instructions, where such computing system is configured to generate machine-created rendering instructions according to any of the AI methods disclosed and described herein, or any other AI method now known or later developed that is suitable for generating machine-created rendering instructions for use with CNC machines.

For example, and as described herein, generating machine-created rendering instructions at block 810 according to any of the AI methods disclosed and described herein includes, among other aspects, generating the machine-created rendering instructions (e.g., with an AI design-creation engine or similar) that has been trained with training data comprising design files according to any of the previously-disclosed training scenarios. In some embodiments, the training data comprises (i) fabrication result descriptions and (ii) rendering instructions corresponding to the fabrication result descriptions. For example, in some embodiments, the AI design-creation engine has been previously trained with data (e.g., images, designs, or other data) representing design files and corresponding text (e.g., labels, tags, or other descriptors) representing the desired fabrication results. An AI design-creation engine trained with such training data is better able to interpret natural language descriptions of desired fabrication results to generate machine-created rendering instructions that can be implemented by a rendering machine to produce a rendered fabrication result.

In some embodiments, aspects of generating machine-generated rendering instructions at block 810 additionally include modifying a natural language description of a desired fabrication result to provide additional information for use by the AI design-creation engine for use in generating the machine-created rendering instructions.

Some such embodiments include appending one or more tokens, tags, or other descriptors to the natural language description of the user's desired fabrication result (from block 805) consistent with any of the procedures disclosed herein. Examples of appending one or more tokens, tags, or other descriptors to a user's natural language description may include adding one or more of the following tags/tokens to a natural language description: (i) a "black and white, high contrast" positive tag/token, (ii) adding a "color" negative token, (iii) adding a "line art" positive tag/token, or (iv) adding a "depth" positive tag/token. Adding positive and/or negative tags, tokens, and/or other descriptors to the natural language description of the desired fabrication result in such a manner can help guide the AI design-creation engine to generate machine-created rendering instructions that, when executed by a CNC machine, cause the CNC machine to generate a rendered fabrication result.

In some embodiments, aspects of generating machine-generated rendering instructions at block 810 additionally include transforming initial machine-created rendering instructions to make the machine-created rendering instructions more appropriate for execution via a CNC machine and/or more consistent with desired fabrication results.

In some examples, transforming initial machine-created rendering instructions output from the AI design-creation engine into a processed design (e.g., generating a processed design 525) includes processing the initial machine-created rendering instructions according to any of the processing techniques disclosed herein, e.g., transforming aspects of a 2D image depicting depths into depth map data for use with generating a 3D engrave-able design based on the 2D image. Any other similar processing procedure could be additionally or alternatively used to make machine-created rendering instructions either (i) more suitable for fabrication/execution via a particular rendering machine and/or (ii) more consistent with a desired fabrication result.

Some embodiments additionally include presenting the machine-created rendering instructions (or one or more images corresponding thereto) to the user for selection and/or approval to be (i) fabricated via a rendering machine and/or (ii) incorporated into another design for fabrication via a rendering machine.

Some example embodiments of method 800 may additionally include (i) receiving rendering parameters that specify aspects of the rendering machine, (ii) generating a query (e.g., query 507) based on (ii-a) the natural language description of the desired fabrication result received at block 805 and (ii-b) the rendering parameters, and (iii) communicating the query to the AI design-creation engine configured to generate one or more machine-created rendering instructions based on the query.

In some examples, receiving rendering parameters includes receiving rendering parameters that specify aspects of the rendering machine, including, for example, receiving one or more parameters that specify a rendering machine type. Examples of rendering parameters that specify aspects of the rendering machine include, but are not limited to, the type of machine (e.g., laser CNC machine, 3D printer, etc.), the make of machine (e.g., Glowforge Aura™, Glowforge Pro), the class of machine (e.g., laser CNC machine with 40 W laser, laser CNC machine with 20 W laser cutter), or other aspects of the rendering machine that are relevant to the type of design(s) that can be implemented by the rendering machine.

In some examples, receiving rendering parameters additionally or alternatively includes receiving one or more parameters that specify a material upon which the rendering will be applied (e.g., for etching or engraving designs) and/or a material from which the design will be rendered (e.g., for cutting designs, 3D object designs, 3D assembly designs, etc.). Examples of materials include, but are not limited to, acrylic, hardwood, leather, plywood, veneer, Draftboard™, eco iron-on, and so on.

In some examples, receiving rendering parameters additionally or alternatively includes receiving rendering parameters that specify one or more art styles associated with the desired fabrication result received at block 805. In some instances, the one or more art styles comprise vector, brush, pencil engraving, geometric, painting, adult coloring book, super cute, charcoal drawing, watercolor, vintage storybook, heroic portrait, sticker, and/or line art styles.

In further examples, such as examples where the natural language description may not include a desired fabrication result in the manner described above, receiving rendering parameters includes receiving rendering parameters that specify one or more fabrication types (e.g., desired fabrication results) associated with desired fabrication results. In some instances, the fabrication types/desired fabrication results include, for example, etching or engraving designs, cutting designs, 3D object designs, 3D assembly designs, and/or other fabrication formats and/or fabrication output forms disclosed herein.

In some examples, generating of the rendering instructions at block 810 additionally or alternatively includes post-processing the machine-created rendering instructions (generated at block 810) into processed rendering instructions. Some such examples further include using the processed rendering instructions to generate the fabrication result.

In some examples, post-processing of the machine-created rendering instructions involves converting one or more aspects of the machine-created rendering instructions to adapt the machine-created rendering instructions for implementation via a rendering machine, e.g., for a grayscale image, converting one or more aspects the machine-created rendering instructions to a line drawing, and/or adjusting the scale of the machine-created rendering instructions to match the scale of an article upon which (or from which) the design is to be rendered.

Some examples additionally or alternatively include generating (or otherwise obtaining) a plurality of candidate machine-created rendering instructions based on the query (which was based on the natural language description of the desired fabrication result). Then, for each of the candidate machine-created rendering instructions, assigning a suitability score to the candidate machine-created rendering instructions based on a computer analysis of the candidate machine-created rendering instructions. Some embodiments additionally include providing candidate machine-created rendering instructions having a suitability score above a threshold for user selection to be used as the machine-created rendering instructions that will be used by the CNC machine to generate the rendered fabrication result.

In some embodiments, the suitability score for a particular design may be increased if the design is selected by a user for rendering and/or perhaps decreased if not selected by the user for rendering. Designs that have been selected for rendering by users can be included in training data used for training the AI model(s) that are used to generate designs.

In some examples, the rendering machine corresponds to a computer-numerical-control (CNC) rendering machine.

In some embodiments, the CNC machine (e.g., a laser CNC machine) comprises one or more processors and tangible, non-transitory computer-readable memory with instructions stored thereon, where the instructions, when executed by the one or more processors, cause the CNC machine to perform any one or more (or all) of the feature and/or functions described herein. For example, in some instances, the CNC machine itself is configured to (i) receive a natural language description of a desired fabrication result comprising a desired subject and a desired format, (ii) generate machine-created rendering instructions based on the natural language description of the desired fabrication result, and (iii) execute the rendering instructions to generate a rendered fabrication result. In this manner, the CNC machine itself in some embodiments is configured to perform any one or more (or all) of the features and functions disclosed herein.

In some examples, the rendering instructions comprise instructions executable by a laser-based CNC machine to control a laser cutter of the laser-based CNC machine to generate a physical rendering based on the machine-created rendering instructions.

Figure 8B:
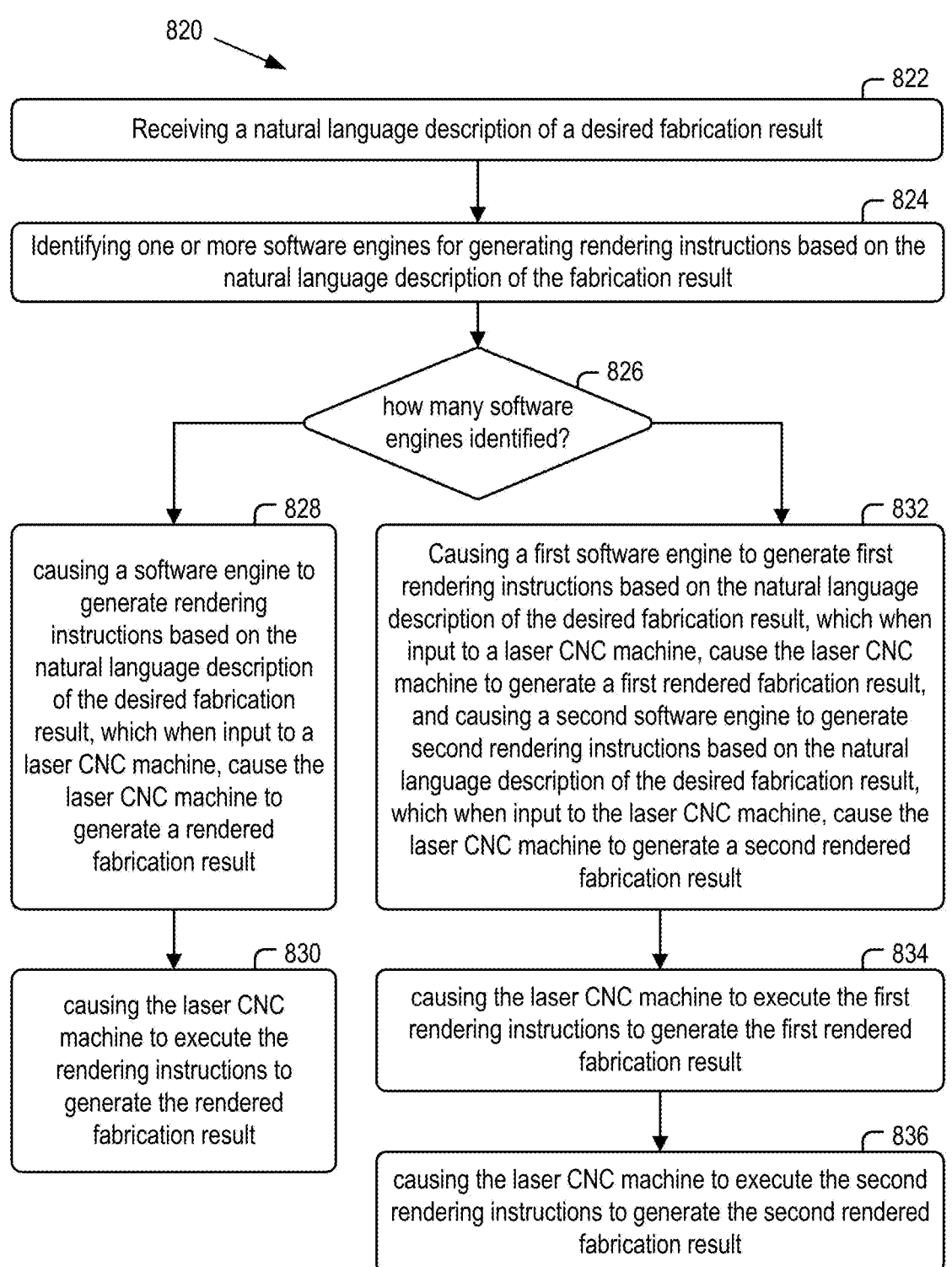
FIG. 8B shows a method comprising operations that may be performed by devices of the environment, in accordance with some example embodiments.

FIG. 8B shows a method 820 that may be performed by one or more devices of the environment (FIG. 1), individually or in combination with each other, in accordance with some example embodiments. Aspects of method 820 are described with reference to a laser CNC machine for illustration purposes. However, aspects of method 820 are equally applicable to other types of CNC machines (e.g., CNC cutting machines) as well other computer controlled fabrication systems more generally (e.g., 3D printers).

Method 820 begins at method block 822, which includes receiving a natural language description of a desired fabrication result. In some embodiments, the natural language description of the desired fabrication result is received directly or indirectly from a CNC machine user.

In some embodiments, the desired fabrication result from block 822 includes (i) a desired subject and (ii) one or more fabrication parameters.

The subject can be nearly any subject that a CNC machine user can describe in words. In some embodiments, the subject may additionally or alternatively include an image, e.g., image 1012 (FIG. 10A).

In some embodiments, the image (e.g., image 1012) is provided to an image classifier configured to return a text description of the image. For example, an image classifier might return the word "sheep" in response to receiving image 1012 for classification. In some embodiments, the image is provided to an AI engine configured to generate a comparatively more detailed description of the image, e.g., Microsoft's Azure AI Vision tool (available at https://portal.vision.cognitive.azure.com/gallery/imageanalysis), which analyzes images and generates text-based descriptions of images. For example, the AI Vision tool might return the description of "a sheep standing on hay" in response to receiving image 1012 to generate a detailed text-based description. The text-based description of the image can be (i) used as the subject or (ii) combined with a subject received from the CNC machine user.

The one or more fabrication parameters correspond to any one or more of characteristics of the desired fabrication result, the material to be used, a type of CNC machine to use, and/or a particular fabrication method.

Examples of a desired fabrication result include an etching on a flat surface, an engraving on a flat surface, a cutting on a flat surface, generating a flat object (e.g., cutting the object from a flat piece of material), an etching on a non-flat surface, an engraving on a non-flat surface, a cutting on a non-flat surface, generating a non-flat object, generating an object for assembly, and so on.

Examples of the type of material to be used include wood, leather, metal, acrylic, glass, or other materials that can be used by a CNC machine. In some instances, the type of material may be implied based on material that has been placed into the CNC machine. For example, if a piece of acrylic has been placed in the CNC machine (and detected by the CNC machine, e.g., via a camera, barcode scanner, or other sensor, or otherwise known to the CNC machine, e.g., via a user input separate from the desired fabrication result), then the acrylic material may be implied in the desired fabrication result.

Examples of a type of CNC machine to use include "using a laser cutter," "using a Glowforge machine," and so on. In some instances, the type of CNC machine may be implied. For example, if a user has selected a certain type of CNC machine within the user interface, then that particular machine (and the capabilities and limitations thereof) may be implied in the desired fabrication result. For example, the controller application may include a pull-down menu that includes all of the CNC machines that the user owns or has access to use. When one of the CNC machines is selected from that pull down menu in connection with a query, the selected CNC machine type may be implied for that query.

Examples of fabrication methods include "using an additive fabrication method," "using a subtractive fabrication method," and so on. In some instances, the fabrication method may be implied based on the type of machine a user has. For example, if the user has a 3D printer that implements an additive fabrication method, then the additive fabrication method may be implied in the desired fabrication result. Similarly, if the user has a laser CNC machine that implements a subtractive fabrication method, then the subtractive fabrication method may be implied in the desired fabrication result.

One example of a natural language description of desired fabrication result includes "A guinea pig knight riding a horse etched on wood" as discussed and described with reference to FIGS. 4B-4E. Other examples of natural language descriptions of desired fabrication results include (i) "A box big enough to hold 2 decks of cards with a dragon image etched onto the lid"; (ii) "A set of 5 coasters with a different flower etched on each coast"; (iii) "A child's puzzle with 'JOHN' etched on the puzzle" (where the child's name is John); or (iv) "Create the following design to be fabricated using my Glowforge machine. First, generate a 4-inch square box with a lid. Then, etch an image of a frog onto the lid. The box is made from ⅛ inch birch wood."

In operation, the desired fabrication result can include as much or as little detail as desired. However, a desired fabrication result containing more detail will typically return rendering instructions that will enable the CNC machine to generate a fabrication result that is more likely to meet user expectations than a desired fabrication result containing comparatively fewer details.

Therefore, after receiving the natural language description of the desired fabrication result at block 822, some embodiments additionally include generating one or more follow up questions relating to the natural language description of the desired fabrication result, including follow up questions to obtain further information about the desired fabrication result, such as information to help clarify and/or more narrowly define the desired fabrication result.

For example, if the desired fabrication result includes "a box that can assembled from flat wood cutouts," the one or more follow up questions may include follow up questions, such as "What dimensions should the box have?" or possibly a set of questions such as "How wide would you like the box?", "How deep would like the box?", and so on. In another example, if the desired fabrication result includes "a picture of a flower etched onto glass," the one or more follow up questions may seek further clarification, such as "Would you like a particular type of flower, or would you like me to select one for you?" In another example, if the desired fabrication result includes "a dinosaur puzzle," the one or more follow up questions may seek further clarification, such as "How many pieces should the puzzle have?", "What dimensions should the puzzle have?", "Would you like the puzzle to be square or have some other shape?", "Would like a particular type of dinosaur, or would you like me to select one for you?", and so on. In another example, if the desired fabrication result includes "a box that can be assembled from flat wood cutouts," the one or more follow up questions may additionally or alternatively seek information related to additional features and/or options that tend to be commonly requested, such as "Would you like the box to have a lid that opens?" or "Would you like a design or image added to any of the surfaces of the box?"

In operation, answers to the one or more follow up questions are used as inputs to help guide a generative artificial intelligence engine toward creating rendering instructions for a fabrication result that is more likely to meet expected results as compared to a fabrication result created without the benefit of answers to the one or more follow up questions.

Next method 820 advances to method block 824, which includes identifying one or more software engines for generating rendering instructions based on the natural language description of the desired fabrication result. In some embodiments, identifying one or more software engines for generating rendering instructions based on the natural language description of the desired fabrication result at block 824 includes identifying one or more generative AI models to use for generating rendering instructions based on the natural language description of the desired fabrication result.

In particular, and as mentioned previously, some embodiments may use different generative AI models to produce rendering instructions for different types of CNC machines (e.g., 3D printers, laser CNC machines, etc.), different types of materials (e.g., wood, leather, acrylic, glass, metal, etc.), different types of rendering procedures (e.g., additive fabrication, subtractive fabrication, laser cutting, mechanical cutting, etc.), and/or different fabrication results (e.g., 3D assemblies, etchings, cuttings, etc.). However, some embodiments may use a common generative AI model to produce rendering instructions for all types of rendering machines, materials, rendering procedures, and/or fabrication results. Still other embodiments may use two or more different generative AI models depending on different combinations of types of rendering machines, materials, rendering procedures, and/or desired fabrication results. Accordingly, for embodiments that may have access to more than one generative AI model to use for generating rendering instructions, method block 824 includes determining which of the available AI models can (and/or perhaps should) be used to generate the rendering instructions.

In some examples, only a single generative AI model may be required to generate a fabrication result. For instance, one of the earlier-mentioned examples of a natural language description of the desired fabrication result included "A guinea pig knight riding a horse etched on wood." In this scenario, identifying one or more software engines for generating rendering instructions based on the natural language description of the fabrication result at block 824 may include identifying one generative AI model to use, e.g., a "Wood Etching" generative AI model.

In other examples, two or more generative AI models may be used to generate a fabrication result. For instance, one of the earlier-mentioned examples of a natural language description of the desired fabrication result included "Create the following design to be fabricated using my Glowforge machine. First, generate a 4-inch square box with a lid. Then, etch an image of a frog onto the lid. The box is made from ⅛ inch birch wood." In this scenario, identifying one or more software engines for generating rendering instructions based on the natural language description of the fabrication result at block 824 may include identifying two generative AI models to use, where the first model is a "3D Assembly" generative AI model and the second model is a "Wood Etching" generative AI model.

Based on the context of the natural language description of the desired fabrication result, the "3D Assembly" generative AI model is first used to generate a potential box design. In some embodiments, the potential box design may be displayed (or caused to be displayed) to a user for approval.

Then, the box design from the "3D Assembly" generative AI model (or at least some subset of data from the box design, e.g., the dimensions of the lid) is provided to the "Wood Etching" generative AI model. The "Wood Etching" generative AI model uses the data from the "3D Assembly" (or some portion thereof) as an input parameter for generating the frog image for the lid. For example, the dimensions of the lid may limit the size of the frog image and/or the how detailed the frog image can be (e.g., a larger-sized lid may be able to support a more detailed frog image than a smaller-sized lid).

In another example, the natural language description of the desired fabrication result may include "Create an obelisk from an acrylic block with hieroglyphs etched onto the sides." In this scenario, identifying one or more software engines for generating rendering instructions based on the natural language description of the fabrication result at block 824 may include identifying two generative AI models to use, where the first model is a "Generating a non-flat object" generative AI model and the second model is an "Acrylic Etching" generative AI model.

Based on the context of the natural language description of the desired fabrication result, the "Generating a non-flat object" generative AI model is first used to generate a potential design for creating the obelisk from the acrylic block. In some embodiments, the potential obelisk design may be displayed (or caused to be displayed) to a user for approval.

Then, the design from the "Generating a non-flat object" generative AI model (or at least some subset of data from the design, e.g., the dimensions of the obelisk faces) may be provided to the "Acrylic Etching" generative AI model. The "Acrylic Etching" generative AI model may use the data from the "Generating a non-flat object" (or some portion thereof) as an input parameter for generating the hieroglyph designs for the faces of the obelisk. For example, the dimensions of the faces may limit the size of the hieroglyph designs and/or the how detailed the hieroglyph designs can be (e.g., a larger-sized faces may be able to support a more detailed hieroglyph designs than a smaller-sized obelisk faces).

Further aspects of using one, two, or more different software engines are described further below with reference to method blocks 826-836.

At decision block 826, method 820 (*i*) proceeds to method block 828 when only one software engine has been identified at method block 824 or (ii) proceeds to method block 832 when two software engines have been identified at method block 824.

Method 820 shows decision block 826 having two branches for illustration purposes only. In some embodiments, the number of branches at decision block 826 is equal to the number of potential software engines that could be identified at method block 824. For example, embodiments where a system has three potential software engines available for use in generating rendering instructions, decision block 826 may have three branches, i.e., (i) a first branch for when a single software engine is identified at block 824, (ii) a second branch for when two software engines are identified at block 824, and (iii) a third branch for when three software engines are identified at block 824. In some embodiments, a system may have four, five, or more potential software engines available for use in generating rendering instructions.

As mentioned above, method 820 proceeds to method block 828 at decision block 826 when only one software engine has been identified at method block 824. Method block 828 includes causing a software engine to generate rendering instructions based on the natural language description of the desired fabrication result, which when input to a laser CNC machine, causes the laser CNC machine to generate a rendered fabrication result.

In some embodiments, the software engine at block 828 comprises a generative artificial intelligence model trained with training data comprising rendering instructions and fabrication results for a type of fabrication corresponding to the desired fabrication result.

For example, in some embodiments where the desired fabrication result (from block 822) is an etching on a flat surface (e.g., the etching examples shown in FIGS. 4A-E), then the artificial intelligence model employed by the software engine at block 828 includes a generative AI model that has been trained with training data comprising rendering instructions and fabrication results for etchings on a flat surface.

As mentioned above, some embodiments may employ different models for different types of material, e.g., an "etching on wood" model that has been trained with training data comprising rendering instructions and fabrication results for etchings on wood, an "etching on acrylic" model that has been trained with training data comprising rendering instructions and fabrication results for etchings on acrylic, and so on. However, some embodiments may instead include an "etching" model trained with training data comprising rendering instructions and fabrication results for etchings on many different types of materials, e.g., etchings on wood (and perhaps different types of wood), etchings on acrylic, etchings on metal (and perhaps different types of metal), etchings on glass, and so on.

As an another example, in some embodiments where the desired fabrication result (from block 822) is a 3D rendering (e.g., the example design 1014 for a sheep shown in FIG. 10A or the example box shown in FIG. 10B), then the generative artificial intelligence model employed by the software engine at block 828 includes a generative AI model that has been trained with training data comprising rendering instructions and fabrication results for 3D renderings.

Some embodiments may employ different models for different types of 3D renderings, e.g., a 3D assembly model that has been trained with training data comprising rendering instructions and fabrication results for 3D assemblies (e.g., the example sheep design 1014 in FIG. 10A), or a 3D foldable model that has been trained with training data comprising rendering instructions and fabrication results for 3D foldables (e.g., the box design 1018 in FIG. 10B), and so on. However, some embodiments may instead include a "3D" model trained with training data comprising rendering instructions and fabrication results for several different types of 3D renderings.

In some embodiments, method block 828 is the same or similar to method block 810, and all of the alternative embodiments and optional features and functions described with reference to method block 810 are equally applicable to method block 828.

After causing the software engine to generate the rendering instructions at method block 828, some embodiments may include presenting (or causing to be presented) a graphical depiction of what the rendered fabrication result would look like if fabricated according to the rendering instructions generated by the software engine at block 828. In some embodiments, method block 828 may include (i) generating several sets of rendering instructions, where each set of rendering instructions differs from the other sets of rendering instructions in one or more ways, and (ii) for each set of rendering instructions, presenting (or causing to be presented) a graphical depiction of what the rendered fabrication result would look like if fabricated according to the rendering instructions. For example, and as described previously, FIGS. 4C through 4E, 7, show graphical depictions of different potential rendered fabrication results that can be selected for fabrication by a CNC machine user.

Next, method 820 proceeds to method block 830, which includes causing the laser CNC machine to execute the rendering instructions to generate the rendered fabrication result. In embodiments that include presenting (or causing to be presented) graphical depictions of potential rendered fabrication results for review and selection, the step of causing the laser CNC machine to execute the rendering instructions at block 830 includes causing the laser CNC machine to execute the selected rendering instructions.

As mentioned above, method 820 proceeds to method block 832 at decision block 826 when two software engines (e.g., two or more generative AI models) have been identified at method block 824.

Examples where two or more generative AI models may be used to generate a fabrication result are described above, e.g., when natural language description of the desired fabrication result included: (i) "Create the following design to be fabricated using my Glowforge machine. First, generate a 4-inch square box with a lid. Then, etch an image of a frog onto the lid. The box is made from ⅛ inch birch wood."; and (ii) "Create an obelisk from an acrylic block with hieroglyphs etched onto the sides." However, these examples are just for illustration purposes.

Method block 832 includes causing a first software engine to generate first rendering instructions based on the natural language description of the desired fabrication result, which when input to a laser CNC machine, cause the laser CNC machine to generate a first rendered fabrication result, and causing a second software engine to generate second rendering instructions based on the natural language description of the desired fabrication result, which when input to the laser CNC machine, cause the laser CNC machine to generate a second rendered fabrication result.

Similar to method block 828, causing the software engine to generate the rendering instructions at method block 832 in some embodiments may include presenting (or causing to be presented) a graphical depiction of what the rendered fabrication result(s) would look like if fabricated according to the rendering instructions generated by the software engine at block 832. But since method block 832 includes generating first and second rendering instructions, some embodiments may include presenting (or causing to be presented) graphical depictions for the first rendered fabrication result, receiving (or otherwise obtaining) approval for a particular first rendered fabrication result, and then presenting (or causing to be presented) graphical depictions for the second rendered fabrication result based on the selected first rendered fabrication result. One example scenario proceeds as outlined below.

First, several sets of potential first rendering instructions are generated, where each set of first rendering instructions differs from the other sets of first rendering instructions in one or more ways. Then, for each set of first rendering instructions, a graphical depiction of what the first rendered fabrication result would look like if fabricated according to the first rendering instructions is presented (or caused to be presented) to a CNC machine user for selection and/or approval.

Second, after receiving a selection and/or approval of a first rendered fabrication result, several sets of potential second rendering instructions are generated based at least in part on the selected and/or approved first rendered fabrication result, where each set of second rendering instructions differs from the other sets of second rendering instructions in one or more ways. Then, for each set of second rendering instructions, a graphical depiction of what the second rendered fabrication result would look like if fabricated according to the first rendering instructions is presented (or caused to be presented) to a CNC machine user for selection and/or approval.

Some embodiments may additionally or alternatively include presenting (or causing to be presented) a graphical depiction of a final rendered fabrication result that shows what a final rendered fabrication result would look like if the CNC machine executes the selected/approved first rendering instructions and the selected/approved second rendering instructions.

An alternative example scenario includes generating several sets of rendering instructions, and then generating graphical depictions of different combinations of the generated rendering instructions for selection and approval by the CNC machine user.

This alternative example begins by generating a first set of first rendering instructions, where each set of first rendering instructions differs from the other sets of first rendering instructions in one or more ways. For example, a first AI model generates 2, 3, 4, or more potential first rendering instructions.

Then, a second AI model generates 2, 3, 4, or more potential second rendering instructions. Each of the second rendering instructions is based at least in part on at least one of the first rendering instructions generated by the first AI model. And each of the second rendering instructions differs from the other second rendering instructions in one or more ways.

Then, graphical depictions of several final rendered fabrication results are generated based on different combinations of the first rendering instructions and the second rendering instructions. In one example, the first AI model generates 3 first rendering instructions and the second AI model generates 3 second rendering instructions for each of the 3 first rendering instructions. In this example, generating the final rendered fabrication results may include generating up to 9 total graphical depictions of potential final fabrication results for review, approval, and/or selection by the laser CNC machine operator. Other examples may include generating more or fewer than 3 first rendering instructions and/or more or fewer than 3 second rendering instructions for each of the 3 first rendering instructions.

In some such embodiments that additionally include generating, presenting (or causing to be presented) graphical depictions of rendered results, method 820 advances to block 834 after receiving an approval of the graphical depiction of the final rendered fabrication result However, some embodiments may not include presenting (or causing to be presented) any one or more (or none) of the above-described graphical depictions of the first rendered fabrication result(s), second rendered fabrication result(s), and/or final rendered fabrication result for review, selection, or approval by a CNC machine.

Regardless of whether graphical depictions of rendered results are (or are not) presented (or caused to be presented), method 820 next advances to block 834, which includes causing the laser CNC machine to execute the first rendering instructions to generate the first rendered fabrication result.

Next, method 820 advances to block 836, which includes causing the laser CNC machine to execute the second rendering instructions to generate the second rendered fabrication result. In some embodiments, the block 836 step of causing the laser CNC machine to execute the second rendering instructions to generate the second rendered fabrication result includes causing the laser CNC machine to execute the second rendering instructions on the first rendered fabrication result to generate the second rendered fabrication result.

Although method 820 shows execution of method block 836 (causing execution of the second rendering instructions) after method block 834 (causing execution of the first rendering instructions), the method steps of methods 820 (and method 800) may be performed in any suitable order. For example, some embodiments may include causing execution of the second rendering instructions (block 836) before causing execution of the first rendering instructions (block 834).

Other examples may include an optimization step where the first rendering instructions and the second rendering instructions are combined such that a portion of the first rendering instructions are executed, followed by a portion of the second rendering instructions, followed by another portion of the first rendering instructions, and so on. This type of approach may be advantageous in an example scenario that includes fabricating a 3D object with etchings on one or more surfaces. For example, rather than fabricating all of the pieces of the 3D object and then etching each piece, it may be advantageous to fabricate a first set of pieces for the 3D object from a first material (according to first fabrication instructions), etch the surface(s) of the first set of pieces for the 3D objection (according to the second fabrication instructions), fabricate a second set of pieces for the 3D object from a second material (according to first fabrication instructions), and then etch the surface(s) of the second set of pieces for the 3D objection (according to the second fabrication instructions). This way, the fabrication steps for the first material can be completed before executing the fabrication steps for the second material.

In some embodiments involving 3D assembly designs, the output of the AI model may include both (i) rendering instructions executable by a laser CNC machine to cut pieces of the 3D assembly design from a material, and (ii) assembly instructions for use by the laser CNC machine user to assemble the 3D assembly design from the set of individual pieces fabricated by the laser-based CNC machine according to the rendering instructions. In such embodiments, the assembly instructions may include identification of individual pieces for assembly, instructions for joining and/or connecting the individual pieces, and so on.

As mentioned above, aspects of method 800, method 820, and any of the other methods or procedures disclosed and described herein can be performed by one or more devices individually or in any combination with each other. For example, environment 100 includes three functional entities: (i) a user terminal 115, (ii) a rendering server 105, and (iii) a rendering machine 110. The three functional entities may be combined into a single device (e.g., a rendering machine that includes a user terminal and rendering server), or the three functional entities may be implemented by three or more separate devices/systems.

In one example, a rendering machine 110 that includes the user terminal 115 and the rendering server 105 may perform all of the functions of the disclosed methods.

In another example, a user enters the natural language description of the desired fabrication result into a user terminal 115, and thus, the user terminal 115 receives the natural language description of the desired fabrication result from the user (e.g., method block 805, 822). The user terminal 115 may then provide the natural language description of the desired fabrication result to a rendering server 105 operated by a third party, and thus, the third party rendering server 105 additionally receives the natural language description of the desired fabrication result (e.g., method blocks 805, 822), except from the user terminal 115 rather than from the user directly. Based on the natural language description of the desired fabrication result, the third-party rendering server 105 may, among other features, generate the rendering instructions based on the natural language description of the desired fabrication result (e.g., method blocks 810, 828, or 832). After generating the rendering instructions, the third party rendering server 105 provides the generated rendering instructions to the user terminal 115, which in turn provides the rendering instructions to the rendering machine 110. The rendering machine 110 then executes the rendering instructions received from the user terminal 115 to generate the rendered fabrication result (e.g., method blocks 830, 834, or 836). In this scenario, the controller software running on the user terminal 115 may be controller software provided by the manufacturer of the rendering machine 110, but the design is generated by a third party rendering server 105 different than the manufacturer of the rendering machine 110.

In another example, a user enters the natural language description of the desired fabrication result into a user terminal 115, which then provides the natural language description of the desired fabrication result to a rendering server 105. Thus, either (or both) of the user terminal 115 or rendering server 105 can be said to have received the natural language description of the desired fabrication result (e.g., method blocks 805, 822). Based on the natural language description of the desired fabrication result, the rendering server 105 may, among other features, generate the rendering instructions based on the natural language description of the desired fabrication result (e.g., method blocks 810, 828, or 832). After generating the rendering instructions, the rendering server 105 provides the generated rendering instructions to the rendering machine 110. The rendering machine 110 then executes the rendering instructions received from the rendering server 105 to generate the rendered fabrication result (e.g., method blocks 830, 834, or 836). In this scenario, the controller software running on the user terminal 115 may be controller software provided by the manufacturer of the rendering machine 110, and the rendering server 105 may be operated by the manufacturer of the rendering machine 110. Thus, in this manner, the rendering server 105 (e.g., a cloud server) may control various aspects of the operation of the rendering machine 110, including but not limited to, controlling the execution of rendering instructions generated by the rendering server 105.

In yet another example, the user terminal 115, the rendering server 105, and the rendering machine 110 may be provided by or sourced from (and/or owned and/or operated by) different entities. For example, the user terminal 115 may be configured to run a design application for creating (or facilitating the creation of) AI designs, where the design application comprises software provided by one entity. A user may provide the natural language description of the desired fabrication result to the design application running on the user terminal 115. The design application running on the user terminal 115 may either generate an AI design, or instead, provide a portion (or all) of the natural language description of the desired fabrication result to a rendering server 105 operated by a different entity than the entity that provides the design application running on the user terminal 115. The rendering server 105 may generate the AI design individually or in combination with the AI design application running on the user terminal 115.

In some instances, the rendering server 105 may be implemented by more than a computing system. For example, for a natural language description of the desired fabrication result that calls for using more than one software engine (e.g., in method blocks 824, 826), a first software engine may be implemented by a first rendering server operated by a first entity and a second software engine may be implemented by a second rendering server operated by a second entity. After generating rendering instructions, the rendering server 105 (which may be implemented by more than a computing system), provides the rendering instructions either (i) back to the user terminal 115, which can provide the rendering instructions to rendering machine 110 or (ii) directly to the rendering machine 110 for execution.

In yet another alternative implementation example, the rendering server 105 (operated by a first entity) may generate rendering instructions based on a natural language description of the desired fabrication result, and then provide the generated rendering instructions to a cloud control server (operated by the entity that manufactures the rendering machine 110). The cloud control server may then use the rendering instructions received from the rendering server 105 to control the rendering machine 110, including causing or controlling the rendering machine 110 to execute the rendering instructions (e.g., blocks 830, 834, 836).

IV. ILLUSTRATIVE IMPLEMENTATIONS OF ASPECTS METHODS 800 AND 820

One example implementation that illustrates aspects of methods 800 (FIG. 8A) and 820 (FIG. 8B) in the context of the system depicted in environment 100 (FIG. 1) includes a scenario where the system receives a prompt from a laser CNC machine user via the user terminal 115, e.g., as shown in method block 805 (FIG. 8A) and method block 822 (FIG. 8B).

In some examples, the prompt includes a natural language description of a desired fabrication result to be created by rendering machine 110. In some examples, the prompt additionally includes an image, e.g., image 1012 (FIG. 10A). For example, the prompt may include an image with a natural language description of "Make a 3D assembly object of this" where "this" refers to the image included with the prompt. In some embodiments, the natural language description may be spoken by the laser CNC machine operator and detected via one or more microphones of the user terminal 115.

In some examples where the prompt includes an image, the image is passed to an image classifier (or similar AI engine) configured to identify the thing(s) depicted in the image. For example, if image 1012 (FIG. 10A) included in the prompt is passed to the image classifier, the image classifier may return a text result of "sheep," "a sheep standing on hay," or "a sheep with floppy ears," depending on the classifier.

In some embodiments, the text result returned from the image classifier may be provided to the laser CNC machine operator for review and confirmation, e.g., via a GUI on the user terminal 115. For example, if the image classifier returned a text result of "goat" rather than "sheep," the laser CNC machine operator can in some instances edit the text result. Or if the image classifier returned a more detailed than necessary result, e.g., "a brown sheep with a pink nose standing on hay in a stable," the laser CNC machine operator can in some instances edit the text result. However, in other embodiments, the text result may not be presented to the laser CNC machine operator for review and confirmation. In some embodiments, the system may edit the text result to remove words that are unnecessary or not useful, such as color, which may not be relevant to items fabricated with a laser CNC machine. In embodiments where the rendering machine 110 (FIG. 1) is a 3D printer capable of reproducing different colors, the system may not remove words corresponding to colors.

Next, the text result from the image classifier can then be combined with the natural language description of the desired fabrication result of "make a 3D assembly object of this" to generate a natural language prompt (or query) of "make a 3D assembly object of a sheep with floppy ears." The combined prompt (e.g., "make a 3D assembly object of a sheep with floppy ears") is also a natural language description of the desired fabrication result, albeit a slightly different version than the original natural language description of the desired fabrication result (i.e., "make a 3D assembly object of this").

The combined prompt is then passed to a generative AI model that creates a design based on the prompt. For example, based on the combined prompt (e.g., "make a 3D assembly object of a sheep with floppy ears"), the generative AI model may return design 1014 (FIG. 10A), which is a design of a 3D assembly object of a sheep that has floppy ears.

In some instances, the generative AI model may return several designs, where each design is a candidate design for use in generating rendering instructions. In some examples, the generative AI model may return three candidate designs, although other examples may include returning fewer or more than three candidate designs. In some instances, the candidate designs are presented to the laser CNC machine operator (e.g., via a GUI at the user terminal 115) for selection. After the laser CNC machine operator has selected one of the candidate designs, rendering instructions corresponding to the selected candidate design are provided to the rendering machine 110 for execution.

In some embodiments, the generative AI model(s) is/are configured to generate rendering instructions for each candidate design as part of generating the candidate design, i.e., the generative AI model(s) generate(s) the rendering instructions for the design when the AI model(s) generate the design (e.g., design 1016). In such embodiments, providing the rendering instructions corresponding to the selected candidate design to the rendering machine 110 for execution includes providing the rendering instructions corresponding to the selected design that the generative AI model(s) generated for the selected candidate design when the generative AI model(s) generated the selected candidate design.

In other embodiments, the generative AI model(s) is/are configured to generate the candidate designs, but not rendering instructions for the candidate designs. In such embodiments, providing the rendering instructions corresponding to the selected candidate design to the rendering machine 110 for execution includes (i) first, providing the selected candidate design to one or more models (which may include the same generative AI model(s) used to generate the candidate design in the first instance, but could be one or more different models) and/or other software tools that are configured to generate rendering instructions based on the selected candidate design and (ii) second, after the rendering instructions for the selected candidate design have been generated, providing the rendering instructions generated by the one or more models (based on the selected candidate design) to the rendering machine 110 for execution.

In some embodiments, rather than using the selected candidate design to generate the rendering instructions, the selected candidate design can instead be used to generate a new design, such as a revised design. For example, rather than using design 1014 to generate rendering instructions (or rather than using rendering instructions that may have been generated in connection with generating the design), design 1014 can instead be provided to the generative AI model to create a new design.

For instance, the laser CNC machine operator may like design 1014, but may prefer that the sheep have longer ears. So, the laser CNC machine operator may generate a new natural language description of a desired fabrication result to use with design 1014 to generate a new design, e.g., "make a 3D assembly design based on this sheep design, but make the ears longer." In another example, the laser CNC machine operator may like design 1014, but may decide that he or she wants the sheep to have sunglasses. So, the laser CNC machine operator may generate a new natural language description of a desired fabrication result to use with design 1014 to generate a new design, e.g., "please revise the sheep that the sheep is wearing sunglasses." The original design returned by the generative AI model (e.g., design 1014) in this instance is used as a baseline for further modification based on the new prompt received from the laser CNC machine operator.

In some instances, the natural language description of the desired fabrication result may include information about a desired text field to be depicted in the fabrication result. For example, a natural language description of a desired fabrication result may be "make a laser etching of a side view of a race car that has an editable three-character text field on the door in a whimsical font." In embodiments where the natural language description of the desired fabrication result does not specify a font for an editable field, the generative AI model may use a default font for the editable field.

Based on that natural language description of the desired fabrication result, the one or more AI models may generate a design that includes an image of a race car that has a three-character editable field on the door in "Unicorn Letters" font. This original race car design with the editable field having the "Unicorn Letters" font is then presented to the laser CNC machine operator (e.g., via a GUI). The original race car design can then be (i) in some instances, modified by the laser CNC machine operator or (ii) used as an input to generate a revised design. While "Unicorn Letters" is a whimsical font, after viewing the original race car design in the GUI, the laser CNC machine operator may want a different font.

In some scenarios where the font of the editable field can be modified, the laser CNC machine operator may select a different font via the GUI. After receiving a selection of the different font via the GUI, the GUI may further display the modified design with the different font for the editable field.

If the modified design with the different font is acceptable, then the laser CNC machine operator can approve the modified design. And after the system receives content for the editable text field (e.g., initials of a birthday party guest) from the laser CNC machine operator via the GUI, rendering instructions for the modified design (i.e., the race car with the initials in the user-selected font) are generated and provided to the rendering machine 110 for execution.

However, in some scenarios, the font of the editable field may not be modifiable in a particular design for some reason. For example, in the original race car design, aspects of the font may affect how the editable field is positioned on the door of the racecar such that the layout or positioning of the editable field within the original race car design will not accommodate an alternative font. In such scenarios, the original race car design with the "Unicorn Letters" font can be used as an input to generate a revised design.

For example, the laser CNC machine operator may use the original race car design to generate a new prompt for generating a revised design, e.g., "redo this race car design, but use a different whimsical font with more uniformly-sized letters for the three-letter editable field." The original race car design in this instance is provided as an input to the generative AI model(s) for use by the generative AI model(s) to revise the original race car design based on the new prompt. After receiving the original race car design and the new prompt (i.e., "redo this race car design, but use a different whimsical font with more uniformly-sized letters for the three-letter editable field") as inputs, the one or more generative AI models generate a revised race car design that has a different font for the three-letter editable field, e.g., "Kanote" font.

In some embodiments, the revised race car design with the editable field having the "Kanote" font is presented to the laser CNC machine operator (e.g., via a GUI) for review/editing. Like the original race car design presented in the GUI, the revised race car design can be (i) in some instances, modified by the laser CNC machine operator or (ii) used as an input to generate a further revised design.

But if the laser CNC machine operator likes the revised race car design with the "Kanote" font, the laser CNC machine operator can provide content for the editable field (e.g., initials of a birthday party guest). After receiving an approval of the revised race car design and content for the revised race car design (i.e., the initials of the party guest), then rendering instructions for the revised race car design (i.e., the racecar with the initials in the revised "Kanote" font) are generated and provided to the rendering machine 110 for execution in same manner as described above.

In some instances, the natural language description of the desired fabrication result may include information about a desired text field to be depicted in the fabrication result along with a reference image. For example, the prompt/query input to the system may include (i) a natural language description of a desired fabrication result which may be, for example, "make a laser etching of a side view of race car that has an editable three-character text field on the door in the font shown in this image" and (ii) an image that includes text having a particular font. The image can be provided to a tool for detecting text and determining a font, such as the tool available at https://www.whatfontis.com/API-identify-fonts-from-image.html. However, any other suitable text detection and font identification now known or later developed that is capable of detecting text and determining fonts could be used.

After the font has been identified, the font can be used to generate the design. For example, if the font in the provided image is "Le Mans Classic," then some embodiments include modifying the prompt provided to the generative AI model to include the name of the font. In this scenario, the image is first provided to the font determination tool. And then the system modifies the original natural language description of the desired fabrication result of "make a laser etching of a side view of race car that has an editable three-character text field on the door in the font shown in this image" to generate a revised natural language description of the desired fabrication result of "make a laser etching of a side view of race car that has an editable three-character text field on the door in Le Mans Classic font." This revised natural language description of the desired fabrication result is then provided to the generative AI model to create the design.

However, scenarios where the generative AI model may have been trained to recognize fonts may not utilize two steps in the manner above. Instead, in such scenarios, the AI model may recognize the font in the image and use that font to generate the design. In other scenarios, the generative AI model may not need to identify the font as Le Mans Classic. Instead, the generative AI model can (i) analyze aspects of the text appearing in the image received with the natural language description of the desired fabrication result, e.g., the ratio of the height of the letters to the width of the characters, the thickness of the lines of the characters, spacing between characters, and/or other attributes of the characters typically used to characterize fonts and typefaces and (ii) generate an editable text field to accommodate characters having the font and/or typeface characteristics extracted from the analysis of the text in the image provided with the natural language description of the desired fabrication result.

Alternatively, in some instances, the prompt may not specifically request a text field, but the design generated by the generative AI model may include a text field, e.g., the racecar may include the number 55 on the door. In some embodiments, a follow up prompt may ask the AI model to convert the number 55 appearing on the door to an editable text field. Or alternatively, the number 55 can be recognized as text and that area on the door of the racecar can be converted into an editable text field. In such instances, the text within the field will have some type of font or typeface that can be identified, and preferably changed.

V. EXAMPLE COMPUTING SYSTEM EMBODIMENTS

Figure 9:
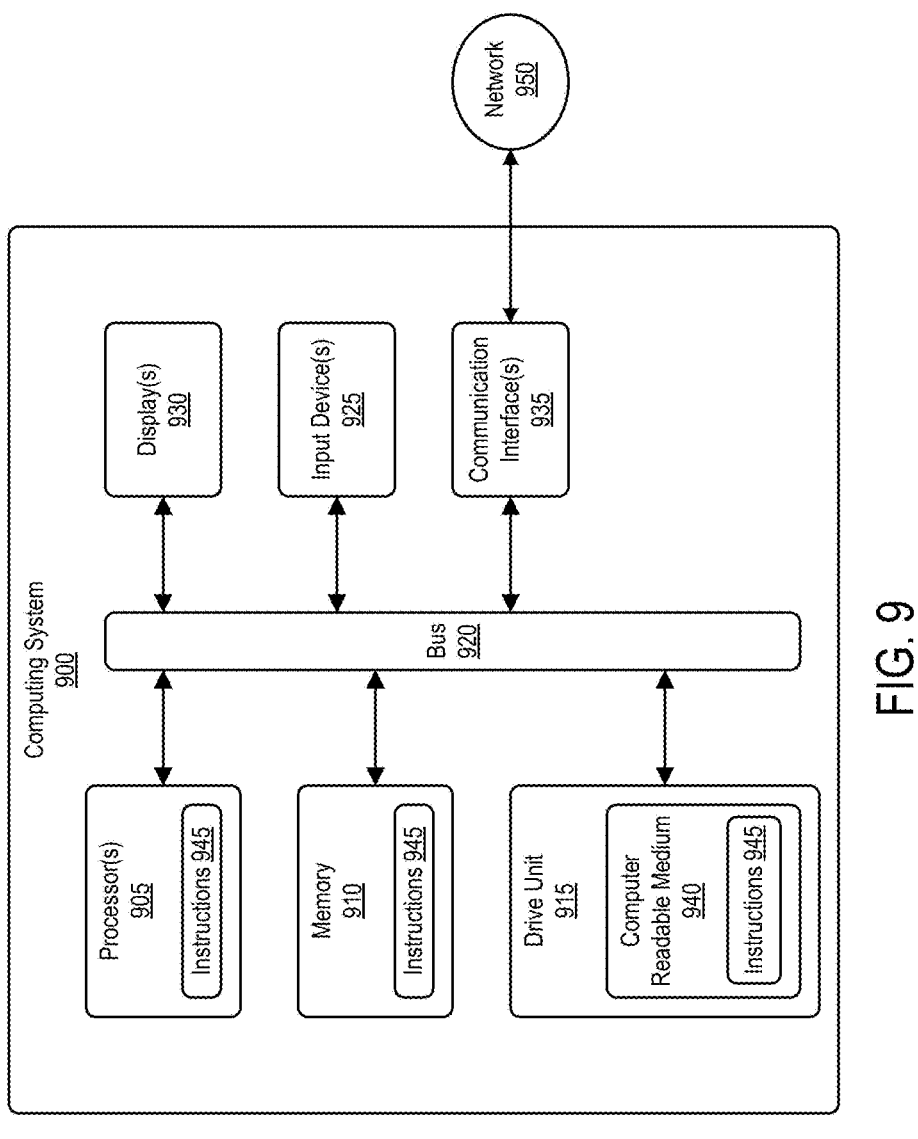
FIG. 9 shows a computer system that can form part of or implement any of the systems and/or devices described herein, in accordance with some example embodiments.

FIG. 9 illustrates an example of a computer system 900 that can form part of or implement any of the systems and/or devices described above. The computer system 900 can include a set of instructions 945 that the processor 905 can execute to cause the computer system 900 to perform any of the operations described above. An example of the computer system 900 can operate as a stand-alone device or can be connected, e.g., using a network, to other computer systems or peripheral devices.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, or any other type of memory or storage device.

The computer system 900 can include a display 930, such as a liquid crystal display (LCD), organic light-emitting diode (OLED) display, or any other display suitable for conveying information. The display 930 can act as an interface for the user to see processing results produced by processor 905.

Additionally, the computer system 900 can include an input device 925, such as a keyboard or mouse or touch-screen, configured to allow a user to interact with components of computer system 900.

The computer system 900 can also include a non-volatile memory (NVM) controller 915. The NVM controller 915 can include a computer-readable medium 940 (e.g., flash drive) in which the instructions 945 can be stored. The instructions 945 can reside completely, or at least partially, within the memory 910 and/or within the processor 905 during execution by the computer system 900. The memory 910 and the processor 905 also can include computer-readable media, as discussed above.

The computer system 900 can include a communication interface 935 to support communications via a network 950. The network 950 can include wired networks, wireless networks, or combinations thereof. The communication interface 935 can enable communications via any number of wireless broadband communication standards.

VI. CONCLUSIONS

Numerous specific details are set forth to provide a thorough understanding of the present disclosure. However, it is understood to those skilled in the art that certain embodiments of the present disclosure can be practiced without certain, specific details. In other instances, well-known methods, procedures, components, and circuitry have not been described in detail to avoid unnecessarily obscuring aspects of the embodiments.

Furthermore, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

One or more aspects or features of the subject matter described herein can be realized in digital electronic circuitry, integrated circuitry, specially designed application-specific integrated circuits (ASICs), field programmable gate arrays (FPGAs) computer hardware, firmware, software, and/or combinations thereof. These various aspects or features can include implementation in one or more computer programs that are executable and/or interpretable on a programmable system, including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship between client and server arises by virtue of computer programs running on the respective computers and having a client-server relationship to each other.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. Tangible, non-transitory computer-readable media comprising program instructions, wherein the program instructions, when executed by one or more processors, cause a computing system to perform functions comprising:

receiving an input comprising a natural language description of a desired fabrication result;

generating a prompt for a generative artificial intelligence (AI) model based on the input, wherein the prompt comprises (i) at least a portion of the natural language description of the desired fabrication result and (ii) data representing a continuous vector in a latent space of the generative AI model;

causing the generative AI model to generate a design based on the prompt; and after receiving the design from the generative AI model based on the prompt, generating rendering instructions based on the design, wherein the rendering instructions, when input to a laser CNC machine, cause the laser CNC machine to generate a rendered fabrication result based on the rendering instructions.

2. The tangible, non-transitory computer-readable media of claim 1, wherein the generative AI model comprises a special-purpose generative AI model that has been trained to generate designs compatible for execution by a laser CNC machine.

3. The tangible, non-transitory computer-readable media of claim 1, wherein the generative AI model comprises a general generative AI model that has been fine-tuned to generate designs compatible for execution by a laser CNC machine.

4. The tangible, non-transitory computer-readable media of claim 1, wherein the functions further comprise:

causing the laser CNC machine to generate the rendered fabrication result based on the rendering instructions.

5. The tangible, non-transitory computer-readable media of claim 1, wherein the input comprising the natural language description of the desired fabrication result further comprises one or more of (i) text data, (ii) image data, (iii)

audio data, (iii) video data, (iv) streaming data, (v) sensor data, or (vi) Computer-Aided Design (CAD) data.

6. The tangible, non-transitory computer-readable media of claim 1, wherein the prompt further comprises one or more rendering parameters, wherein the one or more rendering parameters comprise at least one of (i) a type of laser CNC machine or (ii) an aspect of a material upon which or from which the desired fabrication result is to be generated.

7. The tangible, non-transitory computer-readable media of claim 1, wherein the functions further comprise:

causing generation of a graphical representation of a prospective fabrication result corresponding to the design received from the generative AI model;

causing the graphical representation of the prospective fabrication result to be displayed via a graphical user interface; and after receiving an approval of the graphical representation of the prospective fabrication result, generating the rendering instructions based on the design.

8. The tangible, non-transitory computer-readable media of claim 1, wherein the functions further comprise:

causing the generative AI model to generate a plurality of designs based on the prompt;

for each design of the plurality of designs generated by the generative AI model, causing generation of a graphical representation of a prospective fabrication result corresponding to the design;

for each prospective fabrication result corresponding to each design of the plurality of designs generated by the generative AI model, displaying the prospective fabrication result via a graphical user interface;

after receiving a selection of one prospective fabrication result, generating rendering instructions based on the design corresponding to the selected prospective fabrication result.

9. The tangible, non-transitory computer-readable media of claim 1, wherein generating rendering instructions based on the design comprises:

generating initial rendering instructions;

determining whether the initial rendering instructions comprise one or more aspects that will result in a subpar rendered fabrication result; and for an individual aspect of the initial rendering instructions that will result in an unsatisfactory rendered fabrication result, remove or modify the individual aspect of the initial rendering instructions to create the rendering instructions used to generate the rendered fabrication result.

10. The tangible, non-transitory computer-readable media of claim 1, wherein the laser CNC machine comprises the computing system.

11. A method performed by a computing system, the method comprising:

receiving an input comprising a natural language description of a desired fabrication result;

generating a prompt for a generative artificial intelligence (AI) model based on the input, wherein the prompt comprises (i) at least a portion of the natural language description of the desired fabrication result and (ii) data representing a continuous vector in a latent space of the generative AI model;

causing the generative AI model to generate a design based on the prompt; and after receiving the design from the generative AI model based on the prompt, generating rendering instructions based on the design, wherein the rendering instructions, when input to a laser CNC machine, cause the laser CNC machine to generate a rendered fabrication result based on the rendering instructions.

12. The method of claim 11, wherein the generative AI model comprises a special-purpose generative AI model that has been trained to generate designs compatible for execution by a laser CNC machine.

13. The method of claim 11, wherein the generative AI model comprises a general generative AI model that has been fine-tuned to generate designs compatible for execution by a laser CNC machine.

14. The method of claim 11, further comprising:
causing the laser CNC machine to generate the rendered fabrication result based on the rendering instructions.

15. The method of claim 11, wherein the input comprising the natural language description of the desired fabrication result further comprises one or more of (i) text data, (ii) image data, (iii) audio data, (iii) video data, (iv) streaming data, (v) sensor data, or (vi) Computer-Aided Design (CAD) data.

16. The method of claim 11, wherein the prompt further comprises one or more rendering parameters, wherein the one or more rendering parameters comprise at least one of (i) a type of laser CNC machine or (ii) an aspect of a material upon which or from which the desired fabrication result is to be generated.

17. The method of claim 11, further comprising:
causing generation of a graphical representation of a prospective fabrication result corresponding to the design received from the generative AI model;
causing the graphical representation of the prospective fabrication result to be displayed via a graphical user interface; and after receiving an approval of the graphical representation of the prospective fabrication result, generating the rendering instructions based on the design.

18. The method of claim 11, further comprising:
causing the generative AI model to generate a plurality of designs based on the prompt;
for each design of the plurality of designs generated by the generative AI model, causing generation of a graphical representation of a prospective fabrication result corresponding to the design;
for each prospective fabrication result corresponding to each design of the plurality of designs generated by the generative AI model, displaying the prospective fabrication result via a graphical user interface;
after receiving a selection of one prospective fabrication result, generating rendering instructions based on the design corresponding to the selected prospective fabrication result.

19. The method of claim 11, wherein generating rendering instructions based on the design comprises:
generating initial rendering instructions;
determining whether the initial rendering instructions comprise one or more aspects that will result in a subpar rendered fabrication result; and
for an individual aspect of the initial rendering instructions that will result in an unsatisfactory rendered fabrication result, remove or modify the individual aspect of the initial rendering instructions to create the rendering instructions used to generate the rendered fabrication result.

20. The method of claim 11, wherein the computing system comprises a cloud-based computing system communicatively coupled to the laser CNC machine.

* * * * *